US012552320B2

(12) United States Patent
Wada et al.

(10) Patent No.: US 12,552,320 B2
(45) Date of Patent: Feb. 17, 2026

(54) CAMERA MODULE, INFORMATION PROCESSING SYSTEM, INFORMATION PROCESSING METHOD, AND INFORMATION PROCESSING APPARATUS

(71) Applicant: Sony Group Corporation, Tokyo (JP)

(72) Inventors: Yuji Wada, Tokyo (JP); Masahiro Tamori, Tokyo (JP); Hidenori Ishibashi, Tokyo (JP); Hidehiro Komatsu, Tokyo (JP); Satoshi Akagawa, Tokyo (JP); Keishi Tsuchiya, Tokyo (JP); Shinichi Iriya, Tokyo (JP); Takuya Motoishi, Tokyo (JP); Junichi Nagahara, Tokyo (JP); Daisuke Ishii, Tokyo (JP); Henrik Erbeus, Surrey (GB)

(73) Assignee: Sony Group Corporation, Tokyo (JP)

( * ) Notice: Subject to any disclaimer, the term of this patent is extended or adjusted under 35 U.S.C. 154(b) by 84 days.

(21) Appl. No.: 18/249,072

(22) PCT Filed: Oct. 8, 2021

(86) PCT No.: PCT/JP2021/037305
§ 371 (c)(1),
(2) Date: Apr. 14, 2023

(87) PCT Pub. No.: WO2022/085487
PCT Pub. Date: Apr. 28, 2022

(65) Prior Publication Data
US 2023/0415652 A1    Dec. 28, 2023

(30) Foreign Application Priority Data
Oct. 23, 2020   (JP) .................................. 2020-178137

(51) Int. Cl.
*B60R 1/27* (2022.01)
*B60R 1/20* (2022.01)

(52) U.S. Cl.
CPC .......... *B60R 1/27* (2022.01); *B60R 2300/105* (2013.01); *B60R 2300/307* (2013.01); *B60R 2300/60* (2013.01)

(58) Field of Classification Search
CPC .... B60R 1/27; B60R 1/22; B60R 1/23; B60R 1/24; B60R 2300/105; B60R 2300/307; B60R 2300/60
See application file for complete search history.

(56) References Cited

U.S. PATENT DOCUMENTS 4,439,013 A * 3/1984 Hagn ..................... B60H 1/247
                                                  359/850
8,525,881 B2 * 9/2013 Wagner .................... B60R 1/12
                                                  348/148

(Continued)

FOREIGN PATENT DOCUMENTS

JP    2001-114048 A     4/2001
JP    2001-339715 A    12/2001

(Continued)

OTHER PUBLICATIONS

International Search Report and Written Opinion mailed on Dec. 28, 2021, received for PCT Application PCT/JP2021/037305, filed on Oct. 8, 2021, 12 pages including English Translation.

*Primary Examiner* — Brian P Yenke
(74) *Attorney, Agent, or Firm* — XSENSUS LLP

(57) ABSTRACT

The present technology relates to a camera module, an information processing system, an information processing method, and an information processing apparatus capable of suppressing complication of a system including a camera in a moving device such as a vehicle.

(Continued)

A camera module includes a first camera, a second camera, and a housing that stores the first camera and the second camera. In a state where the camera module is installed in a moving device, an optical axis of the first camera faces obliquely rearward of the moving device, and an optical axis of the second camera faces in a lateral direction or obliquely forward of the moving device. The present technology can be applied to, for example, a vehicle that performs automated driving.

25 Claims, 52 Drawing Sheets

(56) References Cited

U.S. PATENT DOCUMENTS

| | | | | |
|---|---|---|---|---|
| 9,776,568 | B2* | 10/2017 | Hoyda | H04N 7/181 |
| 10,694,150 | B2* | 6/2020 | Ihlenburg | H04N 13/128 |
| 10,812,712 | B2* | 10/2020 | Prabhakar | B60R 1/002 |
| 10,829,044 | B2* | 11/2020 | Tatara | H04N 7/18 |
| 11,012,666 | B2* | 5/2021 | Park | G06V 20/56 |
| 11,084,423 | B2* | 8/2021 | Kim | B60W 10/20 |
| 11,282,234 | B2* | 3/2022 | Jiang | B60W 40/02 |
| 11,341,614 | B1* | 5/2022 | Chen | G06T 7/73 |
| 11,708,032 | B2* | 7/2023 | Taniguchi | B60R 1/25 348/148 |
| 12,296,740 | B2* | 5/2025 | Takagi | B60Q 3/80 |
| 2003/0021490 | A1* | 1/2003 | Okamoto | G06T 15/10 348/E7.086 |
| 2009/0009604 | A1* | 1/2009 | Kanaoka | H04N 23/698 348/148 |
| 2009/0284599 | A1 | 11/2009 | Wagner | |
| 2012/0218412 | A1* | 8/2012 | Dellantoni | G01C 21/3602 348/148 |
| 2012/0314075 | A1* | 12/2012 | Cho | B60R 11/0235 348/148 |
| 2014/0285666 | A1* | 9/2014 | O'Connell | B60R 1/28 348/148 |
| 2015/0092042 | A1* | 4/2015 | Fursich | B60R 1/23 348/115 |
| 2016/0094808 | A1* | 3/2016 | Cerri | B60R 1/27 348/36 |
| 2016/0137126 | A1* | 5/2016 | Fürsich et al. | B60R 1/26 348/148 |
| 2016/0148062 | A1* | 5/2016 | Fürsich | H04N 23/698 348/36 |
| 2016/0159281 | A1* | 6/2016 | Jang | H04N 7/181 348/148 |
| 2016/0191795 | A1* | 6/2016 | Han | H04N 23/951 348/36 |
| 2017/0132482 | A1* | 5/2017 | Kim | G06F 3/0488 |
| 2017/0195564 | A1* | 7/2017 | Appia | G06T 15/205 |
| 2018/0068191 | A1* | 3/2018 | Biemer | G06T 7/70 |
| 2018/0257647 | A1* | 9/2018 | Jurca | G01S 13/931 |
| 2019/0039517 | A1* | 2/2019 | Hoyda | B60R 1/24 |
| 2020/0112657 | A1* | 4/2020 | Stein | H04N 23/90 |
| 2020/0154025 | A1* | 5/2020 | Wakatsuki | H04N 23/71 |
| 2020/0180509 | A1* | 6/2020 | Rodriguez Ortiz | H04N 7/181 |
| 2020/0404187 | A1* | 12/2020 | Iida | H04N 23/698 |
| 2021/0344847 | A1* | 11/2021 | Kim | B60R 1/27 |
| 2022/0005210 | A1* | 1/2022 | Raveendran | G06V 10/00 |
| 2022/0080829 | A1* | 3/2022 | Choi | B60K 35/22 |
| 2022/0111794 | A1 | 4/2022 | Taniguchi | |
| 2022/0118915 | A1* | 4/2022 | Pastoor | B60R 1/08 |
| 2023/0001845 | A1* | 1/2023 | Takagi | B60R 25/01 |
| 2023/0038913 | A1* | 2/2023 | Higuma | B60K 35/00 |
| 2023/0096414 | A1* | 3/2023 | Nakahara | B60R 1/22 348/148 |
| 2023/0206596 | A1* | 6/2023 | Yamamoto | G06V 20/625 382/103 |
| 2024/0054897 | A1* | 2/2024 | Shoji | G08G 1/16 |
| 2024/0083360 | A1* | 3/2024 | Kim | G02B 17/02 |
| 2024/0129605 | A1* | 4/2024 | Luo | H04N 23/80 |
| 2024/0294115 | A1* | 9/2024 | Komatsu | B60R 1/25 |
| 2025/0050802 | A1* | 2/2025 | Ueda | B60Q 3/74 |
| 2025/0069583 | A1* | 2/2025 | Nagahara | G10K 11/18 |
| 2025/0155258 | A1* | 5/2025 | Komatsu | G06T 11/00 |

FOREIGN PATENT DOCUMENTS

| | | |
|---|---|---|
| JP | 2002-125224 A | 4/2002 |
| JP | 2012-156672 A | 8/2012 |
| JP | 2017-216509 A | 12/2017 |
| JP | 2018-142885 A | 9/2018 |
| JP | 2018-197021 A | 12/2018 |
| JP | 2019-051769 A | 4/2019 |
| WO | 2018/061680 A1 | 4/2018 |
| WO | WO-2020157901 A1 | 8/2020 |

* cited by examiner

CAMERA MODULE, INFORMATION PROCESSING SYSTEM, INFORMATION PROCESSING METHOD, AND INFORMATION PROCESSING APPARATUS

CROSS-REFERENCE TO RELATED APPLICATIONS

The present application is based on PCT filing PCT/JP2021/037305, filed Oct. 8, 2021, which claims priority to Japanese Application No. 2020-178137, filed Oct. 23, 2020, the entire contents of each are incorporated herein by reference.

TECHNICAL FIELD

The present technology relates to a camera module, an information processing system, an information processing method, and an information processing apparatus, and more particularly, to a camera module, an information processing system, an information processing method, and an information processing apparatus that enable effective use of a camera in a moving device.

BACKGROUND ART

In recent years, instead of conventional door mirrors, a camera monitoring system (CMS) that displays an image of the rear of a vehicle on a display in the vehicle has been developed.

For example, conventionally, as a door mirror used for the CMS, there has been proposed a door mirror including a main camera that is both directed to the rear of the vehicle and captures an image to be displayed on a display in the vehicle, and a sub camera that detects fogging of a lens or the like (See, for example, Patent Documents 1 and 2).

Furthermore, in recent years, the number of cameras mounted on vehicles has increased in order to support the CMS and automated driving.

CITATION LIST

Patent Document

Patent Document 1: Japanese Patent Application Laid-Open No. 2018-197021
Patent Document 2: Japanese Patent Application Laid-Open No. 2019-51769

SUMMARY OF THE INVENTION

Problems to be Solved by the Invention

However, as the number of cameras increases, the system architecture of the vehicle including each camera becomes complex. Furthermore, the degree of difficulty in designing the installation position of the camera, wiring, and the like increases.

The present technology has been made in view of such a situation, and is to suppress complication of a system including a camera in a moving device such as a vehicle.

Solutions to Problems

A camera module according to a first aspect of the present technology includes a first camera, a second camera, and a housing that stores the first camera and the second camera, in which in a state of being installed in a moving device, an optical axis of the first camera faces obliquely rearward of the moving device, and an optical axis of the second camera faces in a lateral direction or obliquely forward of the moving device.

An information processing system according to a second aspect of the present technology includes: a first camera including an optical axis facing obliquely rearward of a moving device; a second camera that is stored in a housing same as the first camera and includes an optical axis facing a direction closer to a front direction of the moving device than the optical axis of the first camera; a first display that is used by a camera monitoring system (CMS) and displays an image based on a first image captured by the first camera; a recognition unit that performs external object recognition of the moving device on the basis of a second image captured by the second camera; and a display control unit that controls display by the first display of the first image and a visual effect based on a result of object recognition by the recognition unit.

An information processing method according to a third aspect of the present technology includes:
controlling display, by a display for a camera monitoring system (CMS), of an image based on a first image captured by a first camera whose optical axis faces obliquely rearward of a moving device;
performing external object recognition of the moving device on the basis of a second image captured by a second camera that is stored in a housing same as the first camera and includes an optical axis facing a direction closer to a front direction of the moving device than the optical axis of the first camera; and
controlling display, by the display, of a visual effect based on a result of the object recognition.

An information processing apparatus according to a fourth aspect of the present technology includes a display control unit that controls display of a display used for a camera monitoring system (CMS), in which the display control unit controls display by the display of an image based on a first image captured by a first camera whose optical axis facing obliquely rearward of a moving device, and a visual effect based on a result of external object recognition of the moving device based on a second image captured by a second camera that is stored in a housing same as the first camera and that includes an optical axis facing a direction closer to a front direction of the moving device than the optical axis of the first camera.

In the first aspect of the present technology, in a state of being installed in the moving device, an optical axis of the first camera faces obliquely rearward of the moving device, and an optical axis of the second camera faces in a lateral direction or obliquely forward of the moving device.

In the second aspect or the third aspect of the present technology, display of an image based on the first image captured by the first camera whose optical axis faces obliquely rearward of the moving device is controlled, external object recognition of the moving device is performed on the basis of the second image captured by the second camera that is stored in the housing same as the first camera and includes an optical axis facing a direction closer to a front direction of the moving device than the optical axis of the first camera, and display of a visual effect based on a result of the object recognition is controlled.

In the fourth aspect of the present technology, display of an image based on a first image captured by a first camera whose optical axis faces obliquely rearward of the moving device, and a visual effect based on a result of external object recognition of the moving device based on a second image captured by a second camera that is stored in the housing same as the first camera and that includes an optical axis facing a direction closer to the front direction of the moving device than the optical axis of the first camera is controlled.

BRIEF DESCRIPTION OF DRAWINGS

FIG. 24 is a diagram illustrating a display example of the display unit for the CMS when a direction indicator is turned on.

FIG. 26 is a diagram illustrating a display example of the display unit for the CMS when a direction indicator is turned on.

FIG. 32 is a diagram for explaining a display range in a case where a shift position is set to reverse and the display unit for the CMS is looked in.

FIG. 33 is a diagram for explaining a display range in a case where a shift position is set to reverse and the display unit for the CMS is looked in.

FIG. 34 is a diagram for explaining a display range in a case where a shift position is set to reverse and the display unit for the CMS is looked in.

MODE FOR CARRYING OUT THE INVENTION

Hereinafter, modes for carrying out the present technology will be described. The description will be given in the following order.

Figure 1:
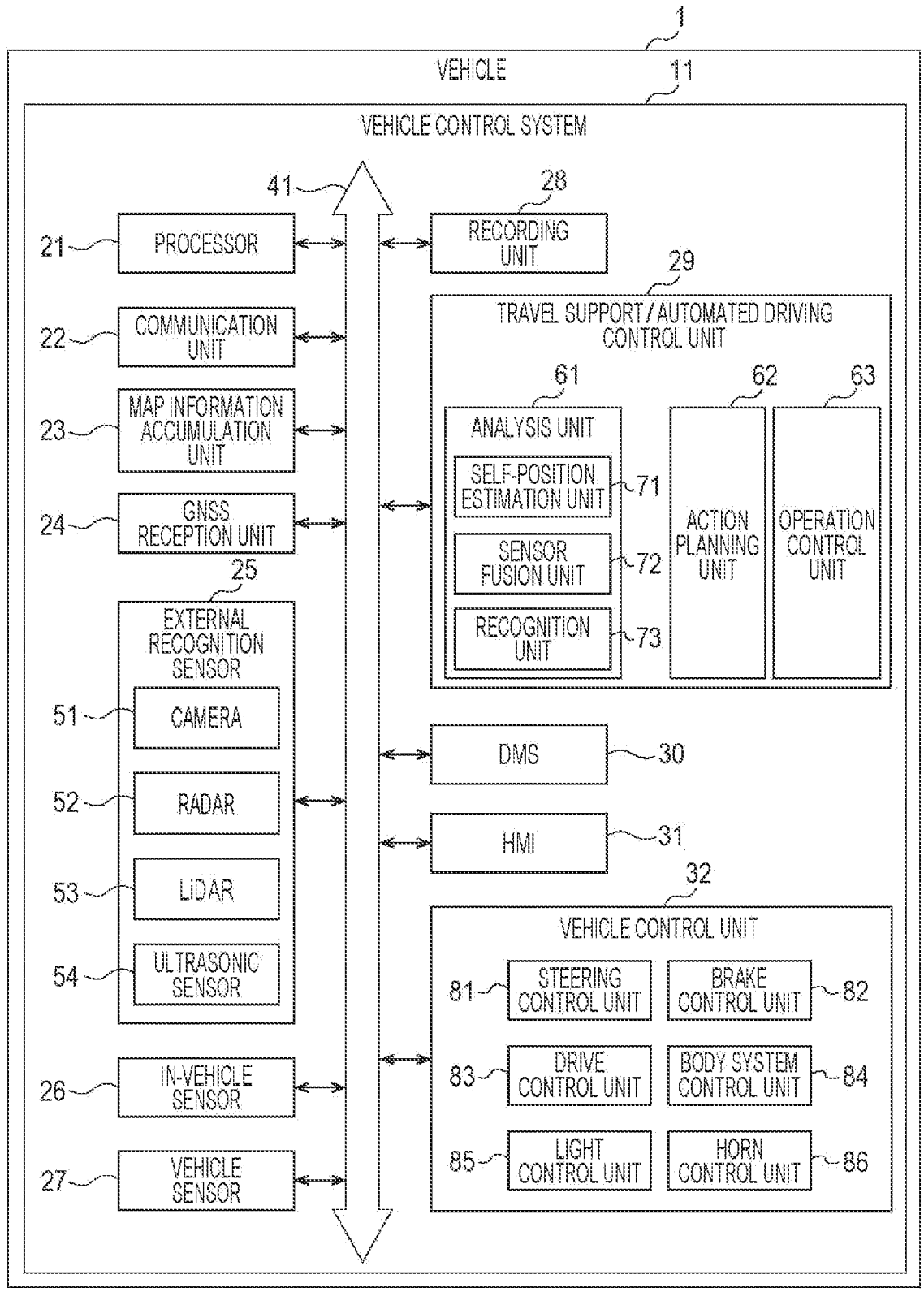
FIG. 1 is a block diagram illustrating a configuration example of a vehicle control system.

1. Configuration example of vehicle control system
2. Embodiments
3. Modified examples
4. Others 1. Configuration Example of Vehicle Control System FIG. 1 is a block diagram illustrating a configuration example of a vehicle control system 11 that is an example of a moving device control system to which the present technology is applied.

The vehicle control system 11 is provided in the vehicle 1 and performs processing related to travel assistance and automated driving of the vehicle 1.

The vehicle control system 11 includes a processor 21, a communication unit 22, a map information accumulation unit 23, a global navigation satellite system (GNSS) reception unit 24, an external recognition sensor 25, an in-vehicle sensor 26, a vehicle sensor 27, a recording unit 28, a travel support/automated driving control unit 29, a driver monitoring system (DMS) 30, a human machine interface (HMI) 31, and a vehicle control unit 32.

The processor 21, the communication unit 22, the map information accumulation unit 23, the GNSS reception unit 24, the external recognition sensor 25, the in-vehicle sensor 26, the vehicle sensor 27, the recording unit 28, the travel support/automated driving control unit 29, the driver monitoring system (DMS) 30, the human machine interface (HMI) 31, and the vehicle control unit 32 are connected to one another via a communication network 41. The communication network 41 includes, for example, an in-vehicle communication network, a bus, or the like conforming to an arbitrary standard such as a controller area network (CAN), a local interconnect network (LIN), a local area network (LAN), FlexRay (registered trademark), or Ethernet (registered trademark). Note that each unit of the vehicle control system 11 may be directly connected by, for example, near field communication (NFC), Bluetooth (registered trademark), or the like without passing through the communication network 41.

Note that, hereinafter, in a case where each unit of the vehicle control system 11 performs communication via the communication network 41, description of the communication network 41 will be omitted. For example, in a case where the processor 21 and the communication unit 22 perform communication via the communication network 41, it is simply described that the processor 21 and the communication unit 22 perform communication.

The processor 21 includes, for example, various processors such as a central processing unit (CPU), a micro processing unit (MPU), and an electronic control unit (ECU). The processor 21 controls the entire vehicle control system 11.

The communication unit 22 communicates with various devices inside and outside the vehicle, other vehicles, servers, base stations, and the like, and transmits and receives various data. As the communication with the outside of the vehicle, for example, the communication unit 22 receives a program for updating software for controlling an operation of the vehicle control system 11, map information, traffic information, information around the vehicle 1, and the like from the outside. For example, the communication unit 22 transmits information regarding the vehicle 1 (for example, data indicating the state of the vehicle 1, a recognition result by a recognition unit 73, and the like), information around the vehicle 1, and the like to the outside. For example, the communication unit 22 performs communication corresponding to a vehicle emergency call system such as an eCall.

Note that a communication method of the communication unit 22 is not particularly limited. Furthermore, a plurality of communication methods may be used.

As communication with the inside of the vehicle, for example, the communication unit 22 performs wireless communication with an in-vehicle device by a communication method such as wireless LAN, Bluetooth, NFC, or wireless USB (WUSB). For example, the communication unit 22 performs wired communication with an in-vehicle device by a communication method such as a universal serial bus (USB), a high-definition multimedia interface (registered trademark, HDMI), or a mobile high-definition link (MHL) via a connection terminal (and, if necessary, a cable) not illustrated.

Here, the in-vehicle device is, for example, a device that is not connected to the communication network 41 in the vehicle. For example, a mobile device or a wearable device carried by a passenger such as a driver, an information device brought into the vehicle and temporarily installed, or the like is assumed.

For example, the communication unit 22 communicates with a server or the like existing on an external network (for example, the Internet, a cloud network, or a company-specific network) via a base station or an access point by a wireless communication scheme such as fourth generation mobile communication system (4G), fifth generation mobile communication system (5G), long term evolution (LTE), or dedicated short range communications DSRC).

For example, the communication unit 22 communicates with a terminal (for example, a terminal of a pedestrian or a store, or a machine type communication (MTC) terminal) existing in the vicinity of the host vehicle using a peer to peer (P2P) technology. For example, the communication unit 22 performs V2X communication. The V2X communication is, for example, vehicle to vehicle communication with another vehicle, vehicle to infrastructure communication with a roadside device or the like, vehicle to home communication, vehicle to pedestrian communication with a terminal or the like possessed by a pedestrian, or the like.

For example, the communication unit 22 receives an electromagnetic wave transmitted by a vehicle information and communication system (VICS, registered trademark) such as a radio wave beacon, an optical beacon, or FM multiplex broadcasting.

The map information accumulation unit 23 accumulates a map acquired from the outside and a map created by the vehicle 1. For example, the map information accumulation unit 23 accumulates a three-dimensional highly accurate map, a global map having lower accuracy than the highly accurate map and covering a wide area, and the like.

The high-precision map is, for example, a dynamic map, a point cloud map, a vector map (is also referred to as an advanced driver assistance system (ADAS) map), or the like. The dynamic map is, for example, a map including four layers of dynamic information, semi-dynamic information, semi-static information, and static information, and is provided from an external server or the like. The point cloud map is a map including point clouds (point cloud data). The vector map is a map in which information such as a lane and a position of a signal is associated with the point cloud map. The point cloud map and the vector map may be provided from, for example, an external server or the like, or may be created by the vehicle 1 as a map for performing matching with a local map to be described later on the basis of a sensing result by a radar 52, a LiDAR 53, or the like, and may be accumulated in the map information accumulation unit 23. Furthermore, in a case where a high-precision map is provided from an external server or the like, for example, map data of several hundred meters square regarding a planned route on which the vehicle 1 travels from now is acquired from the server or the like in order to reduce the communication capacity.

The GNSS reception unit 24 receives a GNSS signal from a GNSS satellite, and supplies the GNSS signal to the travel support/automated driving control unit 29.

The external recognition sensor 25 includes various sensors used for recognizing a situation outside the vehicle 1, and supplies sensor data from each sensor to each unit of the vehicle control system 11. The type and number of sensors included in the external recognition sensor 25 are arbitrary.

For example, the external recognition sensor 25 includes a camera 51, the radar 52, the light detection and ranging or laser imaging detection and ranging (LiDAR) 53, and an ultrasonic sensor 54. The number of the cameras 51, the radars 52, the LiDAR 53, and the ultrasonic sensors 54 is arbitrary, and an example of a sensing area of each sensor will be described later.

Note that, as the camera 51, for example, a camera of an arbitrary imaging system such as a time of flight (ToF) camera, a stereo camera, a monocular camera, or an infrared camera is used as necessary.

Furthermore, for example, the external recognition sensor 25 includes an environment sensor for detecting weather, climate, brightness, and the like. The environment sensor includes, for example, a raindrop sensor, a fog sensor, a sunshine sensor, a snow sensor, an illuminance sensor, and the like.

Moreover, for example, the external recognition sensor 25 includes a microphone used for detecting a sound around the vehicle 1, a position of a sound source, and the like.

The in-vehicle sensor 26 includes various sensors for detecting information inside the vehicle, and supplies sensor data from each sensor to each unit of the vehicle control system 11. The type and number of sensors included in the in-vehicle sensor 26 are arbitrary.

For example, the in-vehicle sensor 26 includes a camera, a radar, a seating sensor, a steering wheel sensor, a microphone, a biological sensor, and the like. As the camera, for example, a camera of any imaging system such as a ToF camera, a stereo camera, a monocular camera, or an infrared camera can be used. The biological sensor is provided, for example, in a seat, a steering wheel, or the like, and detects various kinds of biological information of a passenger such as a driver.

The vehicle sensor 27 includes various sensors for detecting the state of the vehicle 1, and supplies sensor data from each sensor to each unit of the vehicle control system 11. The type and number of sensors included in the vehicle sensor 27 are arbitrary.

For example, the vehicle sensor 27 includes a speed sensor, an acceleration sensor, an angular velocity sensor (gyro sensor), and an inertial measurement unit (IMU). For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects revolutions of an engine or a motor, an air pressure sensor that detects an air pressure of a tire, a slip rate sensor that detects a slip rate of a tire, and a wheel speed sensor that detects a rotation speed of a wheel. For example, the vehicle sensor 27 includes a battery sensor that detects a remaining amount and a temperature of a battery, and an impact sensor that detects an external impact.

The recording unit 28 includes, for example, a read only memory (ROM), a random access memory (RAM), a magnetic storage device such as a hard disc drive (HDD), a semiconductor storage device, an optical storage device, a magneto-optical storage device, and the like. The recording unit 28 records various programs, data, and the like used by each unit of the vehicle control system 11. For example, the recording unit 28 records a rosbag file including a message transmitted and received by a robot operating system (ROS) in which an application program related to automated driving operates. For example, the recording unit 28 includes an event data recorder (EDR) and a data storage system for automated driving (DSSAD), and records information of the vehicle 1 before and after an event such as an accident.

The travel support/automated driving control unit 29 controls travel support and automated driving of the vehicle 1. For example, the travel support/automated driving control unit 29 includes an analysis unit 61, an action planning unit 62, and an operation control unit 63.

The analysis unit 61 performs analysis processing of the situation of the vehicle 1 and the surroundings. The analysis unit 61 includes a self-position estimation unit 71, a sensor fusion unit 72, and the recognition unit 73.

The self-position estimation unit 71 estimates a self-position of the vehicle 1 on the basis of the sensor data from the external recognition sensor 25 and the high-precision map accumulated in the map information accumulation unit 23. For example, the self-position estimation unit 71 generates a local map on the basis of the sensor data from the external recognition sensor 25, and estimates the self-position of the vehicle 1 by matching the local map with the high-precision map. The position of the vehicle 1 is based on, for example, a center of a rear wheel pair axle.

The local map is, for example, a three-dimensional high-precision map created using a technique such as simultaneous localization and mapping (SLAM), an occupancy grid map, or the like. The three-dimensional high-precision map is, for example, the above-described point cloud map or the like. The occupancy grid map is a map in which a three-dimensional or two-dimensional space around the vehicle 1 is divided into grids (lattices) of a predetermined size, and an occupancy state of an object is indicated in units of grids. The occupancy state of the object is indicated by, for example, the presence or absence or existence probability of the object. The local map is also used for detection processing and recognition processing of a situation outside the vehicle 1 by the recognition unit 73, for example.

Note that the self-position estimation unit 71 may estimate the self-position of the vehicle 1 on the basis of the GNSS signal and the sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods of combining different types of sensor data include integration, fusion, association, and the like.

The recognition unit 73 performs detection processing and recognition processing of a situation outside the vehicle 1.

For example, the recognition unit 73 performs detection processing and recognition processing of a situation outside the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like of an object around the vehicle 1. The detection processing of an object is, for example, processing of detecting the presence or absence, size, shape, position, movement, and the like of the object. The recognition processing of an object is, for example, processing of recognizing an attribute such as a type of an object or identifying a specific object. However, the detection processing and the recognition processing are not necessarily clearly divided, and may overlap.

For example, the recognition unit 73 detects an object around the vehicle 1 by performing clustering for classifying point clouds based on sensor data such as LiDAR or radar for each mass of point clouds. As a result, the presence or absence, size, shape, and position of the object around the vehicle 1 are detected.

For example, the recognition unit 73 detects the motion of an object around the vehicle 1 by performing tracking that follows the motion of the mass of the point cloud classified by clustering. As a result, speed and a traveling direction (movement vector) of the object around the vehicle 1 are detected.

For example, the recognition unit 73 recognizes the type of the object around the vehicle 1 by performing object recognition processing such as semantic segmentation on image data supplied from the camera 51.

Note that, as an object to be detected or recognized, for example, a vehicle, a person, a bicycle, an obstacle, a structure, a road, a traffic light, a traffic sign, a road sign, and the like are assumed.

For example, the recognition unit 73 performs recognition processing of traffic rules around the vehicle 1 on the basis of the map accumulated in the map information accumulation unit 23, an estimation result of the self-position, and a recognition result of the object around the vehicle 1. By this processing, for example, the position and the state of the signal, the contents of the traffic sign and the road sign, the contents of the traffic regulation, the travelable lane, and the like are recognized.

For example, the recognition unit 73 performs recognition processing of the environment around the vehicle 1. As the surrounding environment to be recognized, for example, weather, temperature, humidity, brightness, a state of a road surface, and the like are assumed.

The action planning unit 62 creates an action plan of the vehicle 1. For example, the action planning unit 62 creates an action plan by performing processing of global path planning and path following.

Note that the global path planning is processing of planning a rough path from a start to a goal. This global path planning is called trajectory planning, and includes processing of local path planning that enables safe and smooth traveling in the vicinity of the vehicle 1 in consideration of motion characteristics of the vehicle 1 in a path planned by the global path planning.

The path following is processing of planning an operation for safely and accurately traveling a path planned by the global path planning within a planned time. For example, the target speed and the target angular velocity of the vehicle 1 are calculated.

The operation control unit 63 controls an operation of the vehicle 1 in order to realize the action plan created by the action planning unit 62.

For example, the operation control unit 63 controls a steering control unit 81, a brake control unit 82, and a drive control unit 83 to perform acceleration/deceleration control and direction control such that the vehicle 1 travels on a trajectory calculated by the trajectory planning. For example, the operation control unit 63 performs cooperative control for the purpose of implementing the functions of the ADAS such as collision avoidance or impact mitigation, follow-up traveling, vehicle speed maintaining traveling, collision warning of the host vehicle, lane deviation warning of the host vehicle, and the like. For example, the motion control unit 63 performs cooperative control for the purpose of automated driving or the like in which the vehicle autonomously travels without depending on the operation of the driver.

The DMS 30 performs driver authentication processing, driver state recognition processing, and the like on the basis of sensor data from the in-vehicle sensor 26, input data input to the HMI 31, and the like. As the state of the driver to be recognized, for example, a physical condition, a wakefulness level, a concentration level, a fatigue level, a line-of-sight direction, a drunkenness level, a driving operation, a posture, and the like are assumed.

Note that the DMS 30 may perform authentication processing of a passenger other than the driver and recognition processing of the state of the passenger. Furthermore, for example, the DMS 30 may perform recognition processing of the situation inside the vehicle on the basis of sensor data from the in-vehicle sensor 26. As the situation inside the vehicle to be recognized, for example, temperature, humidity, brightness, odor, and the like are assumed.

The HMI 31 is used for inputting various data, instructions, and the like, generates an input signal on the basis of the input data, instructions, and the like, and supplies the input signal to each unit of the vehicle control system 11. For example, the HMI 31 includes an operation device such as a touch panel, a button, a microphone, a switch, and a lever, an operation device that can be input by a method other than manual operation by voice, gesture, or the like, and the like. Note that the HMI 31 may be, for example, a remote control device using infrared rays or other radio waves, or an external connection device such as a mobile device or a wearable device compatible with the operation of the vehicle control system 11.

Furthermore, the HMI 31 performs output control to control generation and output of visual information, auditory information, and tactile information to the passenger or the outside of the vehicle, output content, output timing, an output method, and the like. The visual information is, for example, information indicated by an image or light such as an operation screen, a state display of the vehicle 1, a warning display, or a monitor image indicating a situation around the vehicle 1. The auditory information is, for example, information indicated by a voice such as guidance, a warning sound, or a warning message. The tactile information is, for example, information given to the tactile sense of the passenger by force, vibration, motion, or the like.

As a device that outputs visual information, for example, a display device, a projector, a navigation device, an instrument panel, a camera monitoring system (CMS), an electronic mirror, a lamp, and the like are assumed. The display device may be a device that displays visual information in the field of view of the passenger, such as a head-up display, a transmissive display, or a wearable device having an augmented reality (AR) function, in addition to a device having a normal display.

As a device that outputs auditory information, for example, an audio speaker, a headphone, an earphone, or the like is assumed.

As a device that outputs tactile information, for example, a haptic element using haptics technology or the like is assumed. The haptics element is provided, for example, on a steering wheel, a seat, or the like.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 detects and controls the state of the steering system of the vehicle 1. The steering system includes, for example, a steering mechanism including a steering wheel and the like, an electric power steering, and the like. The steering control unit 81 includes, for example, a control unit such as an ECU that controls the steering system, an actuator that drives the steering system, and the like.

The brake control unit 82 detects and controls the state of the brake system of the vehicle 1. The brake system includes, for example, a brake mechanism including a brake pedal, an antilock brake system (ABS), and the like. The brake control unit 82 includes, for example, a control unit such as an ECU that controls a brake system, an actuator that drives the brake system, and the like.

The drive control unit 83 detects and controls the state of the drive system of the vehicle 1. The drive system includes, for example, a driving force generation device for generating a driving force such as an accelerator pedal, an internal combustion engine, or a driving motor, a driving force transmission mechanism for transmitting the driving force to wheels, and the like. The drive control unit 83 includes, for example, a control unit such as an ECU that controls the drive system, an actuator that drives the drive system, and the like.

The body system control unit 84 detects and controls the state of the body system of the vehicle 1. The body system includes, for example, a keyless entry system, a smart key system, a power window device, a power seat, an air conditioner, an airbag, a seat belt, a shift lever, and the like. The body system control unit 84 includes, for example, a control unit such as an ECU that controls the body system, an actuator that drives the body system, and the like.

The light control unit 85 detects and controls states of various lights of the vehicle 1. As the light to be controlled, for example, a headlight, a backlight, a fog light, a turn signal, a brake light, a projection, a display of a bumper, and the like are assumed. The light control unit 85 includes a control unit such as an ECU that controls light, an actuator that drives light, and the like.

The horn control unit 86 detects and controls the state of the car horn of the vehicle 1. The horn control unit 86 includes, for example, a control unit such as an ECU that controls the car horn, an actuator that drives the car horn, and the like.

2. Embodiment

Next, an embodiment of the present technology will be described with reference to FIGS. 2 to 47.

<Configuration Examples of External Recognition Sensor 25 and In-Vehicle Sensor 26>

Figure 2:
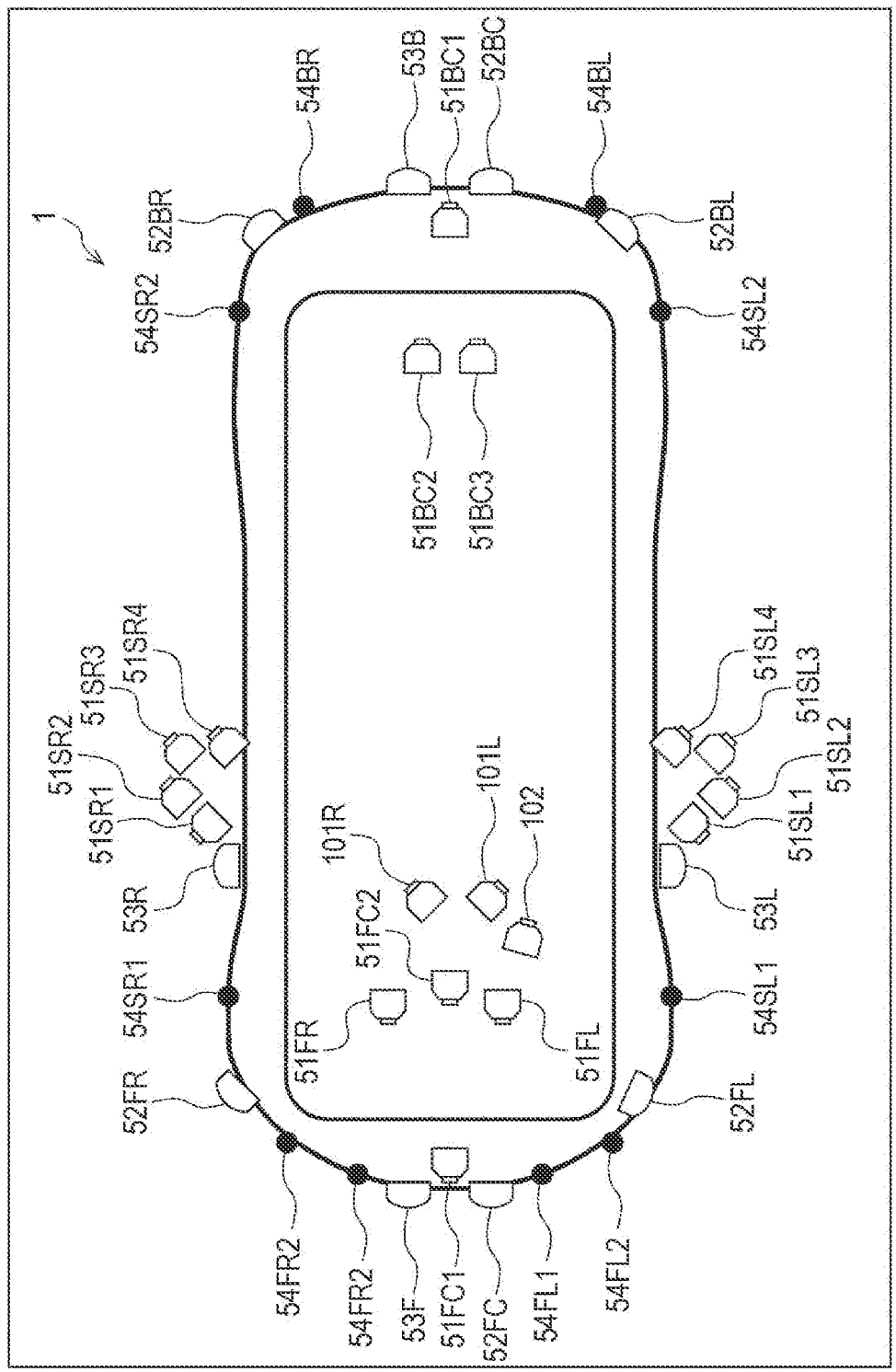
FIG. 2 is a diagram illustrating an example of installation positions of a camera, a LiDAR, a radar, and an ultrasonic sensor.

FIG. 2 illustrates an example of installation positions of the camera 51, the radar 52, the LiDAR 53, and the ultrasonic sensor 54 included in the external recognition sensor 25 of the vehicle 1, and the camera included in the in-vehicle sensor 26. In this example, the external recognition sensor 25 includes cameras 51FC1 to 51BC3, radars 52FC to 52BR, LiDAR 53F to LiDAR 53B, and ultrasonic sensors 54FL1 to 54BR. The in-vehicle sensor 26 includes cameras 101L to 102.

The camera 51FC1 is provided near the center of the front end of the vehicle 1. The camera 51FC1 images the front of the vehicle 1. For example, a fisheye camera is used as the camera 51FC1. The camera 51FC1 is used for ADAS and surround view, for example. The surround view is, for example, a function of displaying an image of the periphery of the vehicle 1 or a bird's-eye view image of the periphery of the vehicle 1 as viewed from above.

The camera 51FC2 is provided near the front center in the interior of the vehicle 1. The camera 51FC2 images the front of the vehicle 1 via the windshield. The camera 51FC2 is used for ADAS, for example. The image of the camera 51FC2 is recorded in, for example, a drive recorder.

The camera 51FL and the camera 51FR are arranged on the left and right at a predetermined distance in front of the interior of the vehicle 1, and constitute a stereo camera. The camera 51FL and the camera 51FR image the front of the vehicle 1 via the windshield. The camera 51FL and the camera 51FR are used for ADAS, for example. As the camera 51FL and the camera 51FR, for example, a camera having a higher resolution than the camera 51FC2 is used.

The cameras 51SL1 to 51SL4 constitute one camera module 122L (FIG. 9 and the like) as described later, and are provided near the front end of the door of the driver's seat on the left side surface of the vehicle 1.

The camera 51SL1 images an oblique front left of the vehicle 1. The camera 51SL1 is used for ADAS, for example.

The camera 51SL2 images the left direction of the vehicle 1. As the camera 51SL2, for example, a fisheye camera having a wider angle than the camera 51SL1, the camera 51SL3, and the camera 51SL4 is used. The camera 51SL2 is used for ADAS and surround view, for example.

The camera 51SL3 images the left diagonal rear of the vehicle 1. As the camera 51SL3, for example, a camera having a higher resolution than the camera 51SL1 is used. The camera 51SL3 is used for ADAS, for example.

The camera 51SL4 images the left diagonal rear of the vehicle 1. The optical axis of the camera 51SL4 faces a direction closer to the rear side of the vehicle 1 than the optical axis of the camera 51SL3. In other words, the optical axis of the camera 51SL3 faces a direction closer to the left direction (lateral direction) of the vehicle 1 than the optical axis of the camera 51SL4. The camera 51SL4 is used, for example, for the CMS.

The cameras 51SR1 to 51SR4 constitute one camera module 122R (FIG. 4 and the like) as described later, and are provided near the front end of the door of the passenger seat on the right side surface of the vehicle 1.

The camera 51SR1 images an oblique front right of the vehicle 1. The camera 51SR1 is used for, for example, an ADAS.

The camera 51SR2 images the right direction of the vehicle 1. As the camera 51SR2, for example, a fisheye camera having a wider angle than the camera 51SR1, the camera 51SR3, and the camera 51SR4 is used. The camera 51SR2 is used for ADAS and surround view, for example.

The camera 51SR3 images the right diagonal rear of the vehicle 1. As the camera 51SR3, for example, a camera having a higher resolution than the camera 51SR1 is used. The camera 51SR3 is used for ADAS, for example.

The camera 51SR4 images the right diagonal rear of the vehicle 1. The optical axis of the camera 51SR4 faces a direction closer to the rear side of the vehicle 1 than the optical axis of the camera 51SR3. In other words, the optical axis of the camera 51SR3 faces a direction closer to the right direction (lateral direction) of the vehicle 1 than the optical axis of the camera 51SR4. The camera 51SR4 is used for the CMS, for example.

The camera 51BC1 is provided near the center of the rear end of the vehicle 1. The camera 51BC1 images the rear of the vehicle 1. As the camera 51BC1, for example, a fisheye camera is used. The camera 51BC1 is used for ADAS and surround view, for example.

The camera 51BC2 and the camera 51BC3 are provided near the rear center in the interior of the vehicle 1. The camera 51BC2 and the camera 51BC3 image the rear of the vehicle 1 via the rear window. The camera 51BC2 is used for the CMS, for example. The camera 51BC3 is used for ADAS, for example. The image of the camera 51BC3 is recorded in, for example, a drive recorder.

The radar 52FC is provided near the center of the tip of the vehicle 1. The radar 52FC performs sensing in front of the vehicle 1.

The radar 52FL is provided near the left end of the front end of the vehicle 1. The radar 52FL performs sensing of the left diagonal front of the vehicle 1.

The radar 52FR is provided near the right end of the front end of the vehicle 1. The radar 52FR performs sensing of diagonally forward right of the vehicle 1.

The radar 52BC is provided near the center of the rear end of the vehicle 1. The radar 52BC performs sensing of the rear of the vehicle 1.

The radar 52BL is provided near the left end of the rear end of the vehicle 1. The radar 52BL performs sensing of the left diagonal rear of the vehicle 1.

The radar 52BR is provided near the right end of the rear end of the vehicle 1. The radar 52BR performs sensing of the right diagonal rear of the vehicle 1.

The LiDAR 53F is provided near the center of the distal end of the vehicle 1. The LiDAR 53F performs sensing of the front of the vehicle 1.

The LiDAR 53L is provided in front of the left side surface of the vehicle 1. The LiDAR 53L performs sensing in the left direction of the vehicle 1.

The LiDAR 53R is provided in front of the right side surface of the vehicle 1. The LiDAR 53R performs sensing in the right direction of the vehicle 1.

The LiDAR 53B is provided near the center of the rear end of the vehicle 1. The LiDAR 53B performs sensing of the rear of the vehicle 1.

The ultrasonic sensor 54FL1 is provided slightly to the left at the center of the distal end of the vehicle 1. The ultrasonic sensor 54FL1 performs sensing of a position slightly left in front of the vehicle 1.

The ultrasonic sensor 54FL2 is provided near the left end of the front end of the vehicle 1. The ultrasonic sensor 54FL1 performs sensing in the forward diagonal left direction of the vehicle 1.

The ultrasonic sensor 54FR1 is provided slightly to the right at the center of the front end of the vehicle 1. The ultrasonic sensor 54FR1 performs sensing toward the front right of the vehicle 1.

The ultrasonic sensor 54FR2 is provided near the right end of the front end of the vehicle 1. The ultrasonic sensor 54FR1 performs sensing in the front right oblique direction of the vehicle 1.

The ultrasonic sensor 54SL1 is provided in front of the left side surface of the body of the vehicle 1. The ultrasonic sensor 54SL1 performs sensing in the left direction in front of the vehicle 1.

The ultrasonic sensor 54SL2 is provided behind the left side surface of the body of the vehicle 1. The ultrasonic sensor 54SL2 performs sensing in the left direction behind the vehicle 1.

The ultrasonic sensor 54SR1 is provided in front of the right side surface of the body of the vehicle 1. The ultrasonic sensor 54SR1 performs sensing in the right direction in front of the vehicle 1.

The ultrasonic sensor 54SR2 is provided behind the right side surface of the body of the vehicle 1. The ultrasonic sensor 54SR2 performs sensing in the right direction behind the vehicle 1.

The ultrasonic sensor 54BL is provided near the left end of the rear end of the vehicle 1. The ultrasonic sensor 54BL performs sensing in the rearward oblique left direction of the vehicle 1.

The ultrasonic sensor 54BR is provided near the right end of the rear end of the vehicle 1. The ultrasonic sensor 54BR performs sensing in the rear right oblique direction of vehicle 1.

The camera 101L is provided in a diagonally upper right direction of the driver's seat in the vehicle. The camera 101L images the periphery of the driver's seat. For example, a ToF camera is used as the camera 101L.

A camera 101R is provided in a left obliquely upward direction of the passenger seat in the vehicle. The camera 101R images around the passenger seat. For example, a ToF camera is used as the camera 101R.

The camera 102 is provided slightly to the left at the center on the dashboard in the vehicle. The camera 102 images around the driver's seat.

<Example of Imaging Range of Fisheye Camera>

Figure 3:
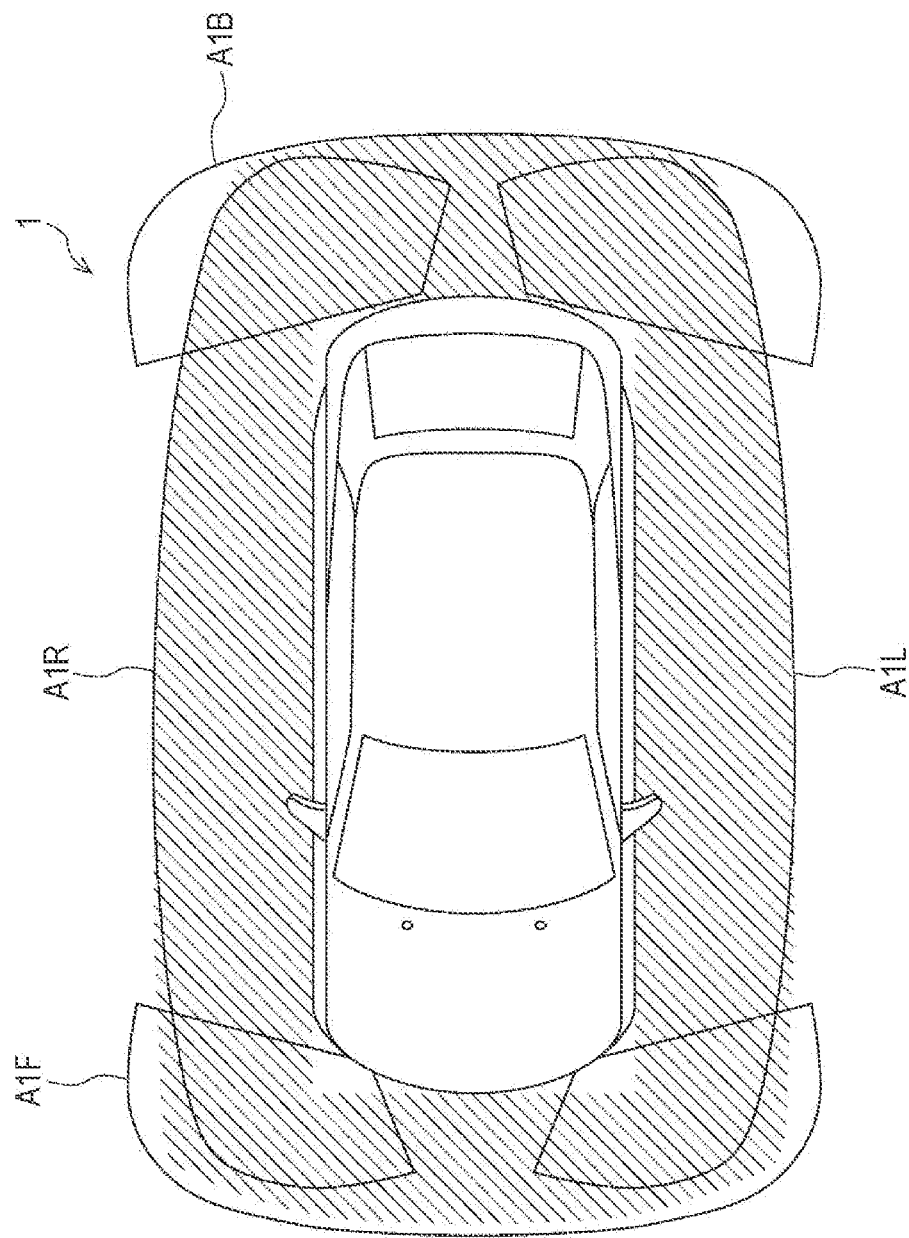
FIG. 3 is a diagram illustrating an example of an imaging range of a fisheye camera.

FIG. 3 illustrates an example of imaging ranges of the camera 51FC1, the camera 51SL2, the camera 51SR2, and the camera 51BC1 using the fisheye camera.

The camera 51FC1 can image the imaging range A1F exceeding 180 degrees in front of the vehicle 1. The camera 51SL2 can image an imaging range A1L exceeding 180 degrees in the left direction of the vehicle 1. The camera 51SR2 can image the imaging range A1R exceeding 180 degrees in the right direction of the vehicle 1. The camera 51BC1 can image an imaging range A1B exceeding 180 degrees behind the vehicle 1. Therefore, as indicated by hatching in the drawing, four fisheye cameras including the camera 51FC1 to the camera 51BC1 can image the periphery of the vehicle 1 at 360 degrees.

As described above, the cameras 51FC1 to 51BC1 are used for the ADAS and the surround view. For example, by combining the images of the cameras 51FC1 to 51BC1, an overhead image of 360 degrees around the vehicle 1 viewed from above is generated and displayed.

<Details of Camera Module 122L and Camera Module 122R>

Next, details of the camera module 122L and the camera module 122R will be described with reference to FIGS. 4 to 11. As described above, the camera module 122L includes the cameras 51SL1 to 51SL4. The camera module 122R includes cameras 51SR1 to 51SR4.

First, an example of installation positions of the camera module 122L and the camera module 122R will be described with reference to FIGS. 4 and 5.

Figure 4:
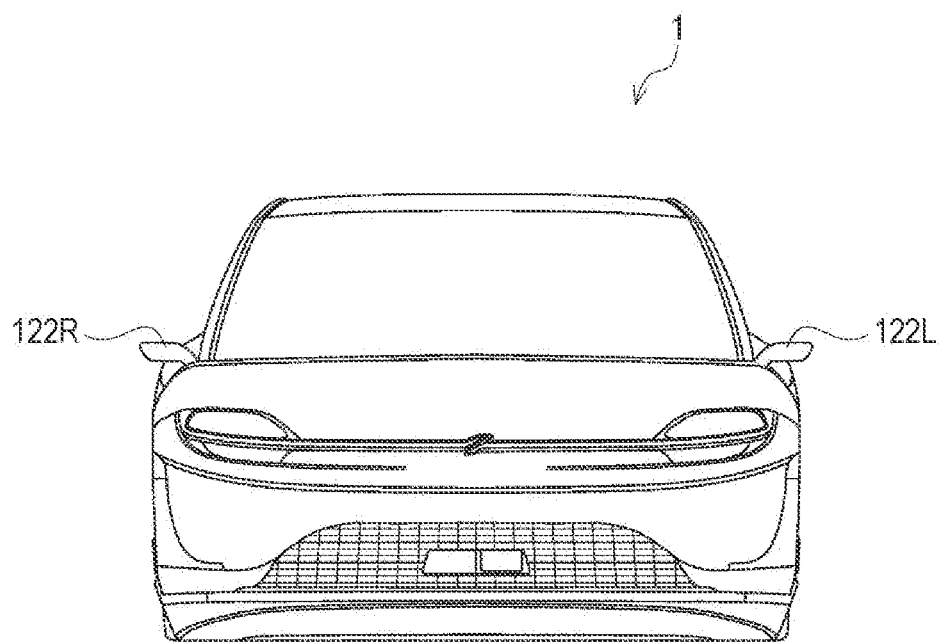
FIG. 4 is a front view of a vehicle.
Figure 5:
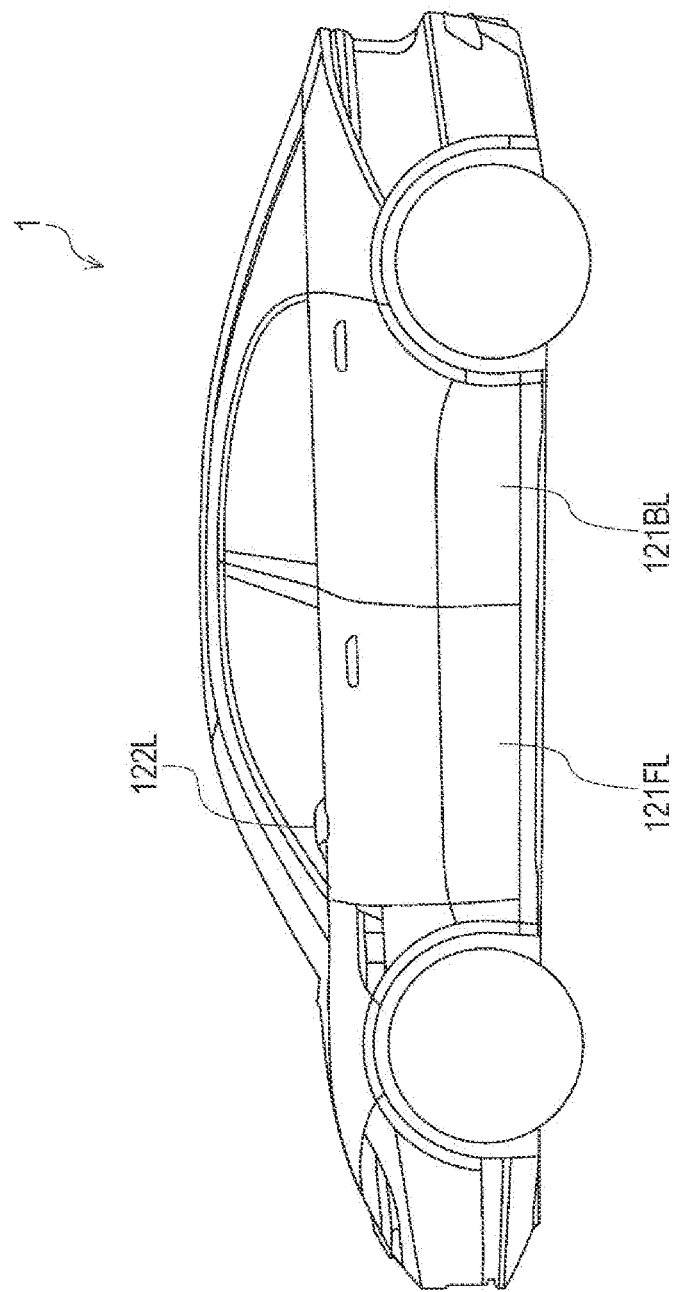
FIG. 5 is a left side view of the vehicle.

FIG. 4 is a front view of the vehicle 1. FIG. 5 is a left side view of the vehicle 1.

The camera module 122L is provided at the similar position as a conventional door mirror on a door 121FL of the driver's seat. Specifically, the camera module 122L is provided near the front end of the body of the door 121FL of the driver's seat and near the boundary between the body and the window.

The camera module 122R is provided at the similar position as the camera module 122L on a door 121FR (not illustrated) of the passenger seat.

Next, a configuration example of the camera module 122L will be described with reference to FIGS. 6 to 11.

Figure 6:
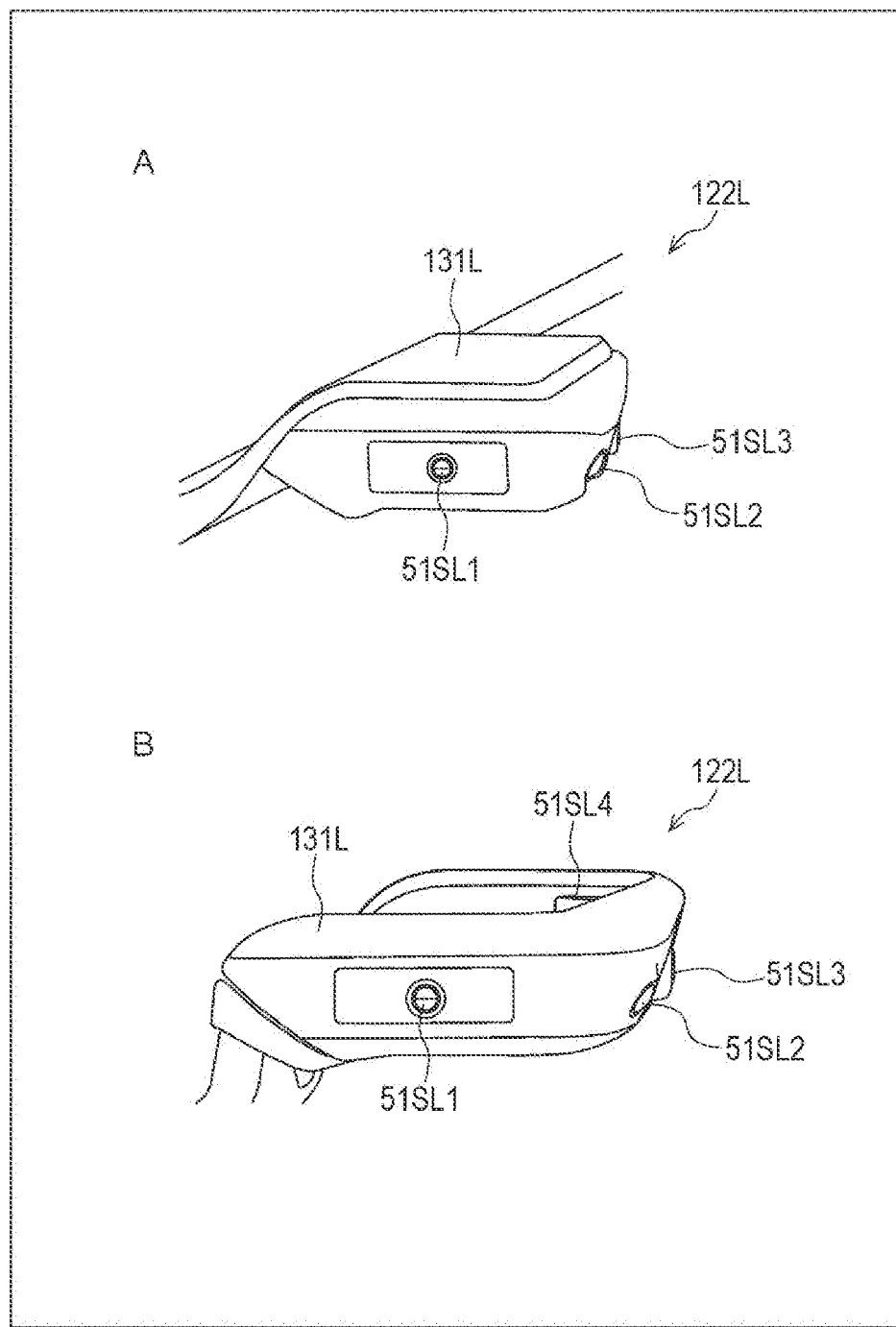
FIG. 6 is a diagram illustrating a configuration example of a camera module.
Figure 7:
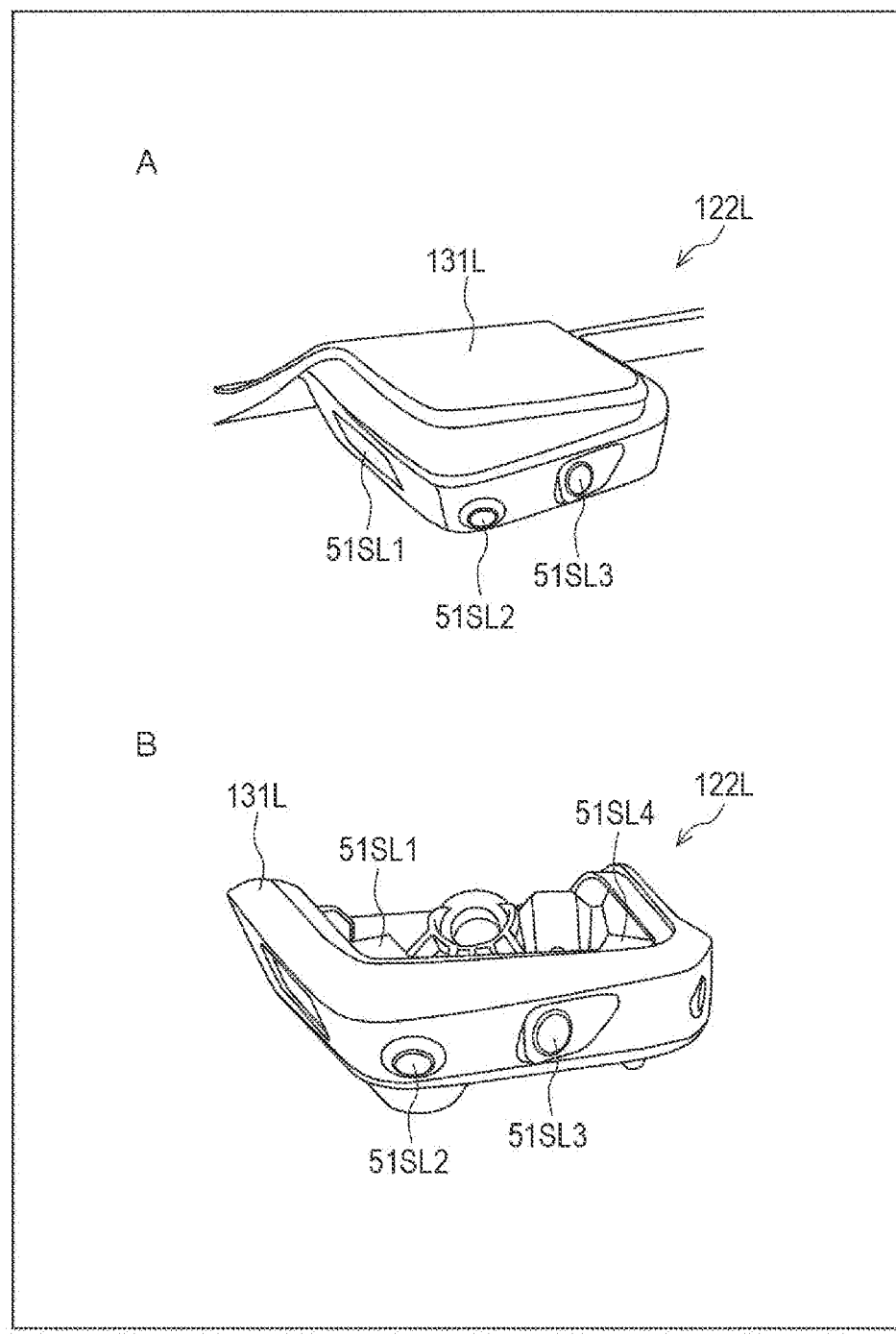
FIG. 7 is a diagram illustrating a configuration example of the camera module.
Figure 8:
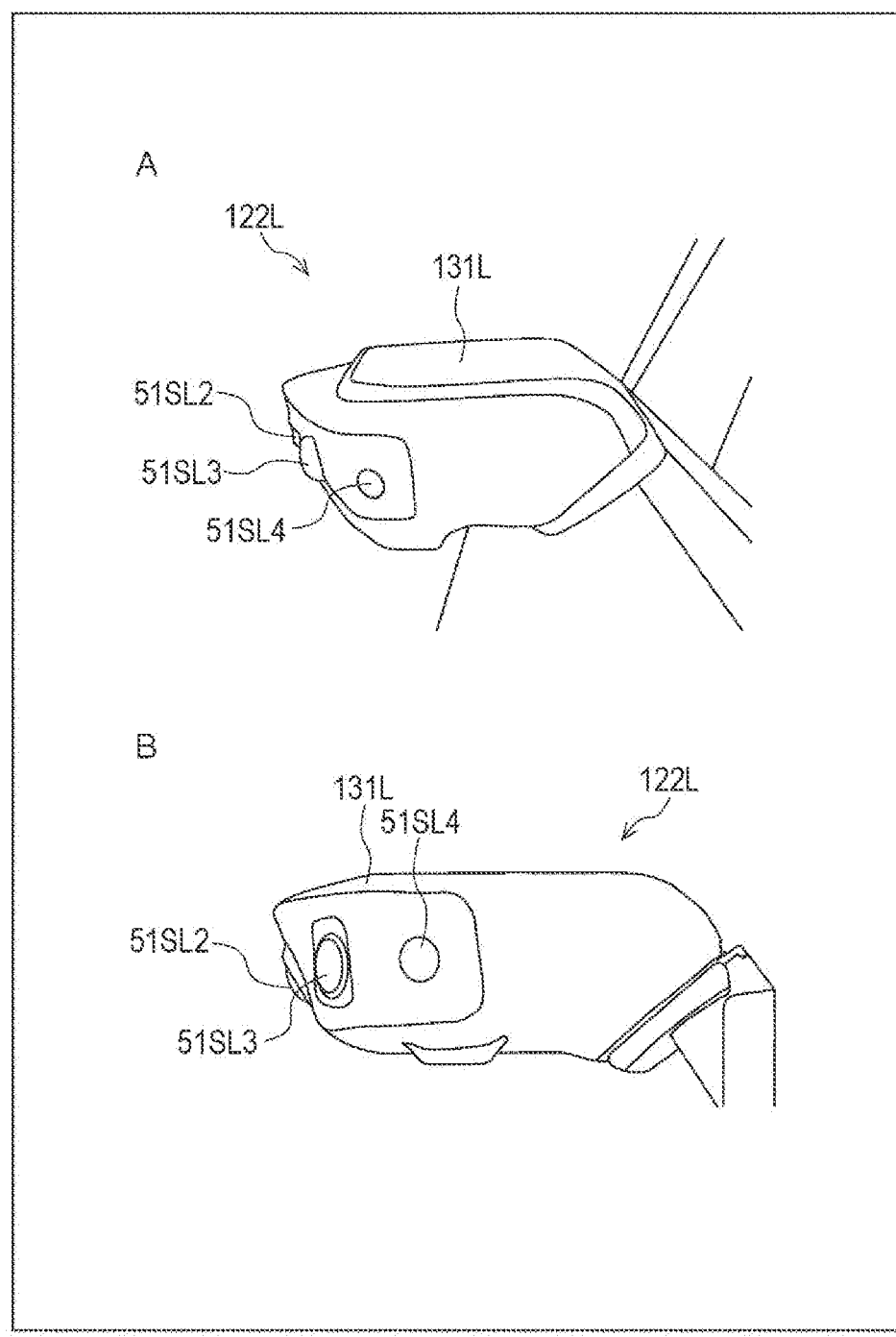
FIG. 8 is a diagram illustrating a configuration example of the camera module.
Figure 9:
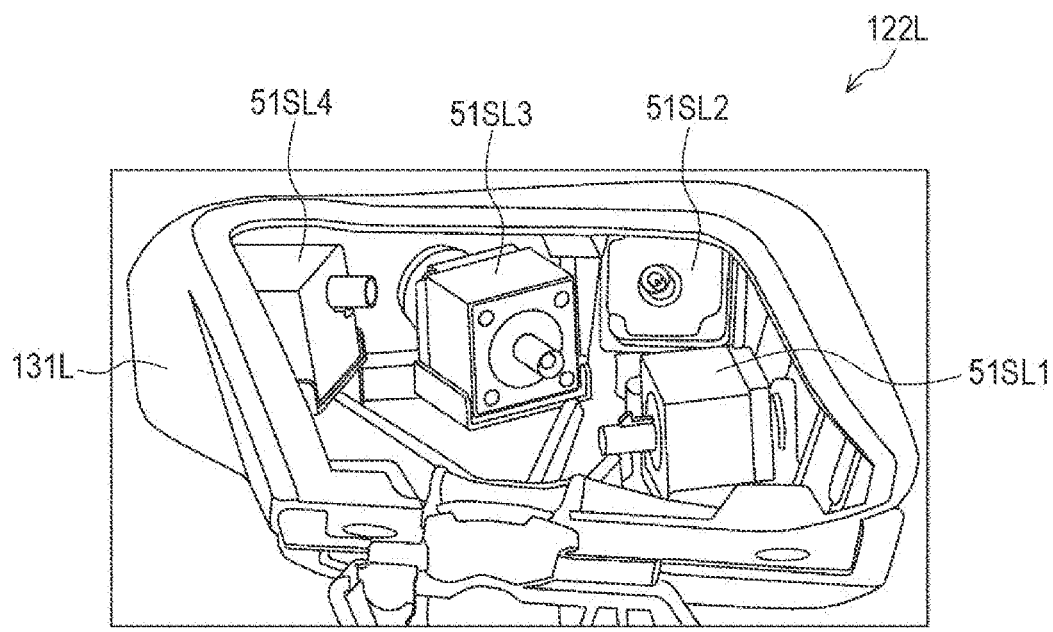
FIG. 9 is an exploded view illustrating a configuration example of the camera module.
Figure 10:
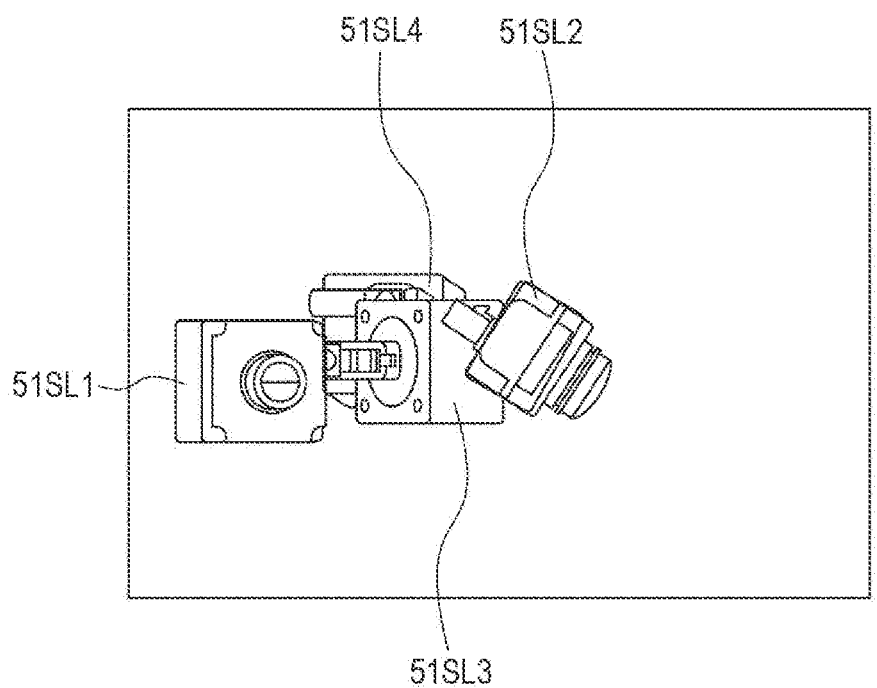
FIG. 10 is a diagram illustrating an arrangement example of cameras of a camera module.
Figure 11:
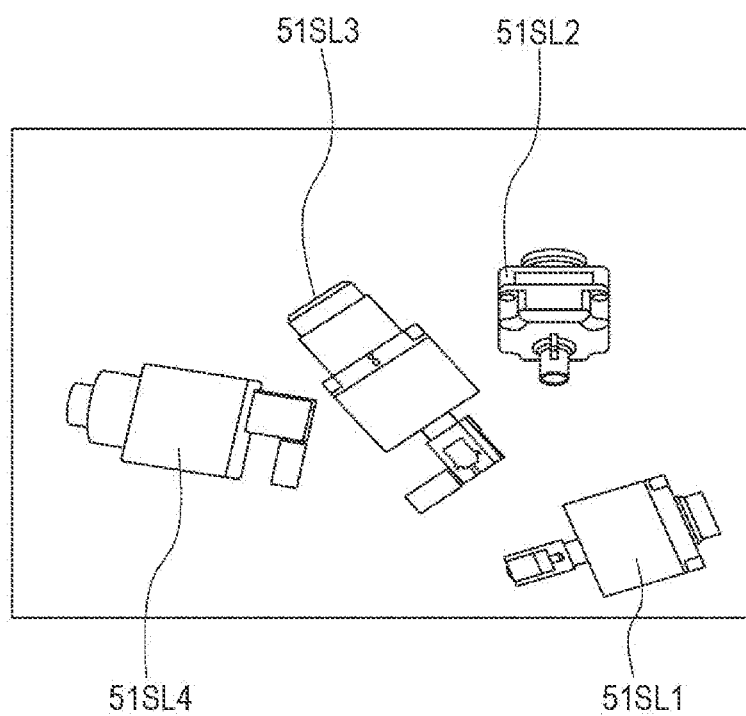
FIG. 11 is a diagram illustrating an arrangement example of cameras of the camera module.

A of FIG. 6 is a schematic diagram of the periphery of the camera module 122L of the vehicle 1 as viewed from the front slightly oblique left direction. B of FIG. 6 is an exploded schematic view of a part of the camera module 122L viewed from substantially the same direction as A of FIG. 6. A of FIG. 7 is a schematic diagram of the periphery of the camera module 122L of the vehicle 1 as viewed from the front diagonal left direction. B of FIG. 7 is an exploded schematic view of a part of the camera module 122L viewed from substantially the same direction as A of FIG. 7. A of FIG. 8 is a schematic view of the periphery of the camera module 122L of the vehicle 1 as viewed from the rear. B of FIG. 8 is a schematic diagram of the camera module 122L viewed from substantially the same direction as A of FIG. 8. FIG. 9 is an exploded view of the camera module 122L. FIG. 10 is a view of installation positions of the cameras 51SL1 to 51SL4 in the camera module 122L as viewed from the front. FIG. 11 is a view of installation positions of the cameras 51SL1 to 51SL4 in the camera module 122L as viewed from above.

As illustrated in FIG. 9, the cameras 51SL1 to 51SL4 are built in the housing 131L and fixed to the bottom plate of the housing 131L. Furthermore, the cameras 51SL1 to 51SL4 are directed in different directions outside the housing 131L so as not to be within the angle of view. Furthermore, a space is provided behind the cameras 51SL1 to 51SL4 so that cables can be wired.

The camera 51SL1 is disposed such that the optical axis is horizontal and slightly obliquely leftward from the front of the vehicle 1, and the lens is seen from the front of the housing 131L. That is, the optical axis of the camera 51SL1 faces the horizontal direction of the vehicle 1 and faces a direction slightly rotated to the left from the front direction in the yaw direction of the vehicle 1.

The angle of view of the camera 51SL1 is, for example, 120 degrees. Therefore, the camera 51SL1 can capture an image of a wide range from the front direction to the diagonally front left of the vehicle 1.

The camera 51SL2 is disposed such that the optical axis is directed obliquely downward (for example, downward by 32 degrees from the horizontal direction) and leftward (laterally) of the vehicle 1, and the lens is seen from the left side surface of the housing 131L.

As described above with reference to FIG. 3, the camera 51SL2 is constituted by a fisheye camera, and can capture an image of the imaging range A1L exceeding 180 degrees in the left direction of the vehicle 1.

Here, the optical axis of the camera usually used for the surround view is oriented vertically downward. On the other hand, the optical axis of the camera 51SL2 is directed obliquely downward. Furthermore, the camera 51SL2 includes a fisheye camera. Therefore, the camera 51SL2 can capture an image of a wide range including from the ground around the left side of the vehicle 1 to the upper end of a vehicle, a motorbike, or the like in the left adjacent lane.

The camera 51SL3 is disposed such that the optical axis is horizontal, faces the left diagonal rear direction of the vehicle 1, and the lens is seen from the left side surface of the housing 131L. That is, the optical axis of the camera 51SL3 faces the horizontal direction of the vehicle 1, and faces a direction rotated from the left direction to the left direction by a predetermined angle in the yaw direction of the vehicle 1.

The angle of view of the camera 51SL3 is, for example, 120 degrees. Therefore, the camera 51SL3 can capture an image of a wide range including from the left direction to the left diagonal rear of the vehicle 1.

The camera 51SL4 is disposed such that the optical axis is directed slightly obliquely downward and obliquely backward to the left of the vehicle 1, and the lens is seen from the vicinity of the boundary between the left side surface and the back surface of the housing 131L. That is, the optical axis of the camera 51SL4 is directed slightly downward from the horizontal direction of the vehicle 1, and is directed in a direction rotated from the left direction to the left direction by a predetermined angle in the yaw direction of the vehicle 1. Furthermore, the optical axis of the camera 51SL4 is directed in a direction closer to the rear side of the vehicle 1 than the optical axis of the camera 51SL3.

Therefore, the camera 51SL4 can image the left diagonal rear direction closer to the rear of the vehicle 1 than the camera 51SL3. Furthermore, by inclining the optical axis of the camera 51SL4 slightly downward from the horizontal direction, it is possible to widely image the road surface on the left diagonal rear side of the vehicle 1.

For example, the housing 131L has a width of 160 mm, a depth of 202 mm, and a height of 69 mm. Furthermore, the housing 131L includes metal, and can release the heat of the cameras 51SL1 to 51SL4 to the outside.

As described above, in the camera module 122L, the four cameras 51SL1 to 51SL4 having different imaging directions and applications are compactly arranged. Therefore, as compared with a case where the cameras 51SL1 to 51SL4 are individually arranged, the space of the vehicle 1 can be effectively used, and the designability is improved. Furthermore, the degree of freedom of arrangement of the cameras 51SL1 to 51SL4 (camera module 122L) is improved, and arrangement and wiring of sensors including other cameras are easily designed. As a result, it is possible to suppress complication of the system of the vehicle 1 including each camera and to make the system simpler.

Note that, although not illustrated, in the camera module 122R, the cameras 51SR1 to 51SR4 are arranged so as to be bilaterally symmetrical with the cameras 51SL1 to 51SL4 in the camera module 122L.

<Configuration Example of Interior of Vehicle 1>

Next, a configuration example of the interior of the vehicle 1 will be described with reference to FIGS. 12 to 19.

Figure 12:
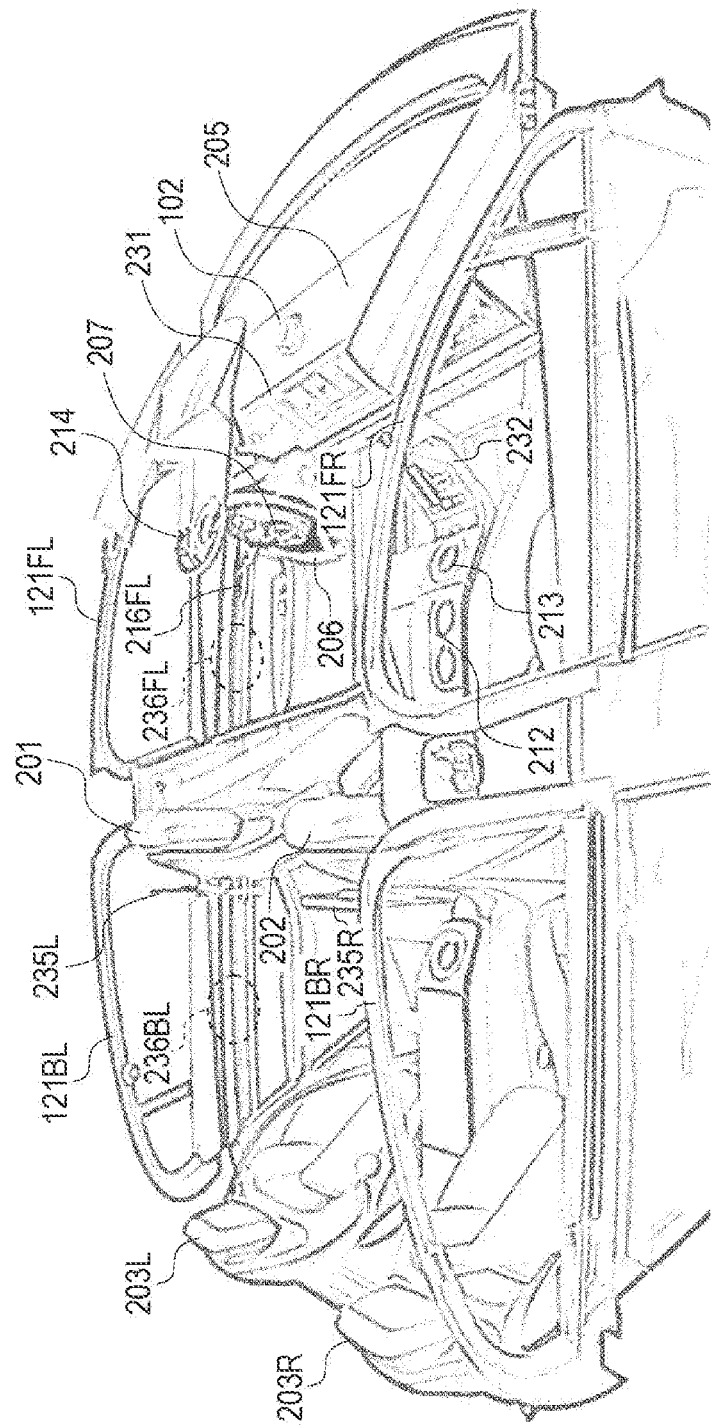
FIG. 12 is a schematic diagram of an interior of a vehicle as viewed from a right.
Figure 13:
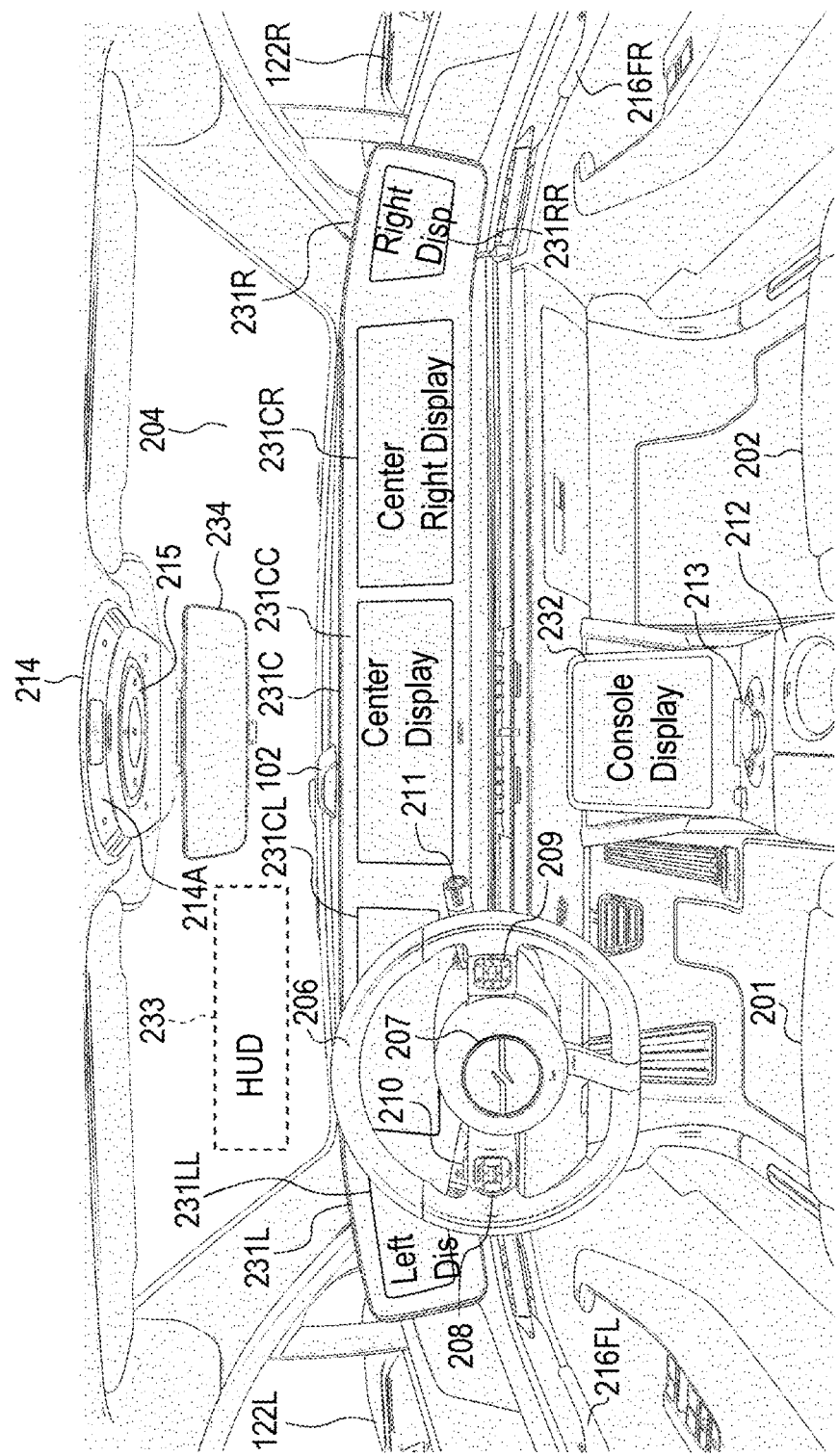
FIG. 13 is a schematic diagram illustrating a front of the interior of the vehicle.
Figure 14:
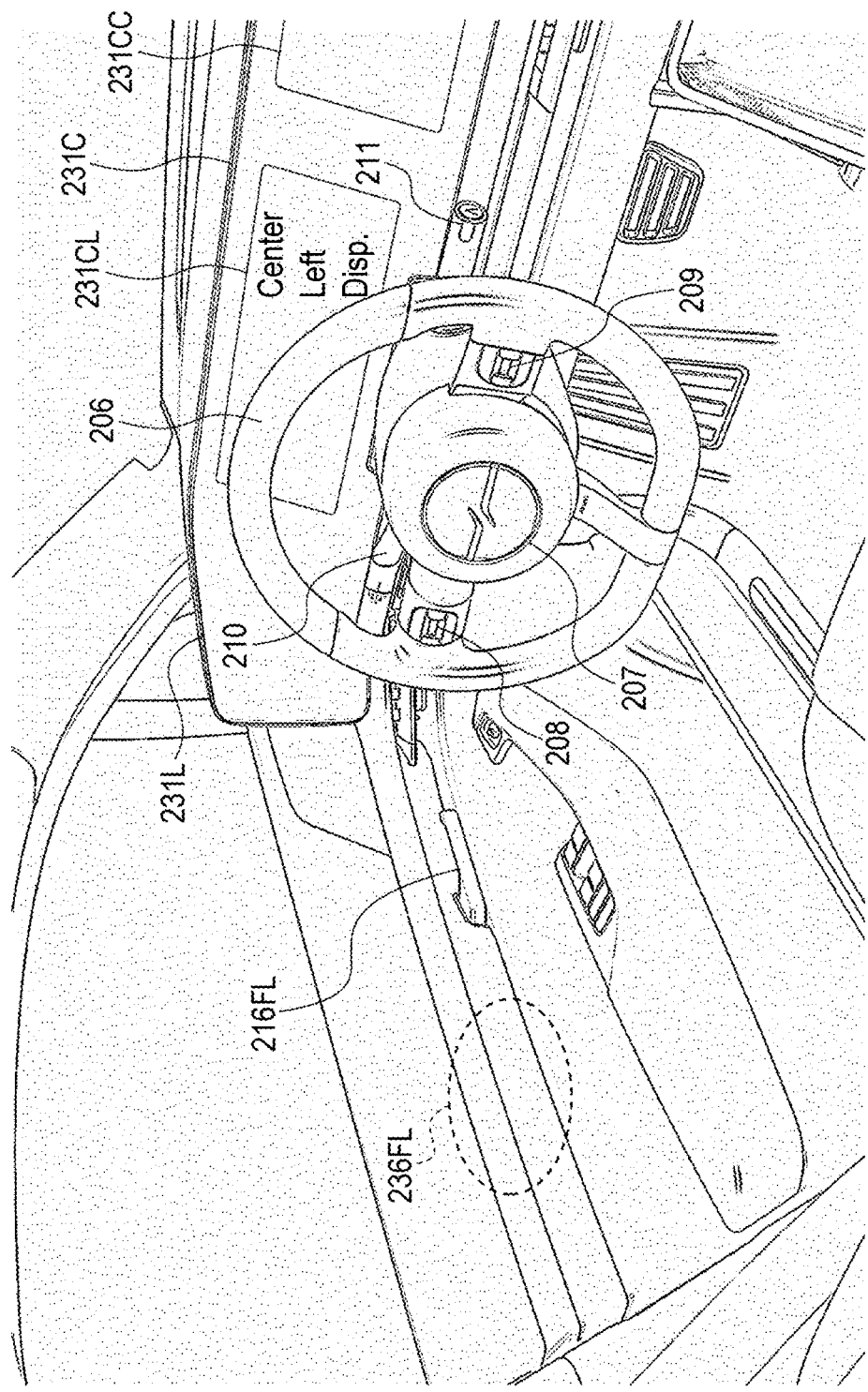
FIG. 14 is a schematic diagram illustrating a front of a driver's seat of the vehicle.
Figure 15:
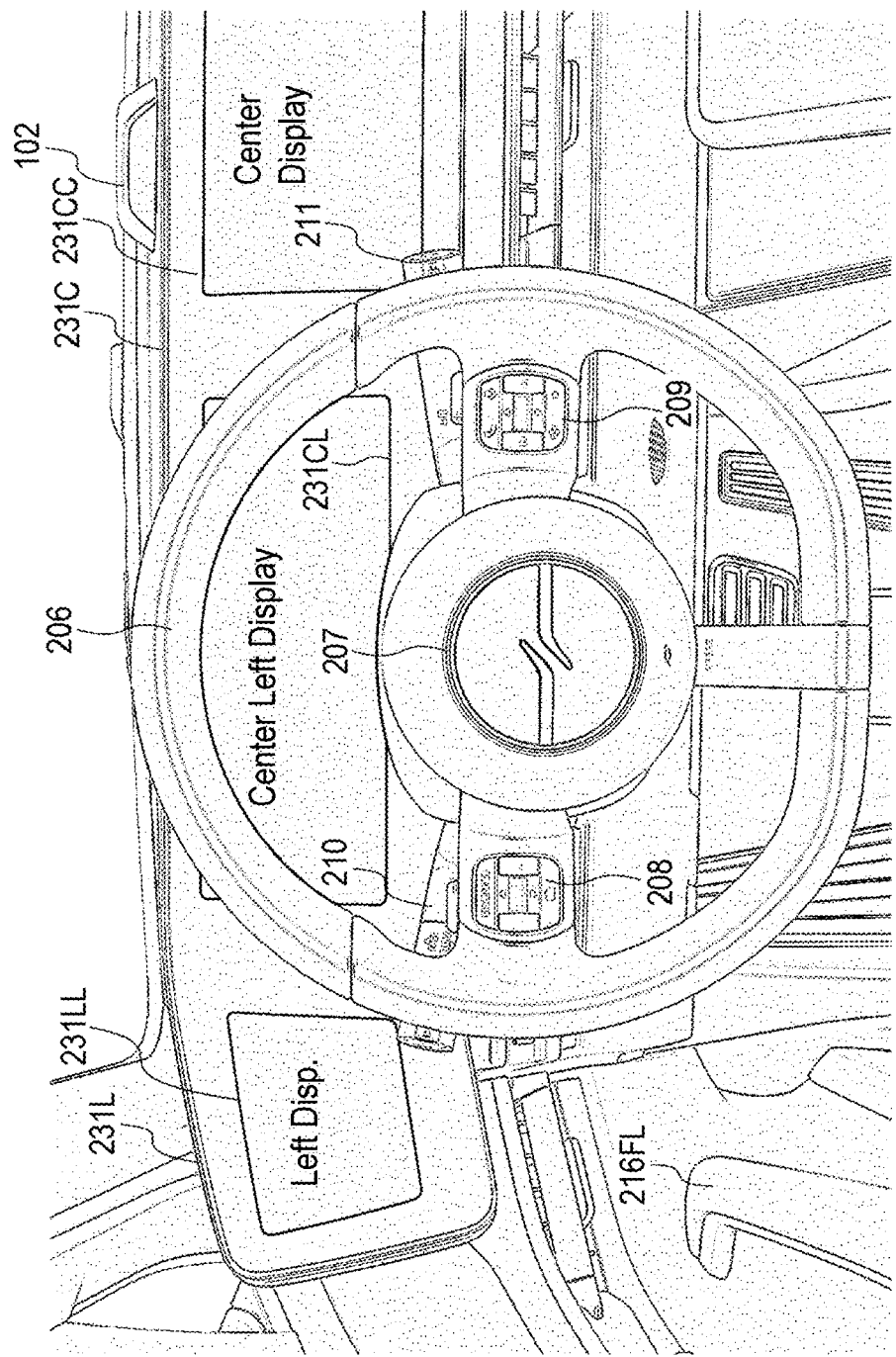
FIG. 15 is an enlarged diagram of the vicinity of a steering wheel of the vehicle.
Figure 16:
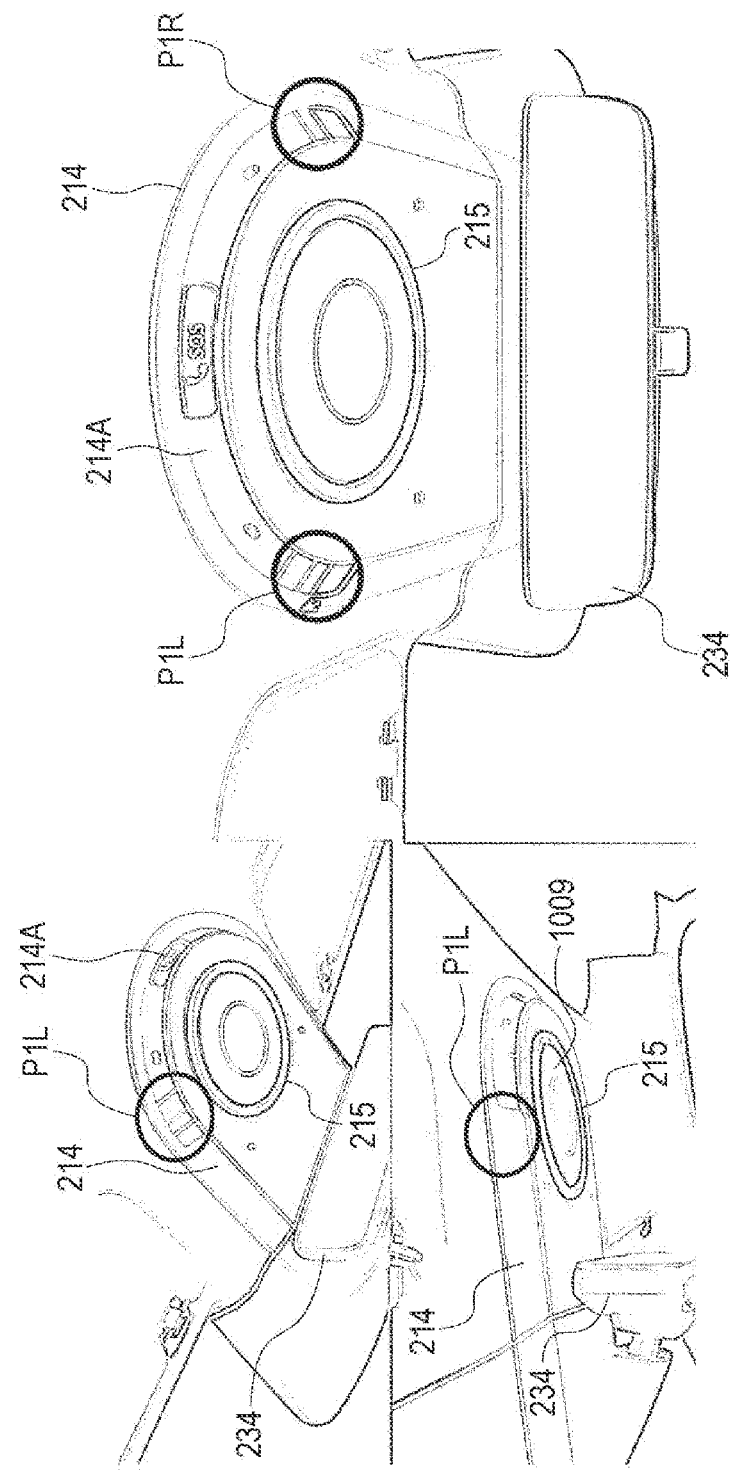
FIG. 16 is a diagram illustrating an example of an installation position of a ToF camera in the camera module.
Figure 17:
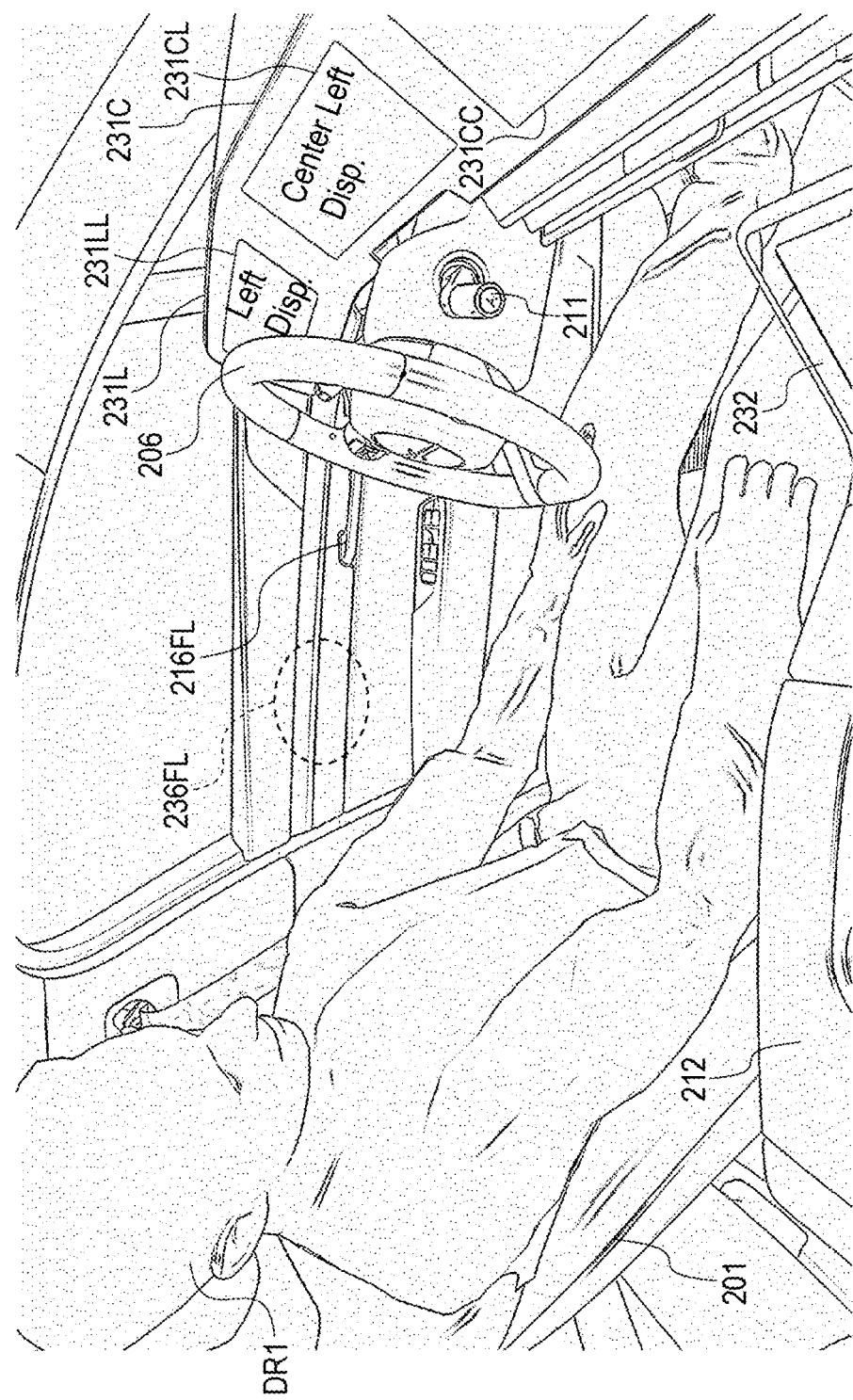
FIG. 17 is a diagram illustrating an example of an imaging range of the ToF camera.
Figure 18:
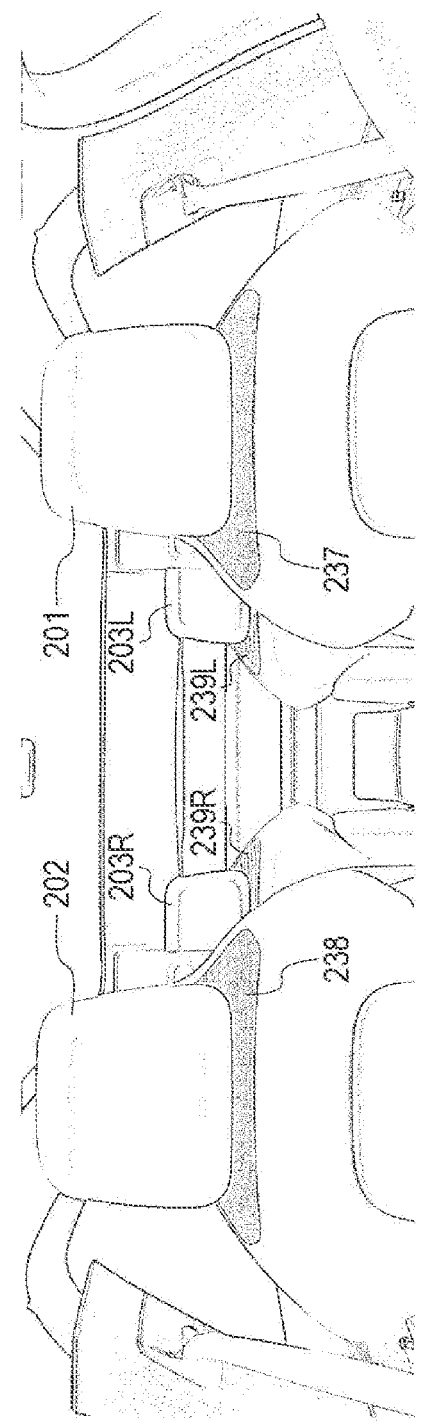
FIG. 18 is a schematic diagram of the interior of the vehicle as viewed from a front.
Figure 19:
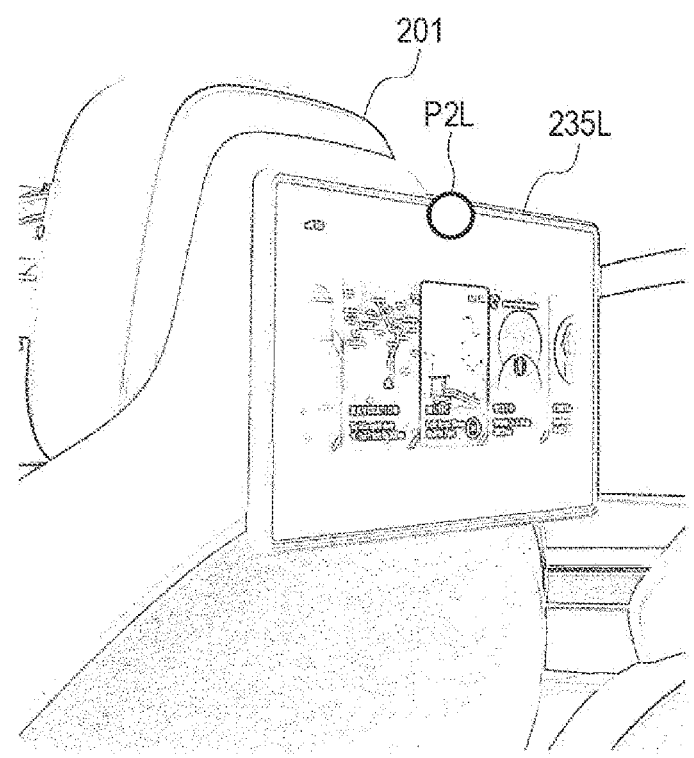
FIG. 19 is a schematic diagram of the driver's seat as viewed from diagonally rear left.

FIG. 12 is a schematic diagram of the inside of the vehicle 1 as viewed from the right. FIG. 13 is a schematic diagram illustrating the front of the interior of the vehicle 1. FIG. 14 is a schematic diagram illustrating the front of the driver's seat 201 in the interior of the vehicle 1. FIG. 15 is an enlarged diagram of the vicinity of a steering wheel 206 of the vehicle 1. FIG. 16 is a diagram illustrating an example of installation positions of the camera 101L and the camera 101R in the camera module 214. An upper left diagram in FIG. 16 is a schematic diagram of the camera module 214 as viewed from the obliquely lower left direction. A lower left diagram in FIG. 16 is a schematic diagram of the camera module 214 as viewed from the lower left direction. A right diagram in FIG. 16 is a schematic diagram of the camera module 214 as viewed from the front obliquely downward direction. FIG. 17 illustrates an example of the imaging range of the camera 101L. FIG. 18 is a schematic diagram of the interior of the vehicle 1 as viewed from the front. FIG. 19 is a schematic diagram of the driver's seat 201 as viewed from diagonally behind on the left.

<Example of Installation Position of Camera for Passenger>

First, an example of an installation position of a camera for a passenger of the vehicle 1 will be described.

As illustrated in FIGS. 13 and 15, the camera 102 is provided on a dashboard 205 slightly closer to the driver's seat 201 than the center in the left-right direction. The camera 102 has a shape in which a part of a truncated cone is vertically cut out, and includes a vertical flat portion on a side surface. The camera 102 has a flat portion of a side surface facing the direction of the driver's seat 201, and captures an image of a range including at least the head of the driver sitting on the driver's seat 201.

The camera 102 is a camera capable of capturing images by two types of imaging including RGB imaging (color imaging) and IR imaging (infrared imaging). The camera 102 automatically switches between RGB imaging and IR imaging on the basis of, for example, conditions such as ambient brightness. Furthermore, the camera 102 incorporates an LED that emits IR light (infrared light).

For example, in a bright environment such as daytime, the camera 102 automatically performs RGB imaging to acquire a color image. On the other hand, under a dark environment such as nighttime, the camera 102 automatically turns on the LED and automatically performs IR imaging to acquire a monochrome image. This makes it possible to reliably image a head of the driver regardless of the surrounding brightness.

For example, DMS 30 (FIG. 1) performs lip reading of the driver on the basis of the image of camera 102, and recognizes the utterance content of the driver. For example, the DMS 30 performs black eye detection, line-of-sight detection, awakening determination, recognition processing, and the like of the driver on the basis of the image of the camera 102.

As illustrated in FIGS. 13 and 16, the camera module 214 incorporating the camera 101L and the camera 101R is provided at the front end of the ceiling of the vehicle 1, at the center in the left-right direction, and in the vicinity of a digital rear mirror 234. The camera module 214 has a shape in which a half of a truncated cone is connected to a rear end (a rear side of the vehicle 1) of a shape obtained by obliquely cutting the left and right of a rectangular parallelepiped.

The camera 101L is incorporated at a position P1L near the left front end portion of the truncated cone portion of the camera module 214. The optical axis of the camera 101L is directed in a direction toward the middle of both eyes of the driver, for example, in a case where the driver with a standard physique sits on the driver's seat 201 arranged at a standard position.

FIG. 17 illustrates an example of the imaging range of the camera 101L. As illustrated in this example, regardless of the physique of the driver DR1 and the position of the driver's seat 201, the camera 101L can image almost the entire body from the head to the vicinity of the feet of the driver DR1 from the obliquely upper right direction.

The camera 101R is incorporated at a position P1R near the front end on the right side of the truncated cone portion of the camera module 214. Although not illustrated, similarly to the camera 101L, the camera 101R can image almost the entire body including from the head to the vicinity of the feet of the passenger from the obliquely upper left direction regardless of the physique of the passenger sitting on the passenger seat 202 and the position of the passenger seat 202.

A cover 214A subjected to black gloss processing is provided on a side surface of the truncated cone portion of the camera module 214. The cover 214A makes it difficult for the lenses of the camera 101L and the camera 101R to be seen from the outside. Furthermore, a camera or a sensor other than the camera 101L and the camera 101R can be provided on the back side of the cover 214A.

For example, the DMS 30 recognizes the posture and movement of the driver by performing skeleton recognition or the like of the driver on the basis of the image of the camera 101L. For example, the DMS 30 performs driver recognition processing (for example, personal recognition) on the basis of the image of the camera 101L.

Similarly, for example, the DMS 30 recognizes the posture and movement of the passenger by performing skeleton recognition or the like of the passenger on the passenger seat 202 on the basis of the image of the camera 101R. For example, the DMS 30 performs recognition processing of the passenger on the basis of the image of the camera 101L.

A circular light 215 is provided on the lower surface of the camera module 214. Furthermore, the camera module 214 incorporates a microphone (not illustrated) and the like for collecting voices and the like of passengers.

<Configuration Example Around Steering Wheel 206>

Next, a configuration example around the steering wheel 206 will be described.

As illustrated in FIG. 15, illumination 207 is provided in a central portion of the steering wheel 206. The illumination 207 includes a plurality of LEDs arranged in a ring shape inside by a predetermined distance from an outer periphery of a central portion of the steering wheel 206. Each LED can individually control on/off, color, brightness, and the like. Therefore, the color, brightness, and light emitting region (light emitting range) of the illumination 207 are variable. A logo of the vehicle 1 is formed inside the illumination 207.

Note that an airbag (not illustrated) is housed in a central portion of the steering wheel 206. The illumination 207 is disposed so as to avoid a portion where the central portion of the steering wheel 206 is divided when the airbag is in operation. This prevents fragments of the illumination 207 and harmful substances from scattering during operation of the airbag.

An operation unit 208 including a plurality of buttons is provided on a spoke on the left side of the steering wheel 206. An operation unit 209 including a plurality of buttons is provided on a spoke on the right side of the steering wheel 206.

As illustrated in FIG. 15, a stalk lever 210, which is a rod-like operation body, is provided at the back of the steering wheel 206 so as to extend leftward from a steering column (not illustrated). Furthermore, a stalk lever 211 which is a rod-like operation body is provided at the back of the steering wheel 206 so as to extend rightward from a steering column (not illustrated).

<Configuration Example of Display>

Next, a configuration example of a display in the interior of the vehicle 1 will be described.

In the interior of the vehicle 1, a center display 231, a console display 232, a head-up display (only the display 233 is illustrated), a digital rear mirror 234, a tablet terminal 235L, and a tablet terminal 235R are provided.

As illustrated in FIG. 13, the center display 231 is provided in front of the driver's seat 201 and the passenger seat 202 so as to extend left and right on the front surface of the dashboard 205. The center display 231 is largely divided into a left end portion 231L, a center portion 231C, and a right end portion 231R depending on the orientation of the display. That is, the center display 231 has a configuration in which the left end portion 231L, the center portion 231C, and the right end portion 231R having different orientations are continuous in the left-right direction and integrated. The left end portion 231L, the central portion 231C, and the right end portion 231R can be individually displayed independently, or can be displayed integrally.

In front of the driver's seat 201 and the passenger seat 202, the central portion 231C extends to the left and right from the vicinity of the left end of the driver's seat 201 to the vicinity of the right end of the passenger seat 202, and faces the rear (the rear of the vehicle 1) as viewed from the driver's seat 201 or the passenger seat 202.

For example, the central portion 231C displays information for assisting driving, an image around the vehicle 1, and the like. For example, the central portion 231C displays information regarding a traveling state or the like of the vehicle 1. For example, the central portion 231C displays an operation state of a direction indicator of the vehicle 1. For example, the central portion 231C displays the speed and the shift position of the vehicle 1. For example, the central portion 231C displays the remaining capacity of the battery of the vehicle 1. For example, the central portion 231C displays an image indicating a situation of a road ahead. For example, the central portion 231C displays information for assisting parking when the vehicle 1 is parked.

For example, the central portion 231C can display a part of an image of 360 degrees around the vehicle 1 captured by the camera 51FC1, the camera 51SL2, the camera 51SR2, and the camera 51BC1, and rotate a display range. For example, the central portion 231C displays a bird's-eye view image of the periphery of the vehicle 1 viewed from above obtained by combining the images of the camera 51FC1, the camera 51SL2, the camera 51SR2, and the camera 51BC1.

For example, the central portion 231C displays an image behind the vehicle 1 when the vehicle 1 moves backward. For example, in a case where the lane keep assist (LKA) function is operating when the vehicle 1 is backing up, the central portion 231C displays information indicating a predicted traveling direction.

Note that, in this example, the center portion 231C of the center display 231 is divided into a display unit 201CL in front of the driver seat 231, a display unit 201CC between the driver seat 231 and the passenger seat 202, and a display unit 202CR in front of the passenger seat 202. For example, it is also possible to configure one display unit by connecting the display units 231CL to 231CR. For example, it is also possible to configure one display unit by connecting the display unit 231CL and the display unit 231CC. For example, it is also possible to configure one display unit by connecting the display unit 231CC and the display unit 231CR. Then, the above-described display example can be displayed on any display unit of the central portion 231C.

Note that, for example, information mainly for the driver is displayed on the display unit 231CL. For example, information for assisting driving is displayed. For example, information related to infotainment (in-vehicle infotainment) such as audio, video, website, and map is displayed on the display unit 231CC. For example, infotainment-related information for the passenger on the passenger seat is displayed on the display unit 231CR.

The left end portion 231L and the right end portion 231R of the center display 231 are provided substantially symmetrically at left and right ends of the center display 231. The left end portion 231L is bent inward (vehicle interior side) at the left end of the center display 231, is angled in the vehicle interior direction with respect to the central portion 231C, and is directed obliquely rearward on the right (obliquely rearward on the right of the vehicle 1) as viewed from the driver's seat 201 or the passenger seat 202. The right end portion 231R is bent inward (vehicle interior side) at the right end of the center display 231, is angled in the vehicle interior direction with respect to the central portion 231C, and is directed obliquely rearward to the left (obliquely rearward to the left of the vehicle 1) as viewed from the driver's seat 201 or the passenger seat 202.

An angle of the left end portion 231L with respect to the central portion 231C is adjusted, for example, such that the reflection angle with respect to the angle of incidence on the left end portion 231L of the standard driver's line-of-sight faces an appropriate direction diagonally behind the left of the vehicle 1. An angle of the right end portion 231R with respect to the central portion 231C is adjusted, for example, such that the reflection angle with respect to the incident angle of the standard driver's line-of-sight to the right end portion 231R is directed in an appropriate direction diagonally behind the right of the vehicle 1.

The left end portion 231L is provided with a display unit 231LL. The right end portion 231R is provided with a display unit 231RR.

The left end portion 231L and the right end portion 231R of the center display 231 are mainly used as digital outer mirrors (electronic side mirrors) that are substitutes for the conventional side mirrors. That is, the left end portion 231L and the right end portion 231R are used for the CMS. For example, the display unit 231LL at the left end portion 231L displays an image of the left diagonal rear of the vehicle 1 captured by the camera 51SL4. The display unit 231RR of the right end portion 231R displays an image of the right diagonal rear of the vehicle 1 captured by the camera 51SR4.

Note that the left end portion 231L, the center portion 231C, and the right end portion 231R of the center display 231 are continuous in the horizontal direction. Therefore, in a case where the driver moves the line of sight from the central portion 231C to the left end portion 231L or the right end portion 231R or moves the line-of-sight from the left end portion 231L or the right end portion 231R to the central portion 231C, it is only necessary to move the line of sight in the horizontal direction. As a result, the moving distance and the moving direction of the line-of-sight of the driver are reduced, and the visibility is improved.

Furthermore, for example, the left end portion 231L displays an alert in a case where a vehicle, a motorcycle, a bicycle, a pedestrian, or the like approaching from the left side and the rear of the vehicle 1 is detected. Similarly, the right end portion 231R displays an alert in a case where a vehicle, a motorcycle, a bicycle, a pedestrian, or the like approaching from the right side and the rear of the vehicle 1 is detected.

Note that vehicles and the like approaching from the left and right sides and the rear of the vehicle 1 are detected by the recognition unit 73 on the basis of, for example, images (sensor data) from the camera 51SL2, the camera 51SL3, the camera 51SR2, the camera 51SR3, the camera 51BC1, and the camera 51BC3, sensor data from the radar 52BL, the radar 52BC, the radar 52BR, and the LiDAR 53B, and the like.

Note that since the left end portion 231L, the center portion 231C, and the right end portion 231R are connected to one, it is also possible to display one screen on the entire center display 231. For example, it is also possible to display an image around the vehicle 1, map information, infotainment-related information, or the like on the entire center display 231.

As illustrated in FIGS. 12 and 13, the console display 232 is provided on a console 212 provided between the driver's seat 201 and the passenger seat 202, and is disposed below the central portion 231C of the center display 231.

Specifically, the console 212 extends in the front-rear direction between the driver's seat 201 and the passenger seat 202. A distal end portion of the console 212 is inclined obliquely upward toward the front of the vehicle 1, and a console display 232 is provided.

The console display 232 is constituted by, for example, a two-dimensional or three-dimensional touch panel, and can be operated by touching or approaching a finger or the like. The console display 232 faces the rear of the vehicle 1. Furthermore, the console display 232 is directed obliquely upward at an angle substantially similar to that of the center portion 231C of the center display 231. As a result, a sense of unity in which the center display 231 and the console display 232 are continuous occurs. Furthermore, similarly to the center portion 231C of the center display 231, the visibility of the console display 232 is improved.

For example, the console display 232 displays an operation screen for operating air conditioning equipment in the vehicle. A passenger such as a driver operates an air conditioner in the vehicle using the displayed operation screen.

For example, the console display 232 displays an operation screen for operating the information displayed on the center display 231. For example, the passenger such as the driver uses the displayed operation screen to scroll, enlarge, reduce, and switch information (for example, a map or the like) displayed on the center portion 231C of the center display 231.

As described above, the center display 231 and the console display 232 have a sense of unity. Therefore, the passenger can operate the information displayed on the center display 231 using the operation screen of the console display 232 with a natural feeling, and the operability is improved.

For example, the console display 232 displays an operation screen for setting the display range of the display unit 231LL and the display unit 231RR of the center display 231. For example, the driver performs zoom-in, zoom-out, movement, and the like of the display ranges of the display unit 231LL and the display unit 231RR by using the displayed operation screen.

The intermediate portion of the console 212 is inclined obliquely downward toward the front of the vehicle 1 contrary to the distal end portion. A circular controller 213 is provided near the center of the intermediate portion. The inclination angle of the intermediate portion of the console 212 is set to an angle at which the driver can easily place his/her hand, thereby improving the operability of the controller 213.

The controller 213 can be pressed, rotated, or tilted in a predetermined direction (for example, front, rear, left, and right), for example, and is used for operating an audio system in a vehicle, for example. For example, when the controller 213 is pressed, music is played or stopped, and the volume is adjusted by turning the controller 213.

The rear end of the console 212 is, for example, substantially horizontal so that the driver can easily place his/her arms.

As illustrated in FIG. 13, the head-up display includes the display 233 provided in front of the driver's seat 201. For example, the display 233 may be configured by a part of a windshield 204, or may be provided separately from the windshield 204. In the latter case, for example, the display 233 is attached to the windshield 204. Then, the visual information is projected on the display 233 using the AR technology, so that the visual information is superimposed and displayed in the field of view of the driver.

The display 233 of the head-up display displays, for example, information for assisting driving. For example, the display 233 displays an alert according to the situation around the vehicle 1. For example, the display 233 displays information indicating a vehicle ahead to be followed during the operation of adaptive cruise control (ACC). For example, during the operation of the lane change assistance function, the display 233 displays a planned traveling route by an arrow or the like as necessary.

The digital rear mirror 234 is used instead of a conventional rear view mirror and is also referred to as a smart room mirror. As illustrated in FIG. 13, similarly to the conventional rearview mirror, the digital rear mirror 234 is provided at the upper end of the windshield 204 and slightly in front of the vicinity of the center, and is disposed above the center portion 231C of the center display 231.

The digital rear mirror 234 displays, for example, an image behind the vehicle 1 captured by the camera 51BC2. For example, in a case where another vehicle is approaching behind the vehicle 1, the digital rear mirror 234 displays an alert.

Furthermore, for example, the display range of the digital rear mirror 234 is adjusted on the basis of at least one of the line-of-sight direction or the posture of the driver. As a result, the range of the image displayed on the digital rear mirror 234 is appropriately adjusted according to the line-of-sight direction and the posture of the driver, similarly to the conventional physical room mirror.

As illustrated in FIG. 19, the tablet terminal 235L is provided on a back surface of the driver's seat 201, more specifically, on a back surface of a headrest of the driver's seat 201.

For example, the tablet terminal 235L presents infotainment-related information to the passenger on the back seat 203L, and accepts an operation on the presented information. Furthermore, for example, the tablet terminal 235L displays an alert at the time of emergency, danger, or the like.

Note that, although not illustrated, for example, the tablet terminal 235R similar to the tablet terminal 235L is provided on the back of the passenger seat 202.

Note that the display of the center display 231, the console display 232, the head-up display, the digital rear mirror 234, the tablet terminal 235L, and the tablet terminal 235R is controlled by, for example, a display control unit that is a part of the function of the HMI 31.

As described above, by displaying various types of information on each display in the vehicle, it is possible to improve the convenience of the passenger such as the driver. For example, it is possible to support driving of the vehicle 1, provide necessary information to the passenger, and entertain the passenger.

Note that, for example, as illustrated in FIG. 19, a ToF camera may be provided at a position P2L near the upper end and the center of the tablet terminal 235L. As a result, it is possible to recognize, for example, the passenger operating the tablet terminal 235L on the basis of the image captured by the ToF camera.

Note that a ToF camera can be similarly provided in the tablet terminal 235R.

<Installation Position of Speaker>

Next, an example of an installation position of a speaker inside the vehicle 1 will be described.

As illustrated in FIG. 12, the speaker 236FL is embedded in the vicinity of the rear of a door opener 216FL of the door 121FL on the driver's seat 201 side. Although not illustrated, the speaker 236FR is embedded in the vicinity of the rear of a door opener 216FR of the door 121FR on the passenger seat 202 side. A speaker 236BL is embedded near the center of a door 121BL on the back seat 203L side. Although not illustrated, a speaker 236BR is embedded near the center of a door 121BR on the back seat 203R side.

As illustrated in FIG. 18, a seat speaker 237 is embedded below a headrest of the driver's seat 201. A seat speaker 238 is embedded below a headrest of passenger seat 202. A seat speaker 239L is embedded in a left back seat 203L. A seat speaker 239R is embedded in the right back seat 203R.

Note that the shape of the seat and the position of the seat speaker are adjusted so that people of various heights (sitting heights) can clearly hear the sound of the seat speaker of each seat.

The speakers 236FL to 236BR embedded in the doors 121FL to 121BR are used, for example, to output sounds for the entire inside of the vehicle (all passengers in the vehicle). Furthermore, 360 degree real audio is realized by the speakers 236FL to 236FR. By realizing the 360 degree real audio, for example, it is possible to enjoy a moving image, music, and the like in the vehicle with realistic feeling sound. Furthermore, notification of the position of a dangerous object such as an obstacle existing around the vehicle 1 can be provided by the sound output direction.

On the other hand, the seat speaker of each seat is used, for example, to output a private sound mainly for individual passengers sitting on each seat. That is, the sounds output from the respective seat speakers are individually controlled.

Note that the arrangement of the speakers is an example and can be changed. For example, a speaker may be disposed on the dashboard 205 in front of vehicle 1.

<System Architecture of Vehicle 1>

Next, a system architecture of the vehicle 1 will be described with reference to FIGS. 20 and 21.

Figure 20:
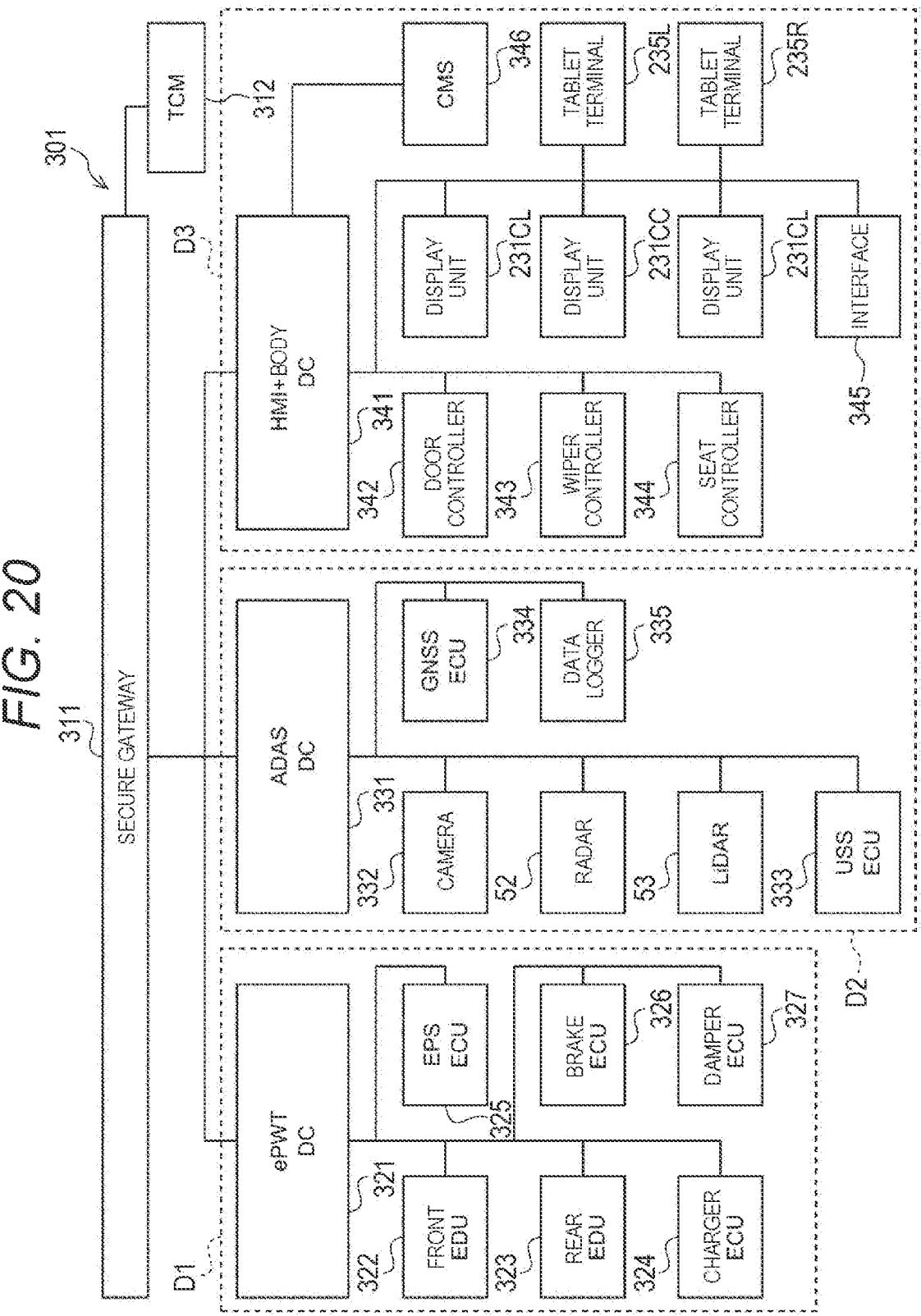
FIG. 20 is a block diagram illustrating a configuration example of an information processing system.

FIG. 20 illustrates a configuration example of an information processing system 301 illustrating an example of a system architecture of the vehicle 1.

The information processing system 301 is a system adopting a domain-type E/E (electrical/electronic) architecture.

In the information processing system 301, three domain controllers (DC), an ePWT (e-PoWer) domain controller (DC) 321, an ADAS domain controller (DC) 331, and an HMI+body domain controller (DC) 341 are connected to a secure gateway 311 via a network. Then, the information processing system 301 is divided into three domains D1 to D3 for each DC.

The ePWT DC 321 controls transfer and processing of data in the domain D1 including components and control components of the powertrain of the vehicle 1. For example, a front electric drive unit (EDU) 322, a rear EDU 323, a charger ECU 324, an electric power steering (EPS) ECU 325, a brake ECU 326, a damper ECU 327, and the like are connected to the ePWT DC 321 via a network.

The front EDU 322 is a unit that drives the front wheel of the vehicle 1.

The rear EDU 323 is a unit that drives rear wheels of the vehicle 1.

The charger ECU 324 controls a battery charger for driving the front EDU 322, the rear EDU 323, and the like.

The EPS ECU 325 controls electric power steering of the vehicle 1.

The brake ECU 326 controls a brake of the vehicle 1.

The damper ECU 327 controls a damper of the vehicle 1.

The ADAS DC 331 controls transfer and processing of data in the domain D2 including components that implement the ADAS of the vehicle 1. For example, a radar 52, a LiDAR 53, a camera 332, a USS (ultrasonic sensor) ECU 333, a GNSS ECU 334, a data logger 335, and the like are connected to the ADAS DC 331 via a network.

The camera 332 includes, for example, among the cameras 51 of the vehicle 1, cameras other than the camera 51SL4, the camera 51SR4, and the camera 51BC2 for the CMS.

The USS ECU 333 controls the ultrasonic sensor 54.

The GNSS ECU 334 controls the GNSS reception unit 24 and the like.

The data logger 335 records data related to the processing of the ADAS.

The HMI+body DC 341 controls transfer and processing of data in the domain D3 including components that realize the HMI of the vehicle 1 and components and control components of the body system of the vehicle 1. For example, the door controller 342, the wiper controller 343, the seat controller 344, the display units 231CL to 231CR of the central portion 231C of the center display 231, the tablet terminal 235L, the tablet terminal 235R, the interface 345, and the like are connected to the HMI+body DC 341 via a network. Furthermore, for example, a CMS 349 is connected to the HMI+body DC 341.

The door controller 342 controls the doors 121FL to 121BR of the vehicle 1.

The wiper controller 343 controls the wiper of the vehicle 1.

The seat controller 344 controls, for example, positions and postures of the driver's seat 201, the passenger seat 202, the back seat 203L, and the back seat 203R.

The interface 345 includes, for example, components and control components that perform various interfaces other than the display units 231CL to 231CR, the tablet terminal 235L, and the tablet terminal 235R. For example, the interface 345 includes speakers 236FL to 236BR, seat speakers 237 to 239R, and the like.

The CMS 346 includes, for example, components and control components of the CMS. The CMS 349 includes, for example, a camera 51SL4, a camera 51SR4, a camera 51BC2, and a display unit 231LL of the left end portion 231L and a display unit 231RR of the right end portion 231R of the center display 231.

Furthermore, a telematics computing unit (TCM) 312 that performs communication with the outside is connected to the secure gateway 311.

Figure 21:
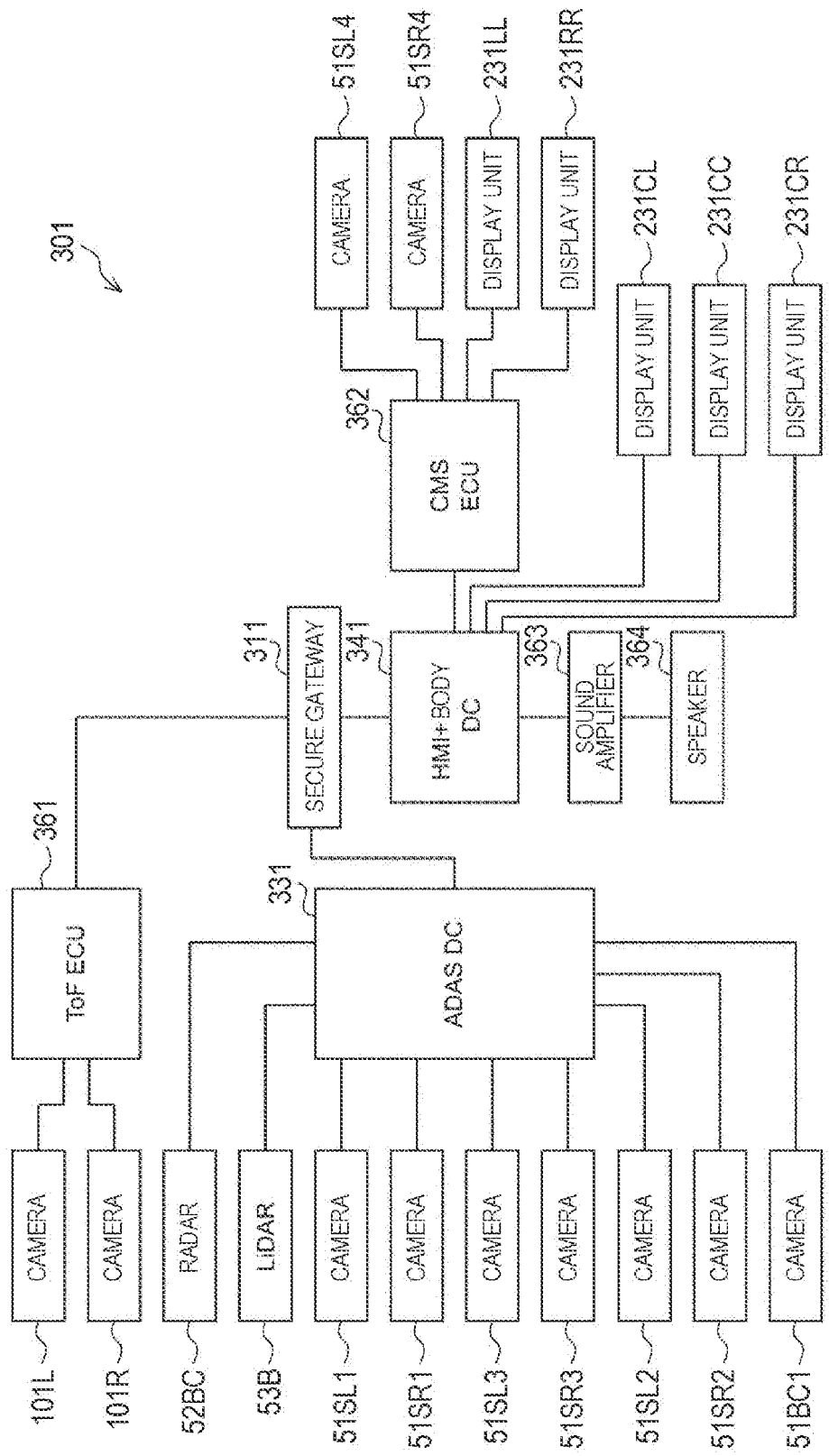
FIG. 21 is a block diagram illustrating a specific configuration example of the information processing system.

FIG. 21 illustrates a specific configuration example of portions mainly related to the CMS 349, the camera module 122L, and the camera module 122R in the information processing system 301.

The ADAS DC 331, the HMI+body DC 341, and a ToF ECU 361 are connected to the secure gateway 311. The secure gateway 311, the ADAS DC 331, the HMI+body DC 341, and the ToF ECU 361 are connected via, for example, Ethernet.

The ADAS DC 331 is connected with the cameras 51SL1 to 51SL3 included in the camera module 122L, the cameras 51SR1 to 51SR3 included in the camera module 122R, the camera 51BC1, the radar 52BC, and the LiDAR 53B.

A camera 101L and a camera 101R configured by a ToF camera are connected to the ToF ECU 361.

The CMS ECU 362, the display units 231CL to 231CR of the center display 231, and a sound amplifier 363 are connected to the HMI+body DC 341. The HMI+body DC 341 and the CMS ECU 362 are connected via, for example, a USB cable.

The camera 51SL4 included in the camera module 122L, the camera 51SR4 included in the camera module 122R, and the display unit 231LL and the display unit 231RR of the center display 231 are connected to the CMS ECU 362. That is, in the camera module 122L, the cameras 51SL1 to 51SL3 are connected to the ADAS DC 331 and belong to the domain D2, and the camera 51SL4 is connected to the HMI+body DC 341 via the CMS ECU 362 and belongs to the domain D3. Among the camera modules 122R, the cameras 51SR1 to 51SR3 are connected to the ADAS DC 331 and belong to the domain D2, and the camera 51SR4 is connected to the HMI+body DC 341 via the CMS ECU 362 and belongs to the domain D3.

A speaker 364 is connected to the sound amplifier 363.

As described above, the camera 51SL1 images an oblique front left of the vehicle 1.

As described above, the camera 51SL2 includes a fisheye camera, and images the left direction of the vehicle 1.

As described above, the camera 51SL3 images the left diagonal rear of the vehicle 1.

As described above, the camera 51SR1 images the diagonally right front of the vehicle 1.

As described above, the camera 51SR2 includes a fisheye camera, and images the right direction of the vehicle 1.

As described above, the camera 51SR3 images the right diagonal rear of the vehicle 1.

As described above, the camera 51BC1 includes a fisheye camera, and images the rear of the vehicle 1.

The radar 52BC performs sensing of the rear of the vehicle 1 as described above.

As described above, the LiDAR 53B performs sensing of the rear of the vehicle 1.

The ADAS DC 331 implements, for example, a part of the recognition unit 73 of the vehicle 1. For example, the ADAS DC 331 recognizes an object outside the vehicle 1 on the basis of sensor data from the cameras 51SL1 to 51SL3, the cameras 51SR1 to 51SR3, the camera 51BC1, the radar 52BC, and the LiDAR 53B. The ADAS DC 331 supplies data indicating the recognition result to another domain or the like via the secure gateway 311.

The ToF ECU 361 realizes, for example, a part of the recognition unit 73 of the vehicle 1. For example, the ToF ECU 361 recognizes the posture, movement, and the like of the driver on the basis of the image of the camera 101L. The ToF ECU 361 recognizes the posture, movement, and the like of the passenger on the passenger seat 202 on the basis of the image of the camera 101R. The ToF ECU 361 supplies data indicating a recognition result to another domain or the like via the secure gateway 311.

As described above, the camera 51SL4 images the left diagonal rear of the vehicle 1.

As described above, the camera 51SR4 images the right diagonal rear of the vehicle 1.

The CMS ECU 362 controls the CMS. For example, the CMS ECU 362 is a part of the function of the HMI 31, and implements a display control unit that controls the display of the display unit 231LL and the display unit 231RR. For example, the CMS ECU 362 controls display of an image by the display unit 231LL of the camera 51SL4. For example, the CMS ECU 362 controls display of the image of the camera 51SR4 by the display unit 231RR. For example, the CMS ECU 362 controls display of the visual effect by the display unit 231LL and the display unit 231RR based on the object recognition result by the ADAS DC 331.

For example, the HMI+body DC 341 realizes a display control unit that controls the display of the display unit 231CL to the display unit 231CR of the center display 231.

The speaker 364 includes, for example, the speakers 236FL to 236BR and the seat speakers 237 to 239R.

The sound amplifier 363 amplifies various sounds output from the speaker 364.

The HMI+body DC 341 is, for example, a part of the function of the HMI 31, and realizes a sound control unit that controls output of various sounds from the speaker 364.

As described above, in the vehicle 1, by adopting the domain-type E/E architecture, it is possible to suppress complication of the information processing system 301 and to further simplify the information processing system. As a result, the number of components and wiring in the vehicle can be reduced.

<Operation Example of CMS>

Next, an operation example of the CMS of the vehicle 1 will be described with reference to FIGS. 22 to 37. Specifically, a display example of the display unit 231LL of the left end portion 231L of the center display 231 will be described.

Note that the display control unit which is a part of the function of the HMI 31 displays an image based on the image of the camera 51SL4 on the display unit 231LL. More specifically, the display control unit sets the display range in the image of the camera 51SL4, and causes the display unit 231LL to display the image within the set display range.

The recognition unit 73 performs object recognition on the basis of sensor data or the like from the cameras 51SL1 to 51SL3, the cameras 51SR1 to 51SR3, the camera 51BC1, the radar 52BC, and the LiDAR 53B, and recognizes an object outside the vehicle 1. The display control unit controls the display of the display unit 231LL on the basis of the recognition result of the object, the state of the vehicle 1, and the like.

Figure 22:
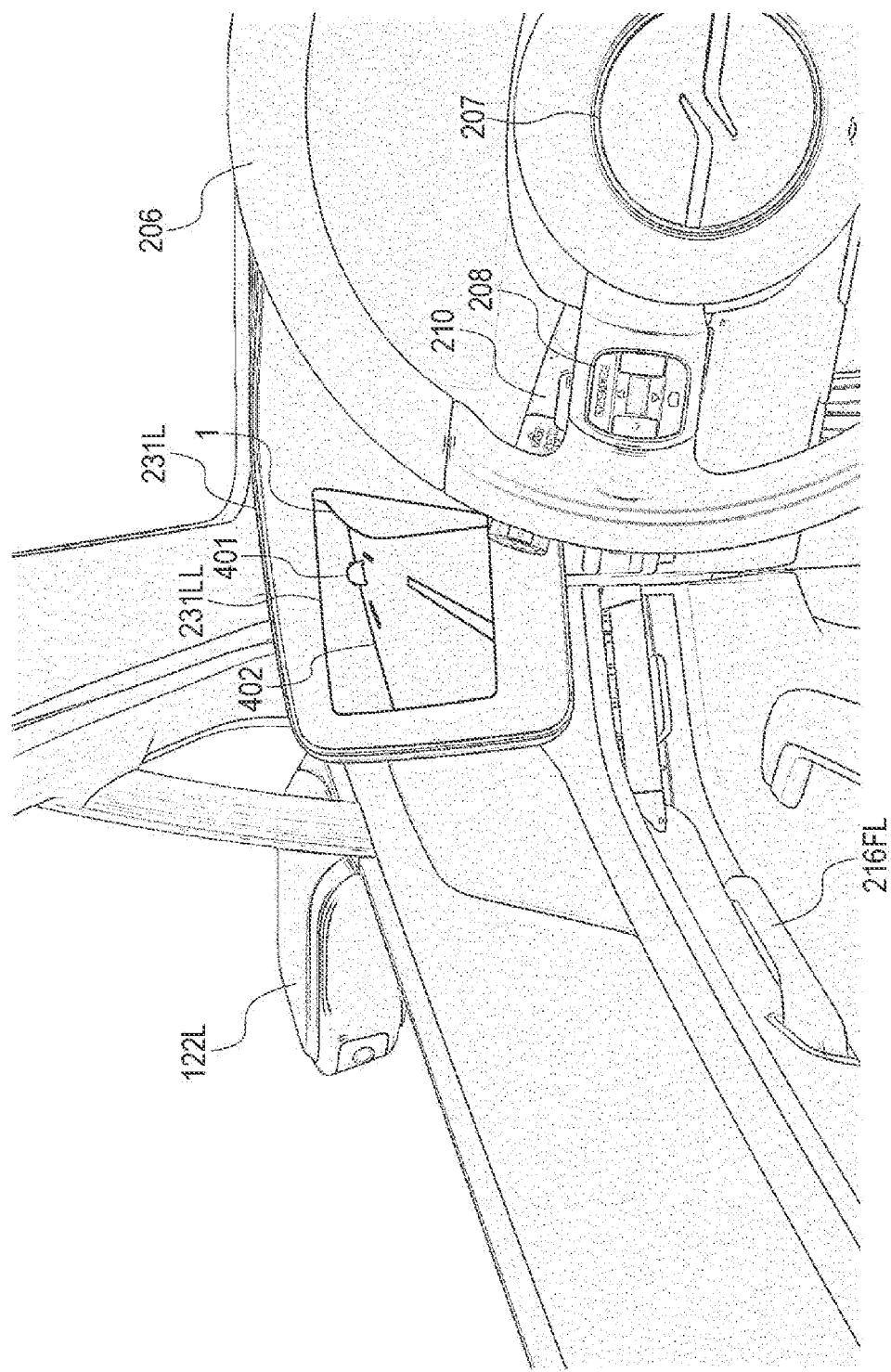
FIG. 22 is a diagram illustrating a display example of a display unit for a CMS in a normal state.

FIG. 22 illustrates a display example of the display unit 231LL at the normal time. In this example, a part of the body of the vehicle 1, a vehicle 401 that is a following vehicle traveling in the left adjacent lane on the left rear of the vehicle 1, and a road surface 402 are displayed.

Figure 23:
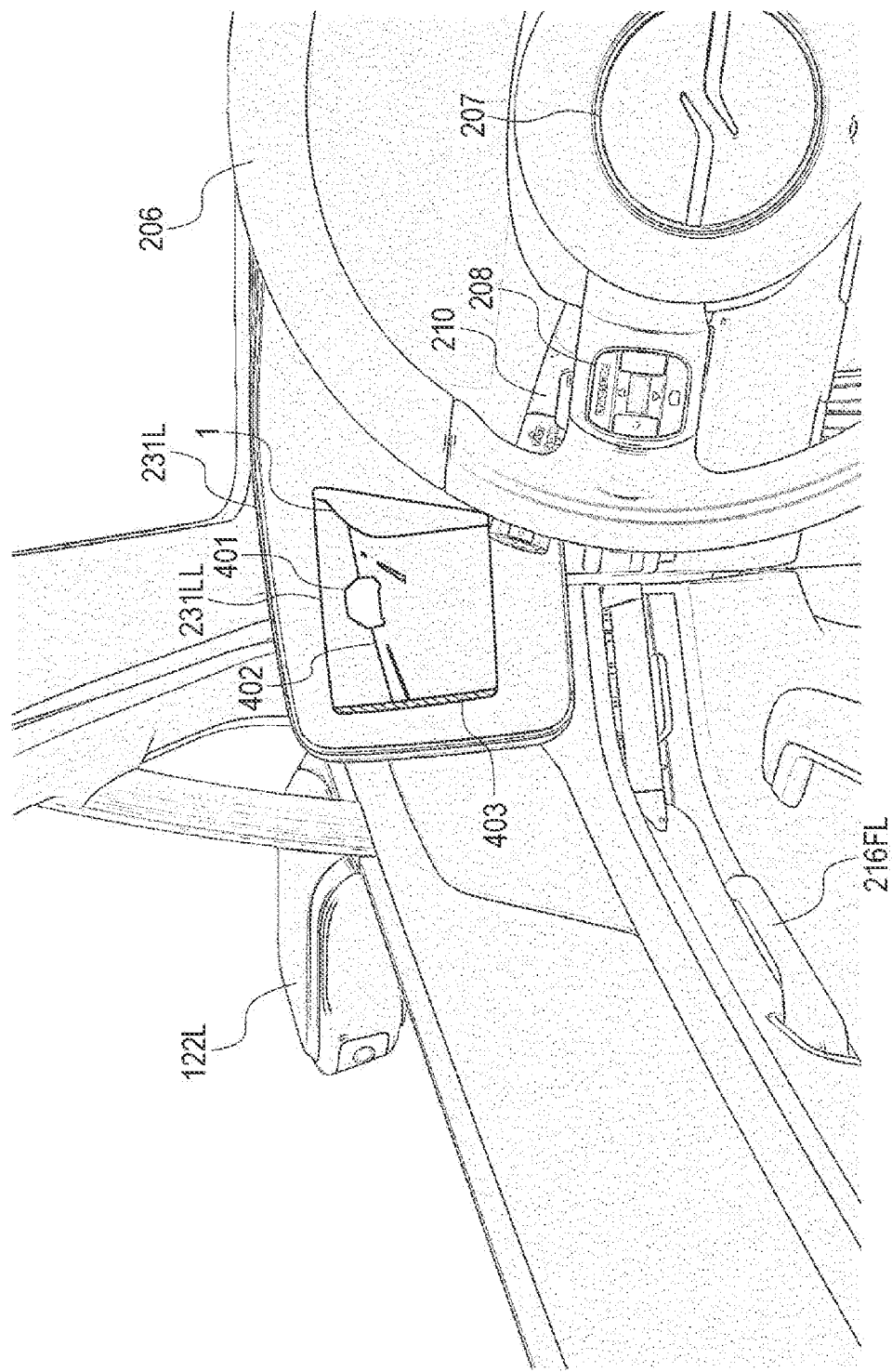
FIG. 23 is a diagram illustrating a display example of the display unit for the CMS when a vehicle in an adjacent lane approaches.

Then, for example, in a case where the vehicle 401 approaches the vehicle 1 and the distance between the vehicle 401 and the vehicle 1 falls within a predetermined range, a bar 403, which is a vertically long belt-shaped visual effect, is displayed superimposed on the left end of the display unit 231LL as indicated by hatching in FIG. 23. The bar 403 is displayed, for example, in a case where the vehicle 401 is within the range displayed on the display unit 231LL and the distance to the vehicle 1 is within a predetermined range. The color of the bar 403 is a conspicuous color, for example, yellow.

When the bar 403 is displayed, the driver is alerted, and an accident can be reliably prevented.

Note that the display mode such as the color, brightness, shape, blinking pattern, and movement of the bar 403 is not limited to this example, and can be arbitrarily changed. For example, the display mode of the bar 403 changes according to the risk level.

Figure 24:
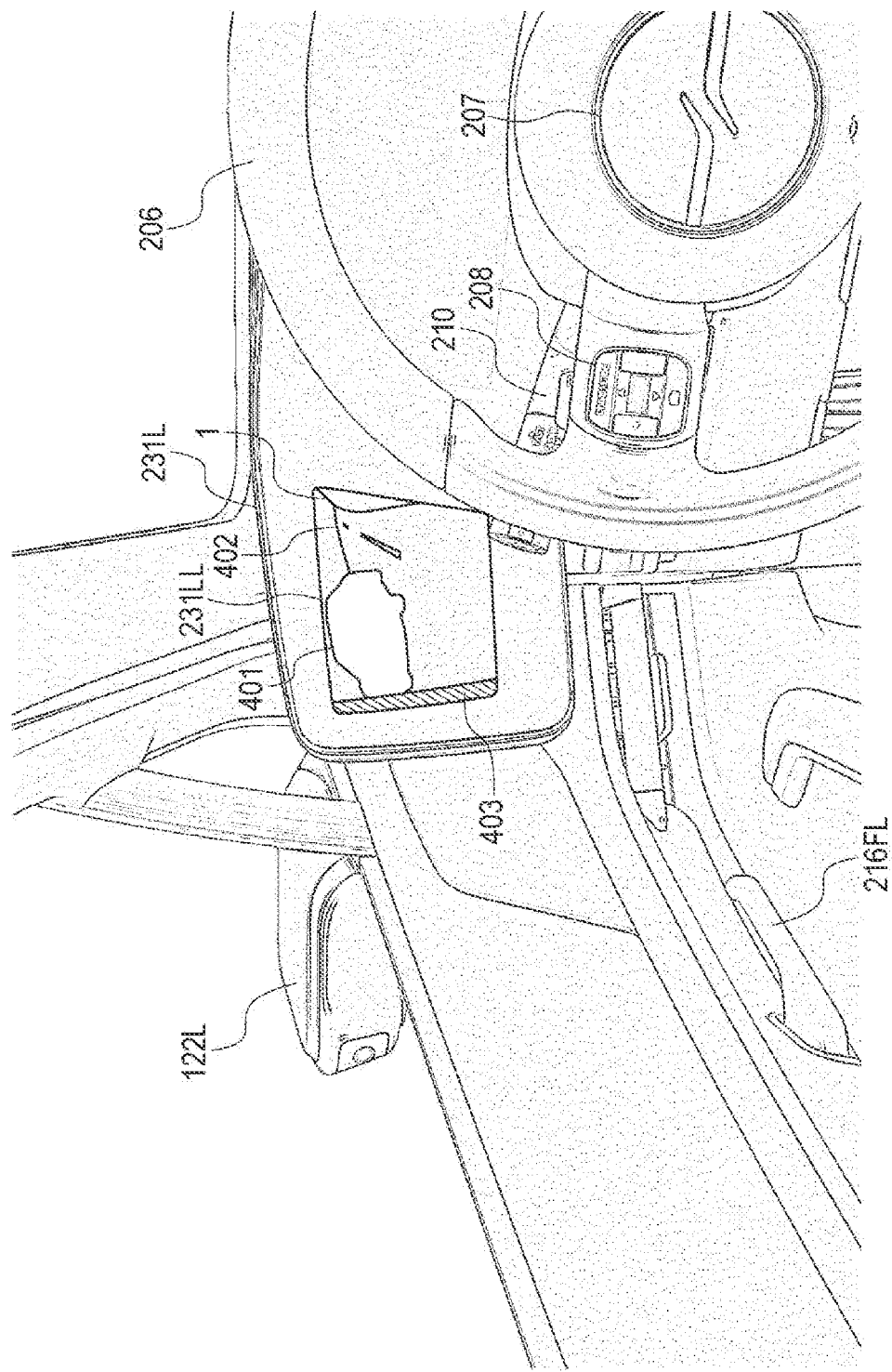

For example, in a case where the direction indicator in the left direction of the vehicle 1 is turned on, there is a possibility that the vehicle 1 makes a left turn (turn in the left direction) or a lane change to the left lane, and the risk of collision or contact with the vehicle 401 increases. On the other hand, for example, as illustrated in FIG. 24, the width of the bar 403 increases and blinks. Accordingly, attention of the driver is further attracted.

Moreover, for example, in a case where the direction indicator in the left direction of the vehicle 1 is turned on, the blinking speed of the bar 403 changes according to the risk level. For example, as the absolute speed of the vehicle 401 or the relative speed with respect to the vehicle 1 increases, the blinking speed of the bar 403 increases. For example, as the vehicle 401 approaches, in other words, the distance between the vehicle 401 and the vehicle 1 becomes shorter, the blinking speed of the bar 403 becomes faster. Note that, for example, a warning sound may be emitted in synchronization with the blinking of the bar 403.

For example, in a case where the absolute speed of the vehicle 401 or the relative speed with respect to the vehicle 1 is more than or equal to a predetermined threshold, the timing at which the bar 403 is displayed is advanced. That is, the bar 403 is displayed from the time when the vehicle 401 is located farther from the vehicle 1.

Figure 25:
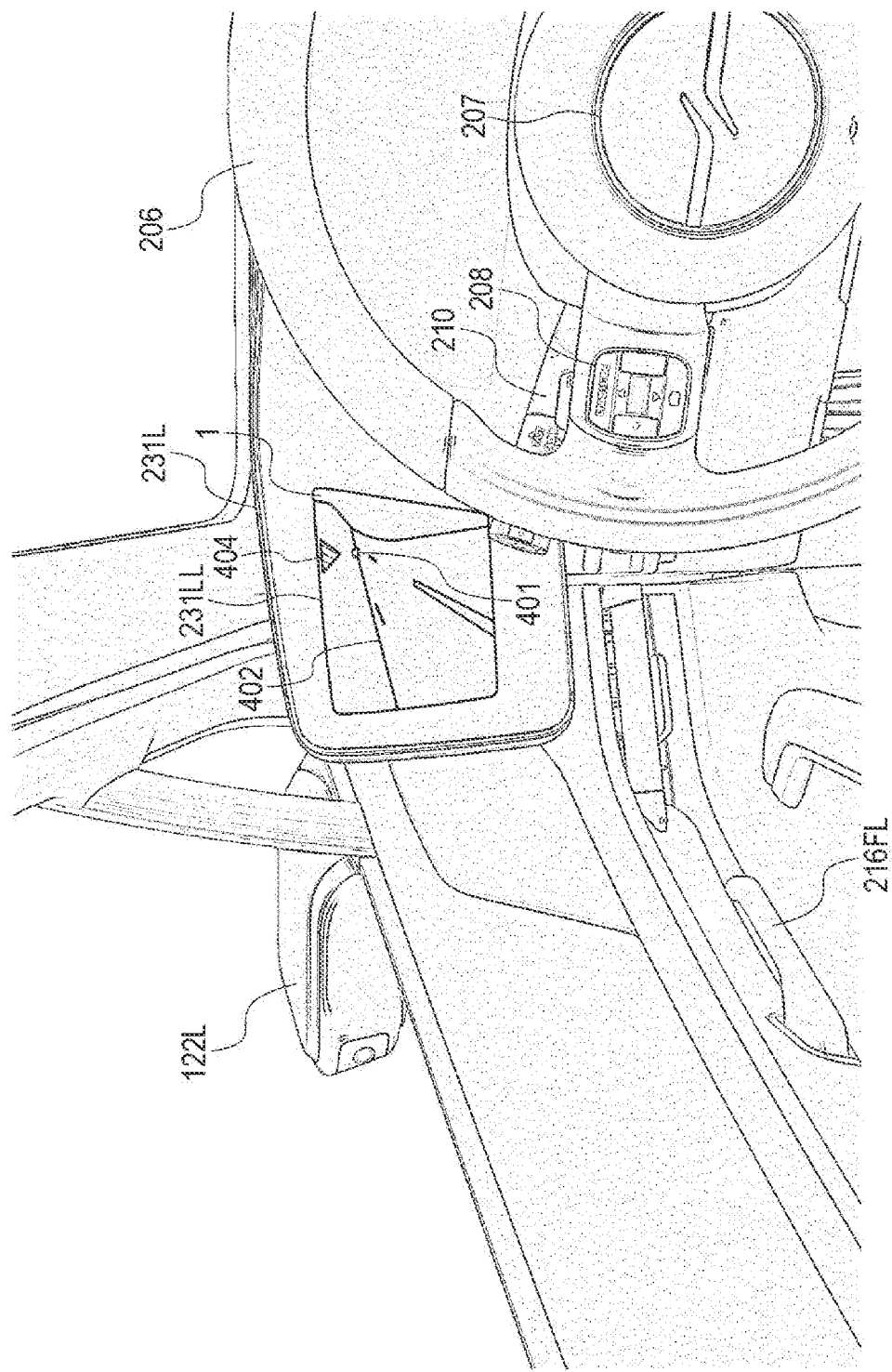
FIG. 25 is a diagram illustrating a display example of the display unit for the CMS when a vehicle in an adjacent lane approaches.

Furthermore, for example, as illustrated in FIG. 25, a mark 404, which is a triangular visual effect indicating the presence of the vehicle 401, may be superimposed and displayed near the vehicle 401 at a time point when the vehicle 401 diagonally behind the left is recognized. A mark 404 moves following the movement of the vehicle 401.

As a result, for example, even in a case where visibility of an image displayed on the display unit 231LL is poor due to fog, mist, or the like, the driver can reliably recognize the position of the vehicle 401.

Note that notification of the position of the vehicle 401 may be provided by a display mode different from the mark 404 in FIG. 25. For example, a frame surrounding the periphery of the vehicle 401 may be displayed.

Note that, although detailed description is omitted, similar display is also performed on the display unit 231RR of the right end portion 231R of the center display 231 on the basis of the state of the vehicle traveling in the right adjacent lane of the vehicle 1 and the operation of the direction indicator in the right direction.

Furthermore, in the above description, an example of calling attention to another vehicle has been described. However, similar processing is also performed in a case of calling attention to a moving object (for example, a motorcycle or the like) other than the vehicle.

Furthermore, for example, the display control unit controls the range of the image to be displayed on the display unit 231LL in accordance with the operation of the direction indicator.

Figure 26:
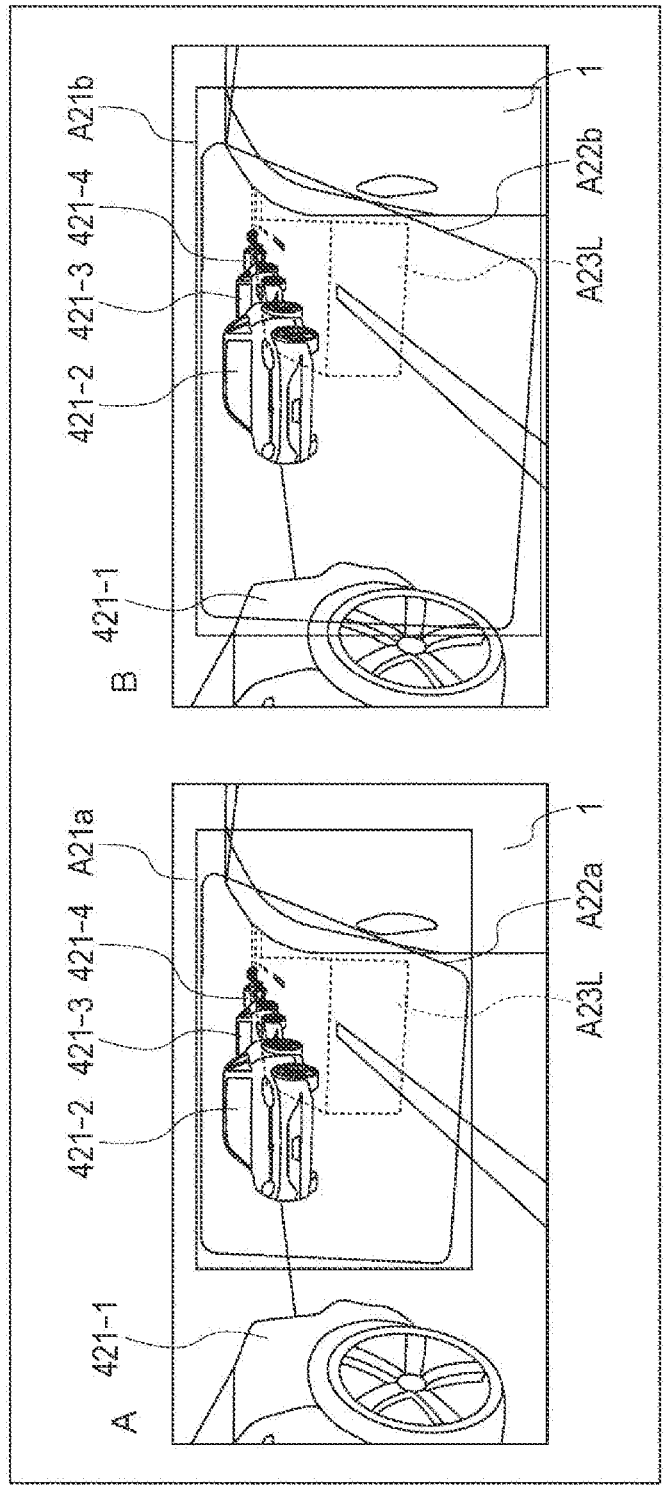

FIG. 26 illustrates an example in which the range of the image to be displayed on the display unit 231LL is changed in accordance with the operation of the direction indicator in the left direction.

Specifically, A and B of FIG. 26 illustrate examples of images captured by the camera 51SL4. In the image, vehicles 421-1 to 421-4 and the like traveling in the left lane of the vehicle 1 are shown.

For example, in a case where the left direction indicator of the vehicle 1 is turned off, the image in an area A21a in A of FIG. 26 is extracted, and the image in an area A22a is displayed on the display unit 231LL. The area A22a includes the vehicles 421-2 to 421-4 and does not include the vehicle 421-1.

On the other hand, in a case where the direction indicator in the left direction of the vehicle 1 is turned on, the image in an area A21b in B of FIG. 26 is extracted, and the image in an area A22b is displayed on the display unit 231LL. The area A21b and the area A22b are wider than the area A21a and the area A22a. That is, the display range of the display unit 231LL is zoomed out (expanded) and expanded. Then, in addition to the vehicle 421-2 to the vehicle 421-4, the rear end of the vehicle 421-1 is included in the area A22b.

As a result, when turning on the left direction indicator, the driver can check the situation of the lane on the left side of the vehicle 1 in a wider range. As a result, the driver can change lanes or turn left more safely.

Note that, for example, in a case where the display range of the display unit 231LL is zoomed out, an icon, a frame, or the like indicating zooming out may be displayed on the display unit 231LL.

Figure 27:
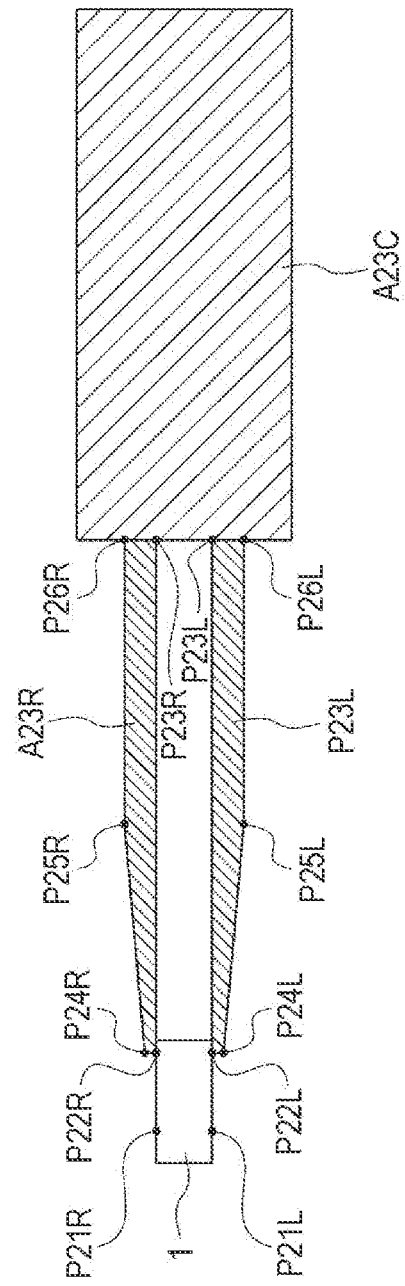
FIG. 27 is a diagram illustrating an example of an essential field of view.

Here, UN ECE-R46 (United States Economic Commission for Europe Regulation 46) defines a range of vision (Hereinafter, referred to as an essential visual field range) that is always visible in the CMS. The required field of view varies depending on the capacity, weight, and the like of the vehicle, and FIG. 27 illustrates an example thereof.

In this example, the essential field of view includes an area A23L, an area A23R, and an area A23C.

The area A23L is an area surrounded by points P22L to P26L on the left side of the vehicle 1. Specifically, a left end point of the vehicle 1 corresponding to the same position as the driver's eyes in the front-rear direction of the vehicle 1 is set as a reference point P21L. The point P22L is a point 4 m behind the reference point P21L. The point P23L is a point 60 m behind the reference point P21L. The point P24L is a point 1 m away from the point P22L in the left direction. The point P25L is a point 20 m behind the reference point P21L and 4 m away to the left. The point P26L is a point 60 m behind the reference point P21L and 4 m away to the left.

The area A23R is an area surrounded by points P22R to P26R on the right side of the vehicle 1. Specifically, a right end point of the vehicle 1 corresponding to the same position as the driver's eyes in the front-rear direction of the vehicle 1 is defined as a reference point P21R. The point P22R is a point 4 m behind the reference point P21R. The point P23R is a point 60 m behind the reference point P21R. The point P24R is a point separated 1 m rightward from the point P22R. The point P25R is a point 20 m behind the reference point P21R and 4 m away to the right. The point P25R is a point 60 m behind the reference point P21R and 4 m away to the right.

The area A23C is a region that is 60 m or more away rearward from the position of the driver's eyes of the vehicle 1 and has a width of 20 m centered on the center in the left-right direction of the vehicle 1.

Therefore, for example, as illustrated in FIG. 26, in a case where the display range of the display unit 231LL is changed according to the operation of the direction indicator in the left direction, the display range is changed so as to always include the area A23L.

Note that, although not described in detail, the display unit 231RR of the center display 231 also controls the similar display range according to the operation of the direction indicator in the right direction. Furthermore, the display range of the display unit 231RR is changed so that the area A23R is always included.

Furthermore, for example, the display control unit controls the display range of the display unit 231LL on the basis of the shift position of the vehicle 1.

Figure 28:
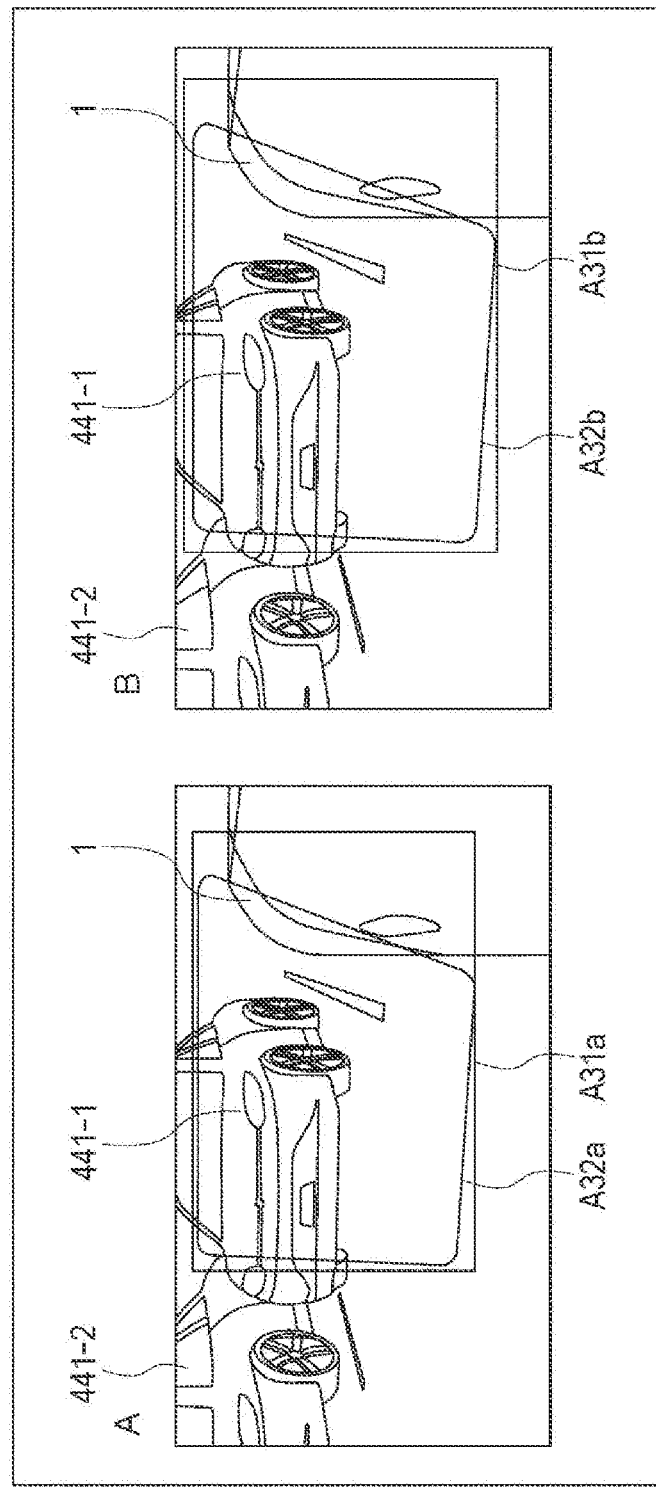
FIG. 28 is a diagram for explaining an example of changing a display range of the display unit for the CMS on the basis of a shift position.

FIG. 28 illustrates an example in which the display range of the display unit 231LL is changed on the basis of the shift position of the vehicle 1.

Specifically, A and B of FIG. 28 illustrate examples of images captured by the camera 51SL4. In the image, a vehicle 441-1 and a vehicle 441-2 parked side by side on the left and right of the vehicle 1 are shown.

For example, before the shift position of the vehicle 1 is set to reverse, the image in an area A31a in A of FIG. 28 is extracted, and the image in an area A32a is displayed on the display unit 231LL.

On the other hand, after the shift position of the vehicle 1 is set to reverse, the image in an area A31b in B of FIG. 28 is extracted, and the image in an area A32b is displayed on the display unit 231LL. The area A31b and the area A32b are wider than the area A31a and the area A32a. That is, the display range of the display unit 231LL is zoomed out and expanded. At this time, for example, the display range of the display unit 231LL may automatically move downward so that the ground around the vehicle 1 is displayed wider.

Note that, although not described in detail, the display range of the display unit 231RR of the center display 231 is changed similarly to the display unit 231LL on the basis of the shift position of the vehicle 1.

As a result, the driver can check the situation on the left diagonal rear side of the vehicle 1 in a wider range. As a result, the driver can park the vehicle 1C more safely.

Furthermore, for example, the driver can set the display ranges of the display unit 231LL and the display unit 231RR by operating the operation screen displayed on the console display 232 illustrated in FIG. 13 and the like. For example, the driver can individually move the display range of the display unit 231LL and the display range of the display unit 231RR, or individually set a zoom ratio (Zoom Factor) for each display range.

Figure 29:
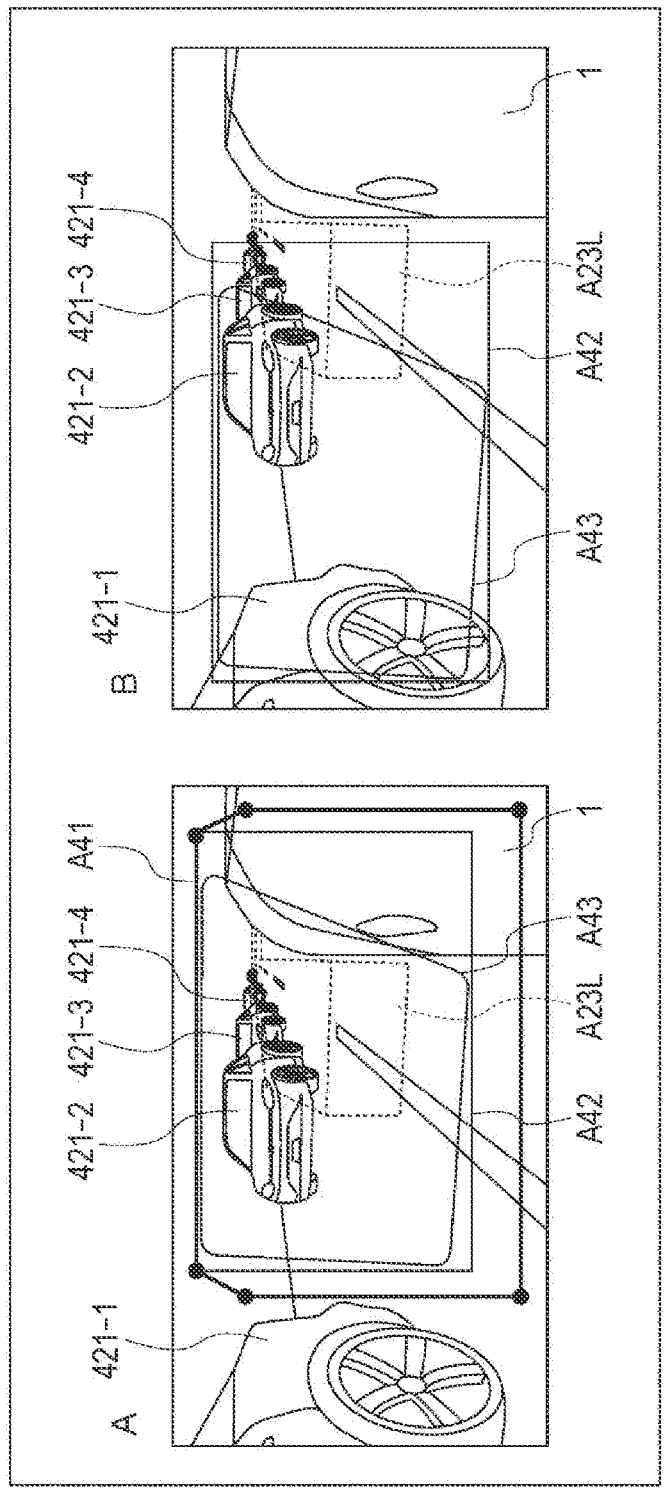
FIG. 29 is a diagram for explaining a method of setting a display range of the display unit for the CMS.

Here, the display range can be set within a settable range A41 illustrated in FIG. 29. Note that, in FIG. 29, portions corresponding to those in FIG. 26 are denoted by the same reference numerals, and the description thereof will be omitted as appropriate.

For example, the size of the extraction range A42 extracted for display from the captured image is set on the basis of the set zoom ratio. That is, zoom-in (reduction) and zoom-out (expansion) of the extraction range A42 are performed on the basis of the zoom ratio. Then, an image within a predetermined display range A42 within the extraction range A43 is displayed on the display unit 231LL.

At this time, the display range A43 can be moved within the settable range A41. The settable range A41 is set to a range in which an area A23L is included in the display range A43.

On the other hand, for example, as illustrated in B of FIG. 29, in a case where the area A23L protrudes from the display range A43, a warning is issued to the driver. For example, a warning message is displayed on the display unit 231LL, and a warning sound is output.

Alternatively, for example, the movement range of the display range A43 may be limited so that the display range A43 does not go out of the settable range A41 regardless of the operation of the driver.

In this manner, by operating the console display 232, the driver can move the display range A43 to his/her desired position or zoom in or out the display range A43 within a range including the area A23L. Furthermore, the driver can adjust the display range A43 without diverting the line-of-sight, for example, by moving or clicking a finger on the console display 232 while maintaining the driving posture.

Furthermore, for example, in the case of a physical side mirror, the driver can change the range seen through the side mirror by bringing his/her face close to the side mirror and looking into the side mirror. For example, the driver sometimes checks the presence or absence of an obstacle on the ground around the vehicle by looking into the side mirror during parking or the like.

On the other hand, the display area of the display unit 231LL can be similarly changed by the driver moving his/her face close to the display unit 231LL and looking into the display unit.

For example, the DMS 30 detects the position and orientation of the head of the driver by performing skeleton recognition or the like of the driver on the basis of the image of the camera 101L. The DMS 30 detects an angle at which the driver looks into the display unit 231LL in a case where the driver recognizes the action of looking into the display unit 231LL on the basis of the position and orientation of the head of the driver.

On the other hand, in a case where the vehicle 1 is stopped, that is, in a case where the speed of the vehicle 1 is 0, the display control unit controls the display range of the display unit 231LL on the basis of the angle at which the driver looks into the display unit 231LL.

Figure 30:
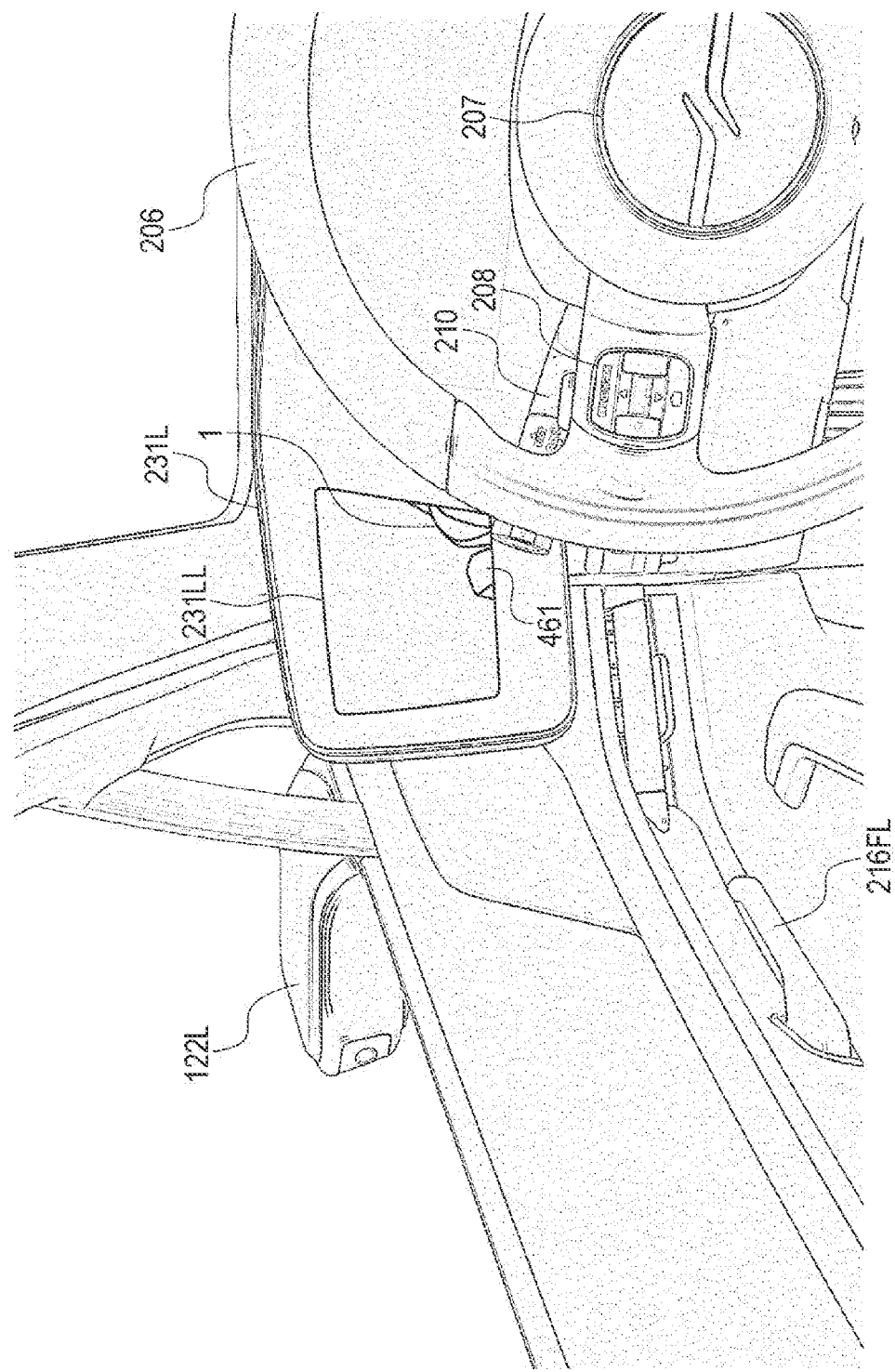
FIG. 30 is a diagram for explaining a display range in a case of looking into the display unit for the CMS.

For example, FIG. 30 illustrates a display range of the display unit 231LL before the driver looks in. In this example, a part of the body of the vehicle 1 is displayed in the lower right corner of the display unit 231LL. Furthermore, a part of the upper portion of an object 461 on the left rear of the vehicle 1 is displayed.

Figure 31:
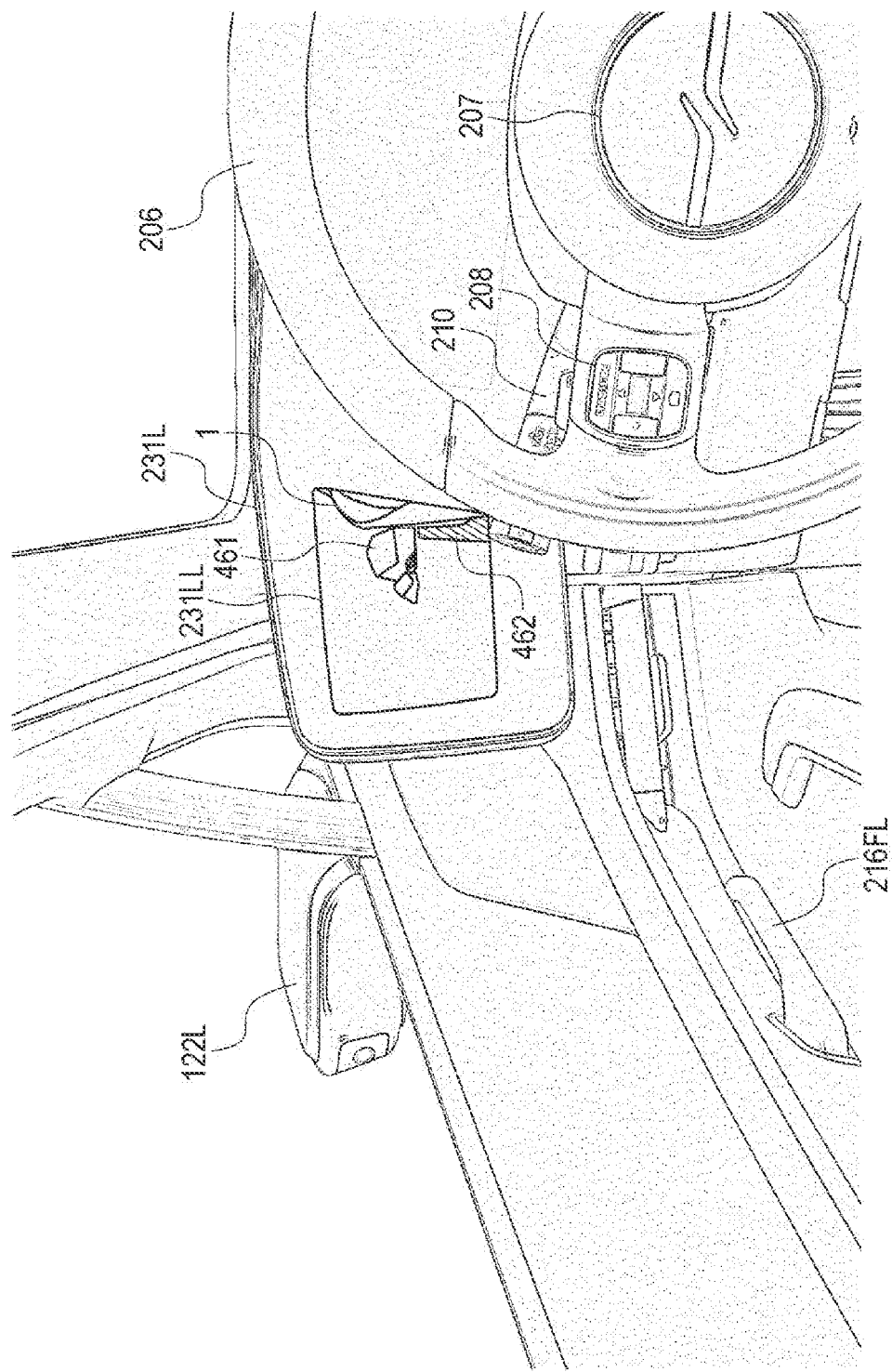
FIG. 31 is a diagram for explaining a display range in a case of looking into the display unit for the CMS.

In this case, for example, in a case where the driver performs an operation of looking into the display unit 231LL from obliquely above, the display range of the display unit 231LL changes as illustrated in FIG. 31. Specifically, the display range of the display unit 231LL moves downward. As a result, the lower portion of the object 461 is also displayed on the display unit 231LL, and the driver can visually recognize the entire object 461.

Furthermore, as indicated by hatching in the figure, a line 462, which is a band-shaped visual effect indicating a region of the ground within a predetermined range around the vehicle 1, is displayed in a superimposed manner and blinks. As a result, the driver can quickly recognize an object with which the vehicle 1 may collide or come into contact, and move the vehicle 1 while avoiding the recognized object.

Figure 32:
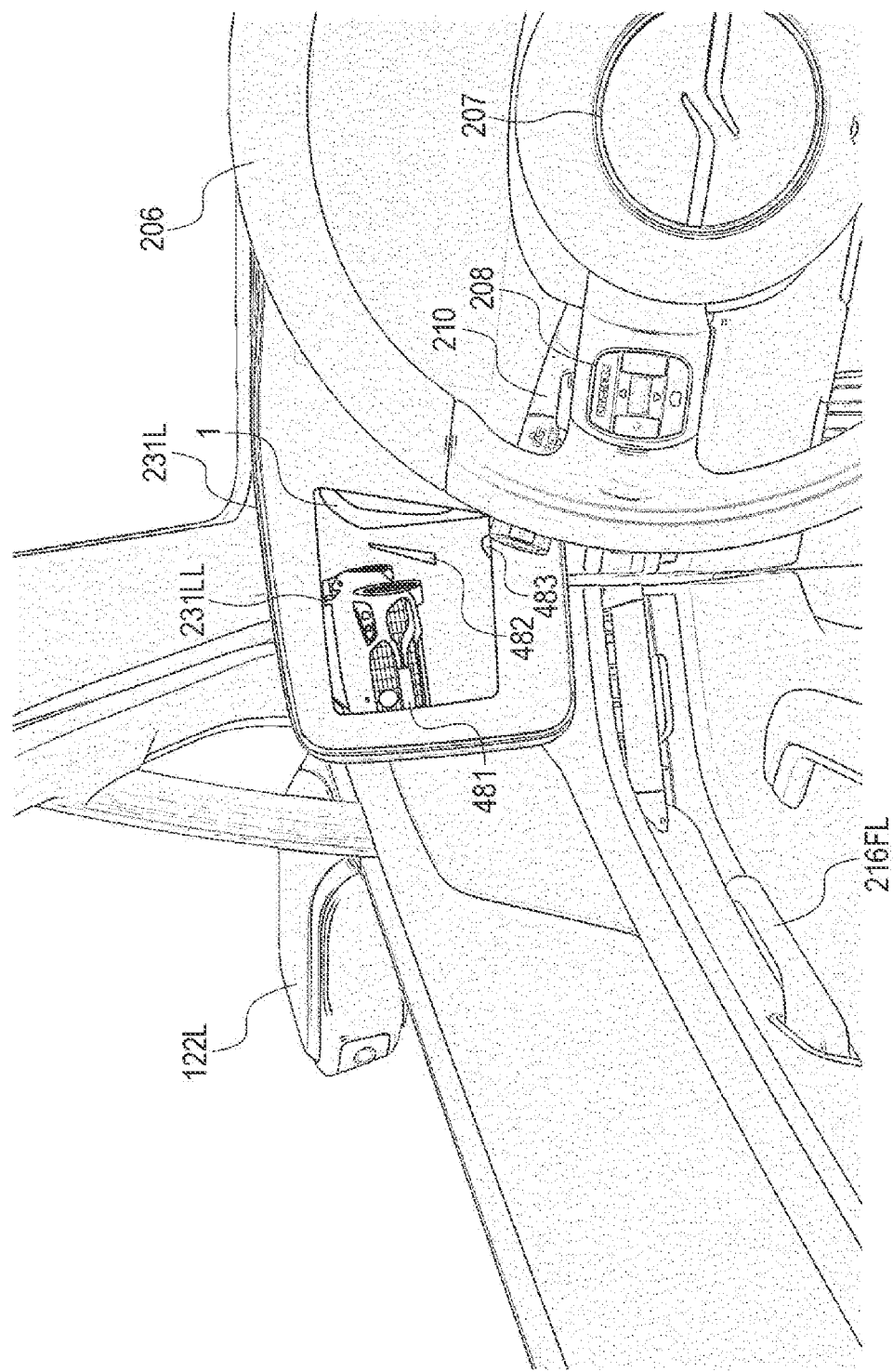

Furthermore, for example, FIG. 32 illustrates a display range of the display unit 231LL before the driver looks in. In this example, a part of the body of the vehicle 1 is displayed at the right end of the display unit 231LL. A part of a left rear vehicle 481 is displayed on the upper left of the display unit 231LL. A parking line 482 is displayed between the vehicle 1 and the vehicle 481. The upper end of the object 483 is displayed on the left of the vehicle 1 and at the lower end of the display unit 231LL.

Figure 33:
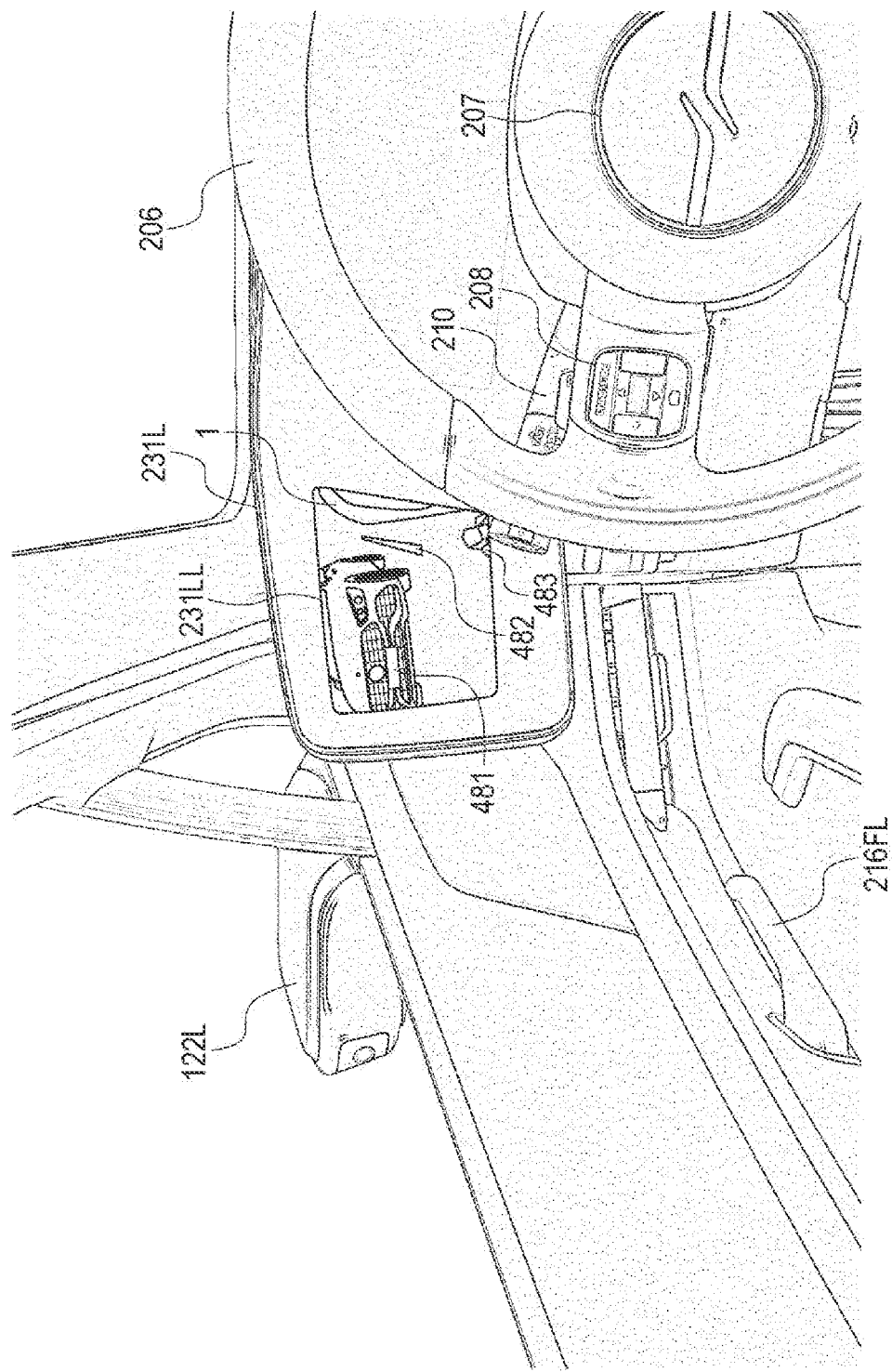

Here, for example, in a case where the driver sets the shift position to the reverse position in order to park the vehicle 1, the display range of the display unit 231LL is zoomed out as described above with reference to FIG. 28. As a result, as illustrated in FIG. 33, the display range of the display unit 231LL is widened, and the range in which the vehicle 1, the vehicle 481, and an object 483 are displayed is widened.

Figure 34:
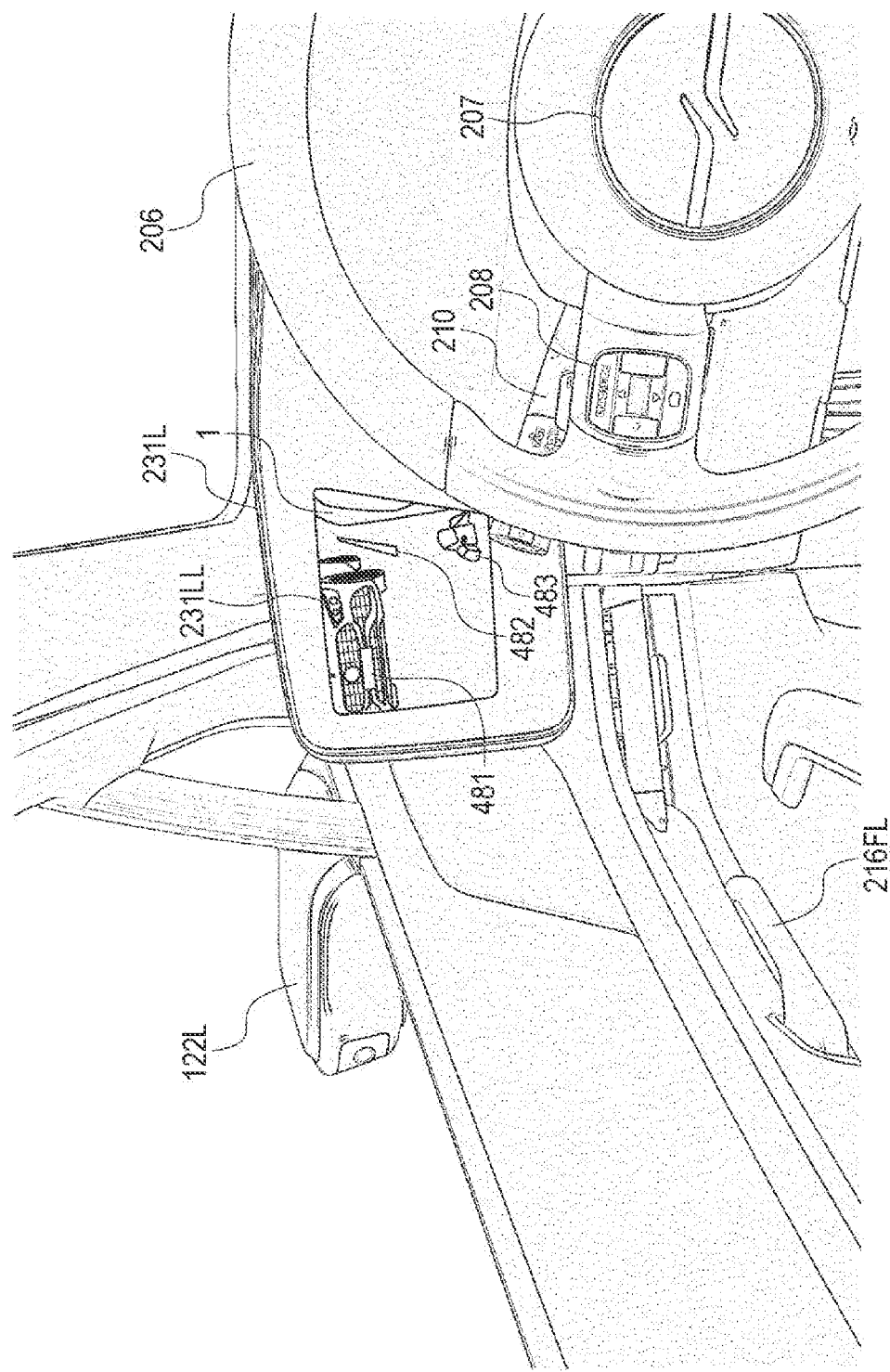

Moreover, for example, in a case where the driver performs an operation of looking into the display unit 231LL from obliquely above, the display range of the display unit 231LL moves downward as illustrated in FIG. 34. As a result, the entire object 483 is displayed on the display unit 231LL. As a result, the driver can park the vehicle 1 while reliably avoiding the object 483.

Note that, although detailed description is omitted, the display range moves similarly to the display unit 231LL even in a case where the driver looks into the display unit 231RR of the center display 231.

Note that, in a case where the vehicle 1 is moving, that is, in a case where the speed of the vehicle 1 is not 0, the display range does not change even if the driver looks into the display unit 231LL and the display unit 231RR.

Furthermore, for example, even in a case where the driver brings his/her face close to the digital rear mirror 234 and looks into the digital rear mirror, the display range of the digital rear mirror 234 moves.

For example, in a case where the DMS 30 recognizes a motion of the driver looking into the digital rear mirror 234 on the basis of the position and orientation of the head of the driver, the DMS detects an angle of the driver looking into the digital rear mirror 234.

On the other hand, in a case where the vehicle 1 is stopped, that is, in a case where the speed of the vehicle 1 is 0, the display control unit controls the display range of the digital rear mirror 234 on the basis of the angle at which the driver looks into the digital rear mirror 234.

Furthermore, for example, the DMS 30 detects the movement of the left hand of the driver by performing skeleton recognition or the like of the driver on the basis of the image of the camera 101L. The recognition unit 73 detects an object around the door 121FL of the driver's seat 201 outside the vehicle 1 on the basis of images of the camera 51SL2, the camera 51SL3, and the like. Then, in a case where an object is detected in a predetermined range around the door 121FL of the driver's seat 201, in a case where the driver performs an operation of opening the door 121FL, for example, in a case where the left hand of the driver touches the door opener 216FL of the door 121FL, the display unit 231LL displays a warning.

Figure 35:
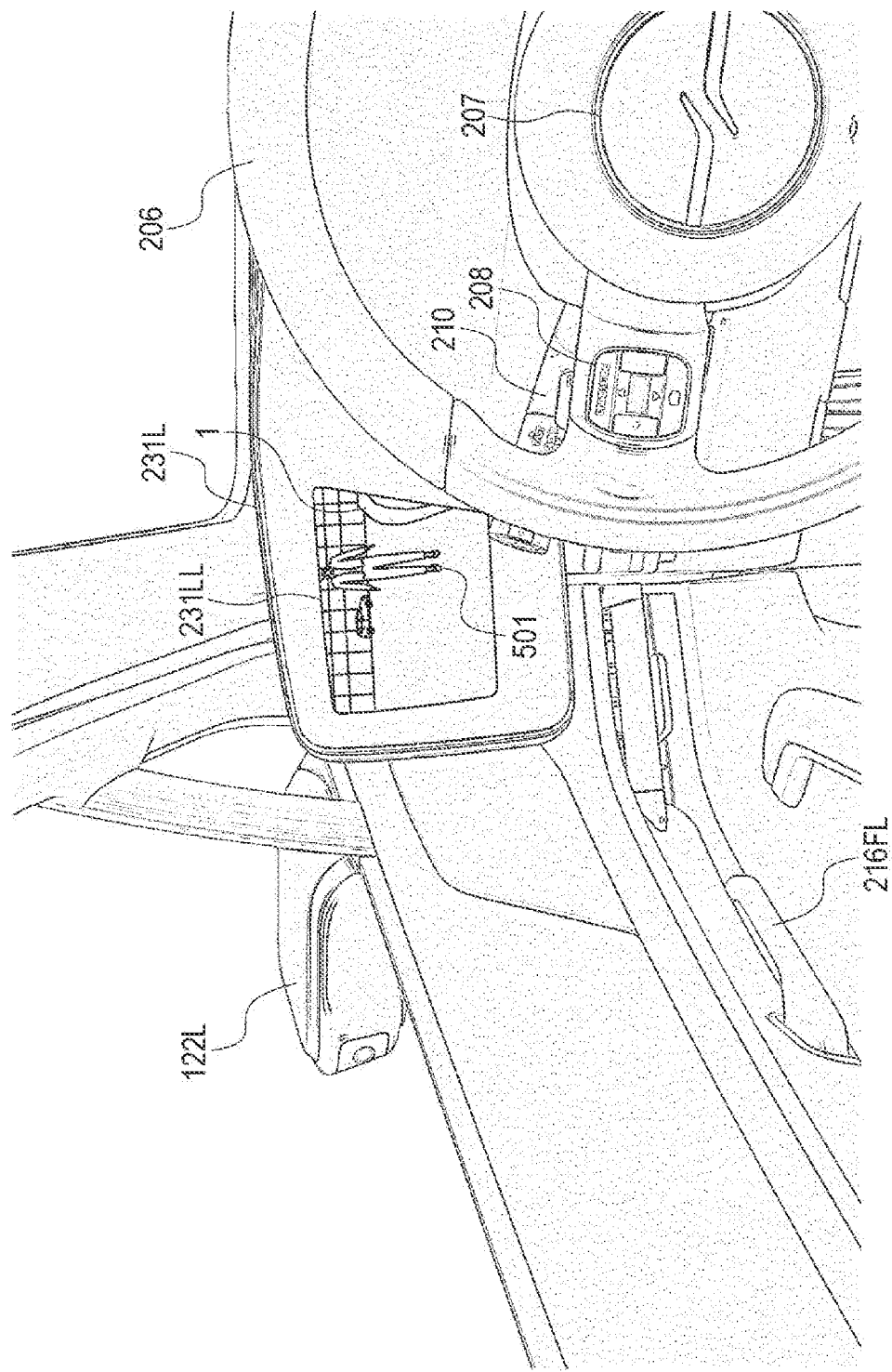
FIG. 35 is a diagram for explaining a method of controlling the display unit for the CMS in a case where a door opener is touched.

For example, FIG. 35 illustrates a display example of the display unit 231LL before the left hand of the driver touches the door opener 216FL. A part of the body of the vehicle 1 is displayed at the right end of the display unit 231LL. On the left side of the vehicle 1, a pedestrian 501 approaching the vehicle 1 from the rear is displayed.

Figure 36:
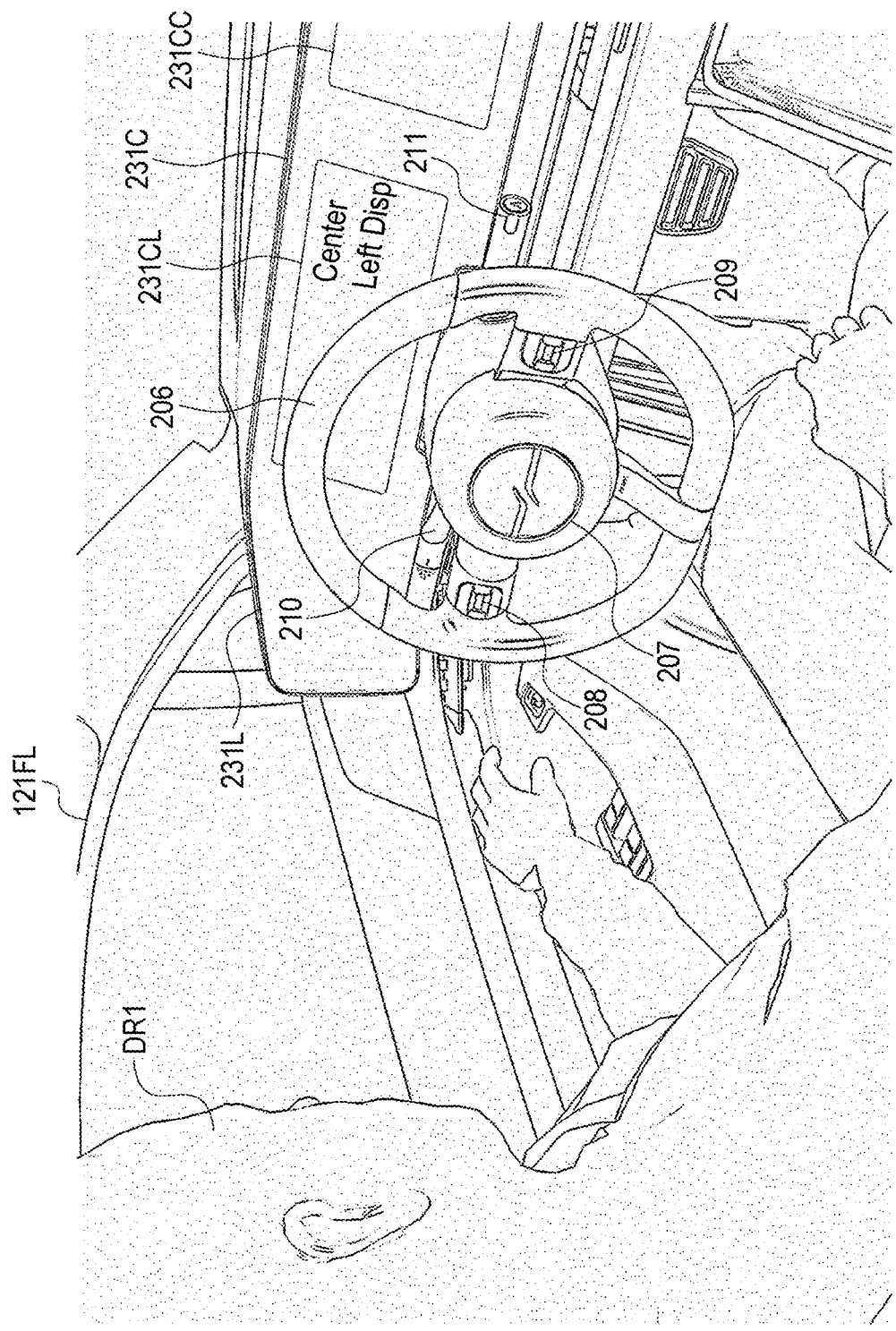
FIG. 36 is a diagram for explaining a method of controlling the display unit for the CMS in a case where the door opener is touched.
Figure 37:
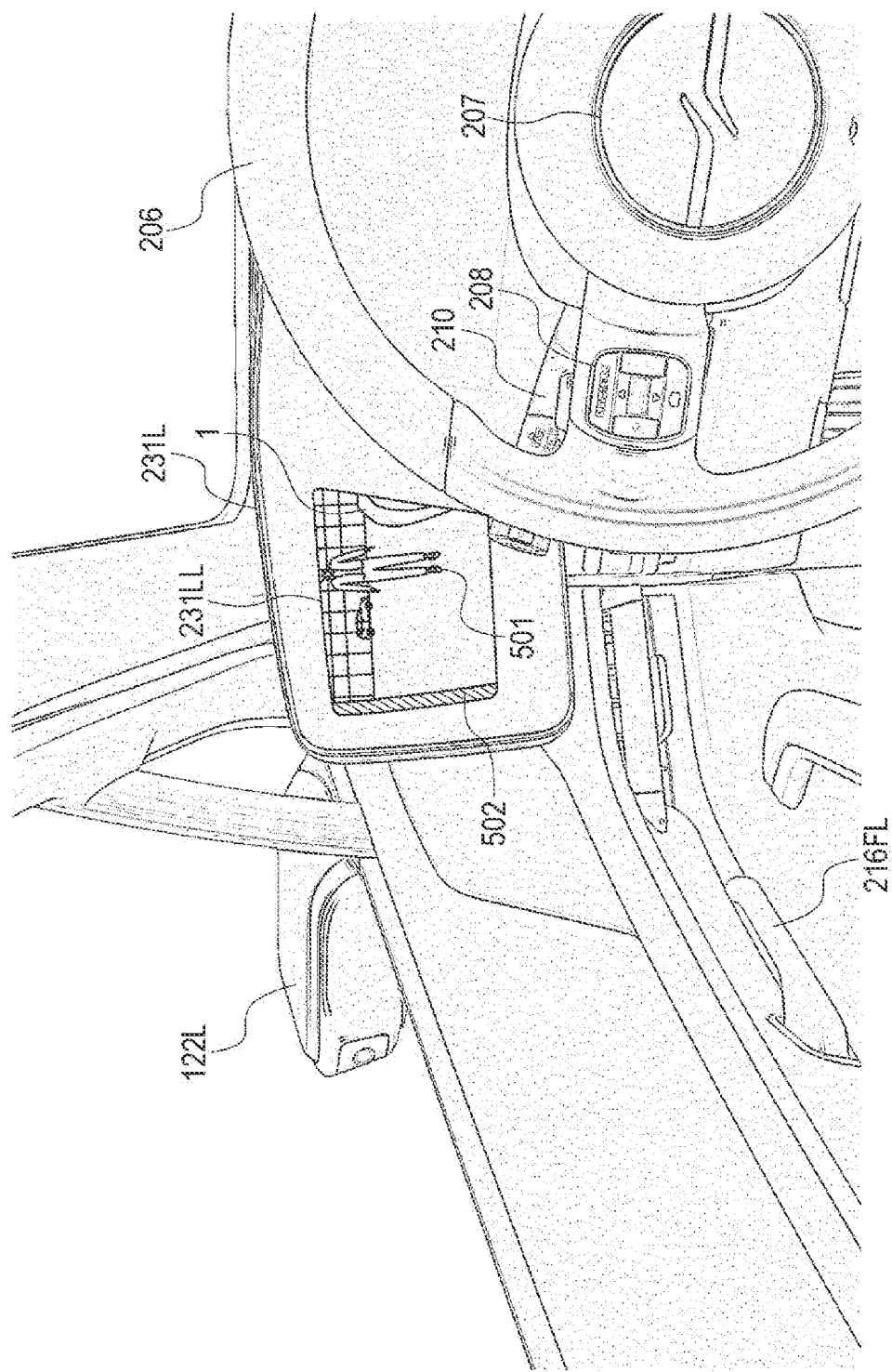
FIG. 37 is a diagram for explaining a method of controlling the display unit for the CMS in a case where the door opener is touched.

In this case, for example, as illustrated in FIG. 36, in a case where the left hand of the driver DR1 touches the door opener 216FL, the display unit 231LL displays a warning as indicated by hatching in FIG. 37. Specifically, at the left end of the display unit 231LL, a bar 502, which is a vertically long belt-shaped visual effect, is displayed in a superim posed manner and blinks. The color of the bar 502 is a conspicuous color, for example, yellow.

Note that, at this time, a warning sound may be output.

As a result, the driver DR1 is urged to pay attention to the pedestrian 501, and the door 121FL is prevented from hitting the pedestrian 501 when the door 121FL is opened.

At this time, the body system control unit 84 may increase the torque of the door 121FL to make it difficult to open the door 121FL.

Furthermore, for example, in a case where the hand of the passenger of the passenger seat 202 touches the door opener 216FR of the door 121FR on the passenger seat 202 side, the display unit 231RR on the passenger seat 202 side may display a similar warning.

<Operation Example of Display Unit 231CL and Illumination 207>

Next, operation examples of the display unit 231CL of the center display 231 and the illumination 207 of the steering wheel 206 will be described with reference to FIGS. 38 to 43.

For example, the display control unit displays contents corresponding to the situation on the display unit 231CL on the basis of at least one of the situation of the vehicle 1, the situation around the vehicle 1, or the situation of the passenger.

For example, the light control unit 85 lights or flashes the illumination 207 in a pattern according to the situation on the basis of at least one of the situation of the vehicle 1, the situation around the vehicle 1, or the situation of the passenger. The light emission pattern of the illumination 207 is defined by, for example, at least one of a color, brightness, a blinking pattern, light movement, or a light emission area.

For example, in a case where the driver gets in the vehicle 1 and sits on the driver's seat 201, the DMS 30 performs recognition processing of the driver on the basis of at least one of the image of the camera 101L or the image of the camera 102. Then, the display unit 231CL and the illumination 207 provide notification that the driver is recognized.

Figure 38:
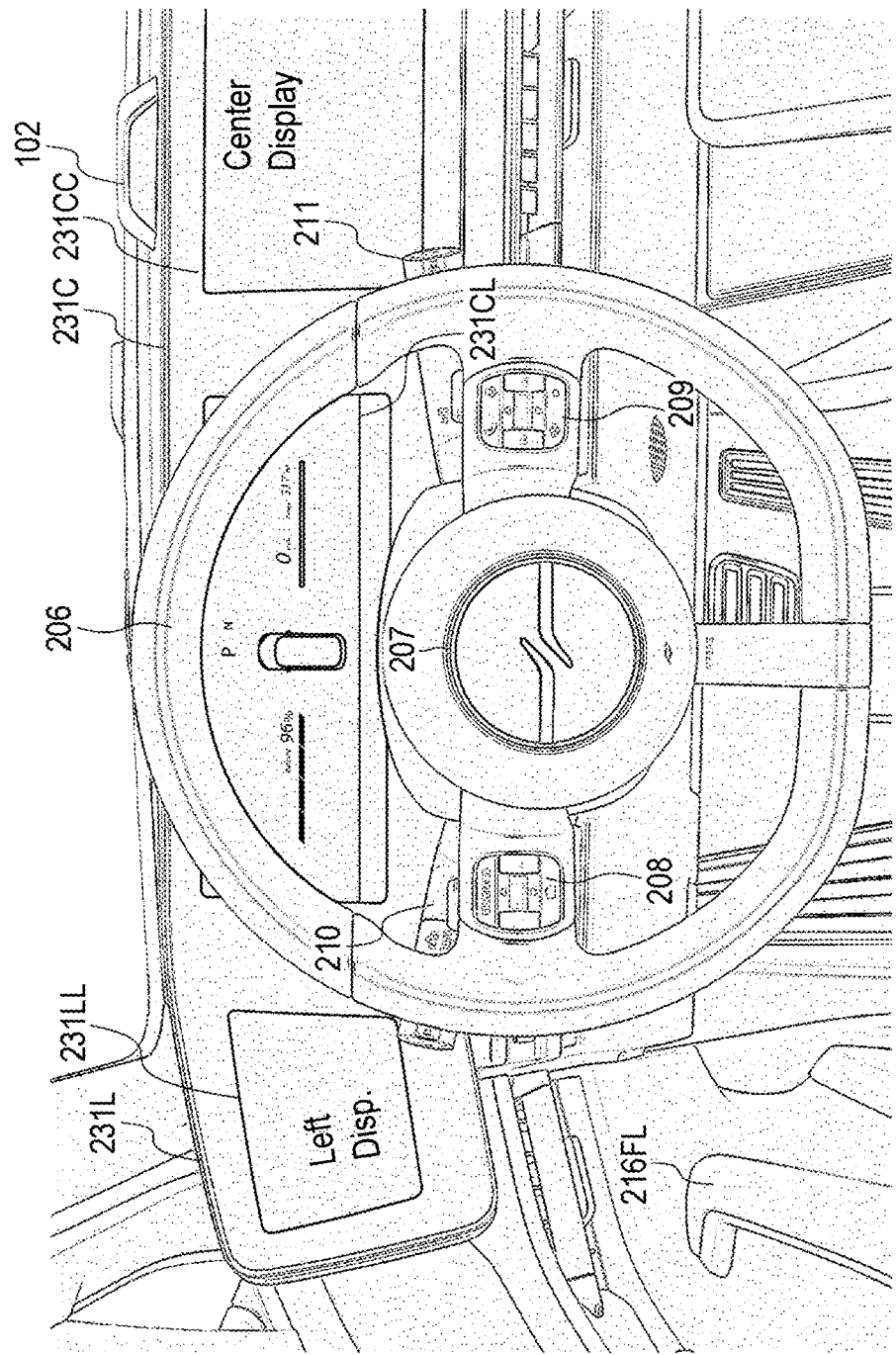
FIG. 38 is a diagram illustrating a state of illumination of a display unit for a driver's seat and a steering wheel before recognition by a driver.

For example, FIG. 38 illustrates a state of the display unit 231CL and the illumination 207 before the driver is recognized.

The state of the vehicle 1 is displayed on the display unit 231CL. Specifically, a shift position, a charge amount, a speed, a cruisable distance, and the like are displayed.

The illumination 207 is turned off.

Figure 39:
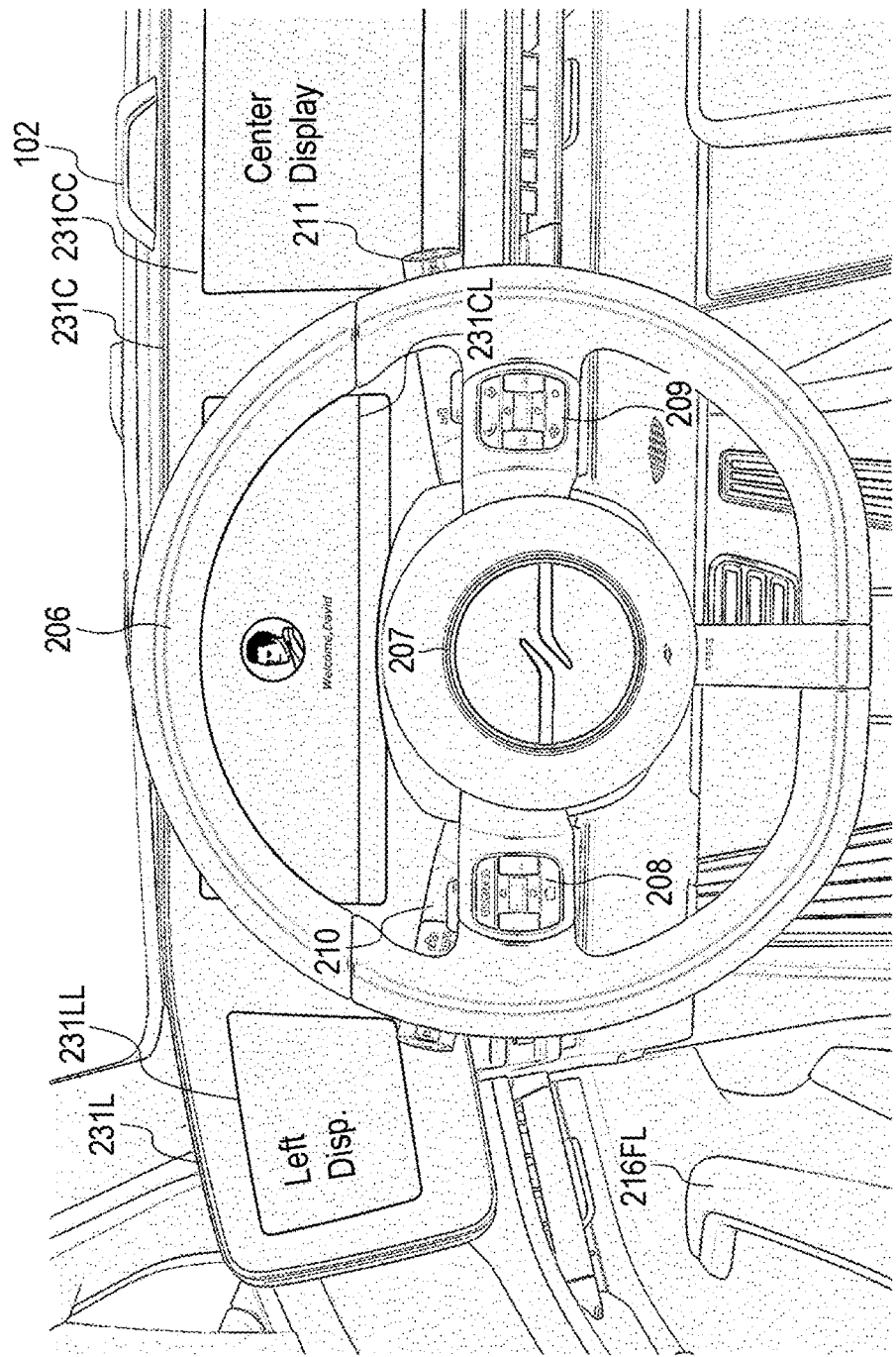
FIG. 39 is a diagram illustrating a state of illumination of the display unit for the driver's seat and the steering wheel at the time of driver's recognition.

FIG. 39 illustrates states of the display unit 231CL and the illumination 207 when the driver is recognized.

The display unit 231CL displays the recognized image and name of the driver, and a message for the driver. Thereafter, the display unit 231CL returns to the state of FIG. 38.

Although not illustrated in detail, the illumination 207 is turned on in a predetermined pattern. For example, a plurality of short white light bands moves so as to flow in a predetermined pattern on the illumination 207.

As a result, the driver is reliably notified that the vehicle 1 has recognized the driver.

At this time, for example, the body system control unit 84 may set the position and angle of the driver's seat 201, the position and angle of the steering wheel 206, and the like on the basis of the recognized physique of the driver, preference of the driver set in advance, or the like. As a result, a driving position suitable for the recognized driver is set.

Furthermore, for example, the display control unit may adjust the display position of the display unit 231CL of the center display 231 on the basis of the recognized position of the driver's eyes, the position and angle of the steering wheel 206, and the like. As a result, the display range of the display unit 231CL is set at an easily viewable position without being blocked by the steering wheel 206 according to the recognized driver.

Furthermore, for example, when the preparation for the automated driving of the vehicle 1 is completed, the display unit 231CL and the illumination 207 provide notification that the preparation for the automated driving is completed.

Figure 40:
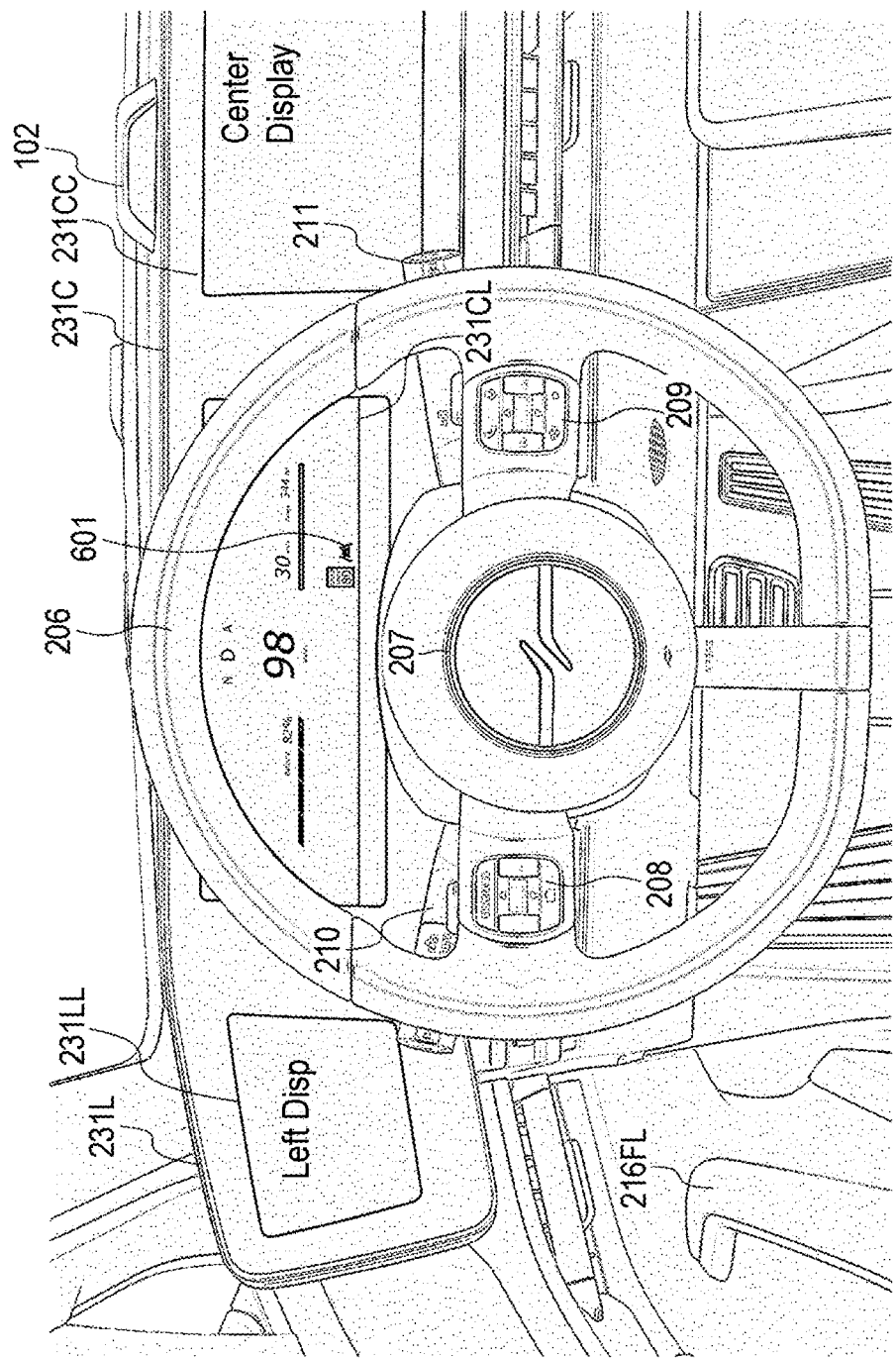
FIG. 40 is a diagram illustrating a state of illumination of the display unit for the driver's seat and the steering wheel when preparation for automated driving is completed.

For example, FIG. 40 illustrates states of the display unit 231CL and the illumination 207 when preparation for automated driving is completed.

On the display unit 231CL, an icon 601 indicating that preparation for automated driving is completed is displayed in addition to the display content of FIG. 39. Note that, to the left of the icon 601, the speed limit of the road on which the vehicle 1 is traveling is displayed.

Although not illustrated in detail, the illumination 207 is turned on in a predetermined pattern. For example, a plurality of short white light bands moves so as to flow in a predetermined pattern on the illumination 207.

Accordingly, the driver can surely recognize that the preparation for the automated driving is completed.

Furthermore, for example, when the automated driving of the vehicle 1 is started, the display unit 231CL and the illumination 207 provide notification of the start of the automated driving.

Figure 41:
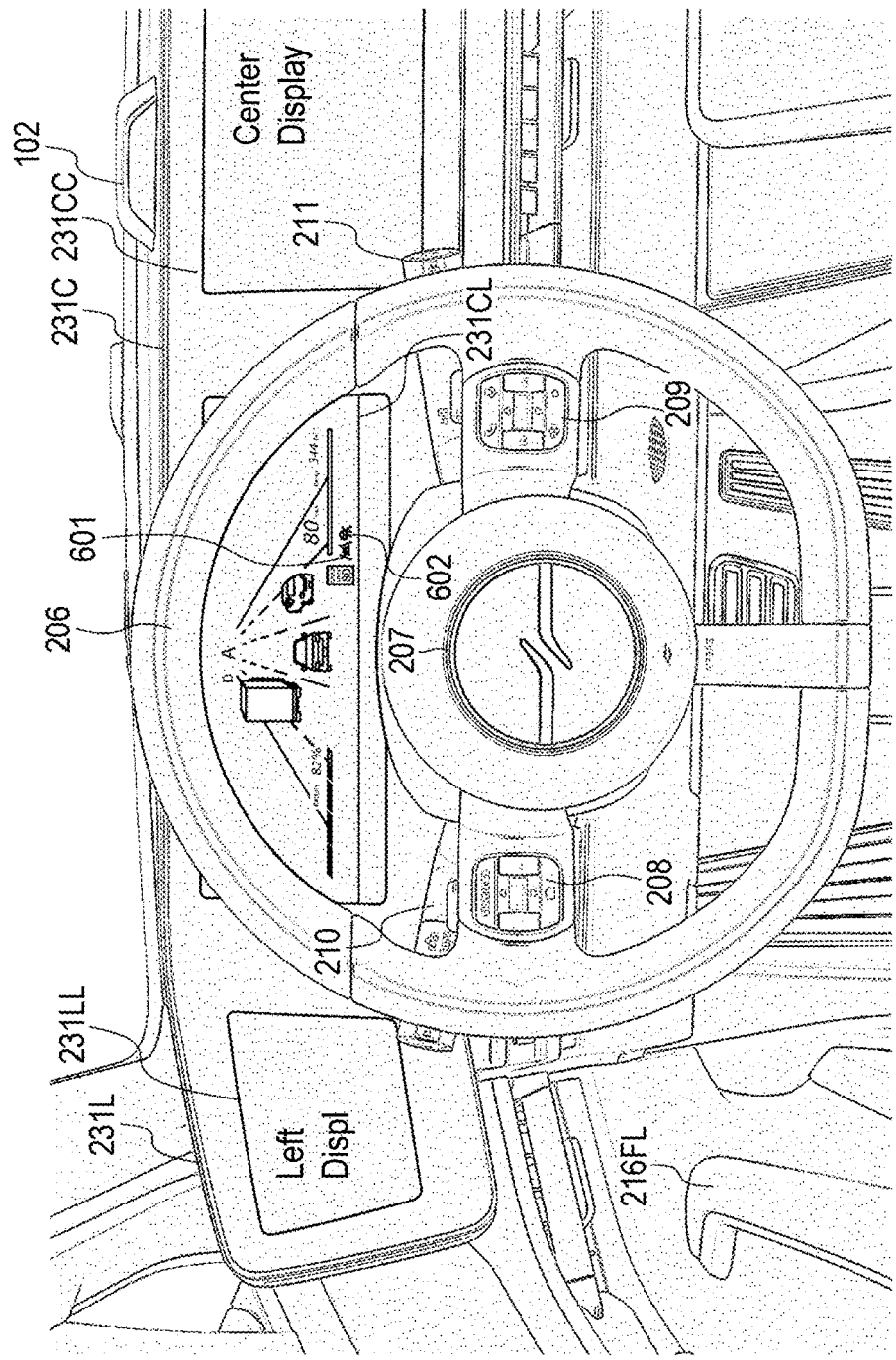
FIG. 41 is a diagram illustrating a state of illumination of the display unit for the driver's seat and the steering wheel at the start of automated driving.

FIG. 41 illustrates states of the display unit 231CL and the illumination 207 at the start of the automated driving.

The display unit 231CL displays, for example, an image of the front of the vehicle 1 captured by the camera 51FC1. The display unit 231CL displays, for example, a shift position, a charge amount, a speed, a cruisable distance, a speed limit of a traveling road, fuel consumption, and the like. On the display unit 231CL, an icon 602 indicating that automated driving is being performed is displayed to the right of the icon 601 described above. Furthermore, for example, the color of the icon 601 changes with the start of the automated driving.

Although not illustrated in detail, the illumination 207 is turned on in a predetermined pattern. For example, a plurality of short white light bands gradually changes to blue while moving so as to flow in a predetermined pattern on the illumination 207. Finally, the entire illumination 207 is lit in blue, and the state of being lit in blue is maintained during the automated driving.

Accordingly, the driver can surely recognize that the automated driving is started. Furthermore, by turning on the illumination 207, a passenger other than the driver can surely recognize that the automated driving is started.

Figure 42:
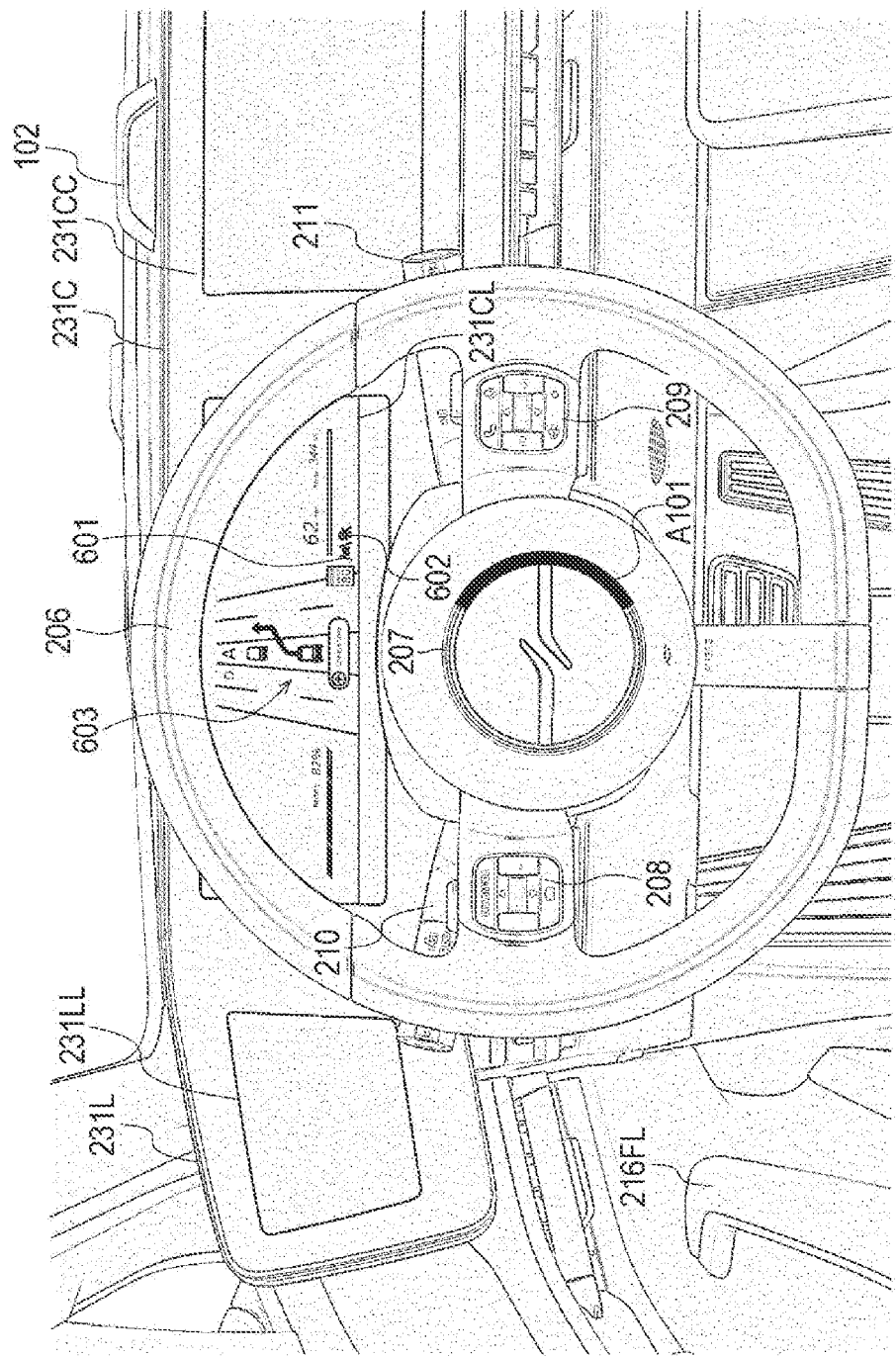
FIG. 42 is a diagram illustrating a state of illumination of the display unit for the driver's seat and the steering wheel at the time of lane change during automated driving.

FIG. 42 illustrates states of the display unit 231CL and the illumination 207 in a case where the vehicle 1 changes lanes to the right lane during automated driving.

in a case where the vehicle 1C changes the lane, the display unit 231CL displays guidance information 603 including an animation for providing notification of the execution and direction of the lane change so as to be superimposed on the image in front of the vehicle 1.

Furthermore, the blue light of the entire illumination disappears, and a predetermined blinking range A101 on the right side of the illumination 207 blinks in blue. Furthermore, in a case where the steering wheel 206 rotates clockwise to change the lane, blinking range A101 rotates in the opposite direction (counterclockwise) in accordance with the rotation angle of the steering wheel 206. Furthermore, in a case where the steering wheel 206 rotates counterclockwise so as to return to the original state after the lane change, blinking range A101 rotates in the opposite direction (clockwise) in accordance with the rotation angle of the steering wheel 206. As a result, blinking range A101 is maintained at a constant position as viewed from the outside without rotating together with the steering wheel 206. Then, after the rotation angle of the steering wheel 206 returns to 0 degrees, the entire illumination 207 lights blue similarly to before the lane change.

As a result, the driver can recognize in advance that the vehicle 1 changes lanes.

Note that similarly, in a case where the vehicle 1 changes the lane to the left lane, the guidance information 603 is displayed superimposed on the display unit 231CL, and the predetermined blinking range on the left side of the illumination 207 blinks in blue.

Furthermore, for example, in a case where the vehicle 1 changes its direction (for example, left turn or right turn), similar processing is performed. For example, guidance information including an animation for providing notification of the execution and direction of the direction change is superimposed and displayed on the display unit 231CL, and a predetermined blinking range corresponding to the direction of the direction change of the illumination 207 blinks in blue.

Figure 43:
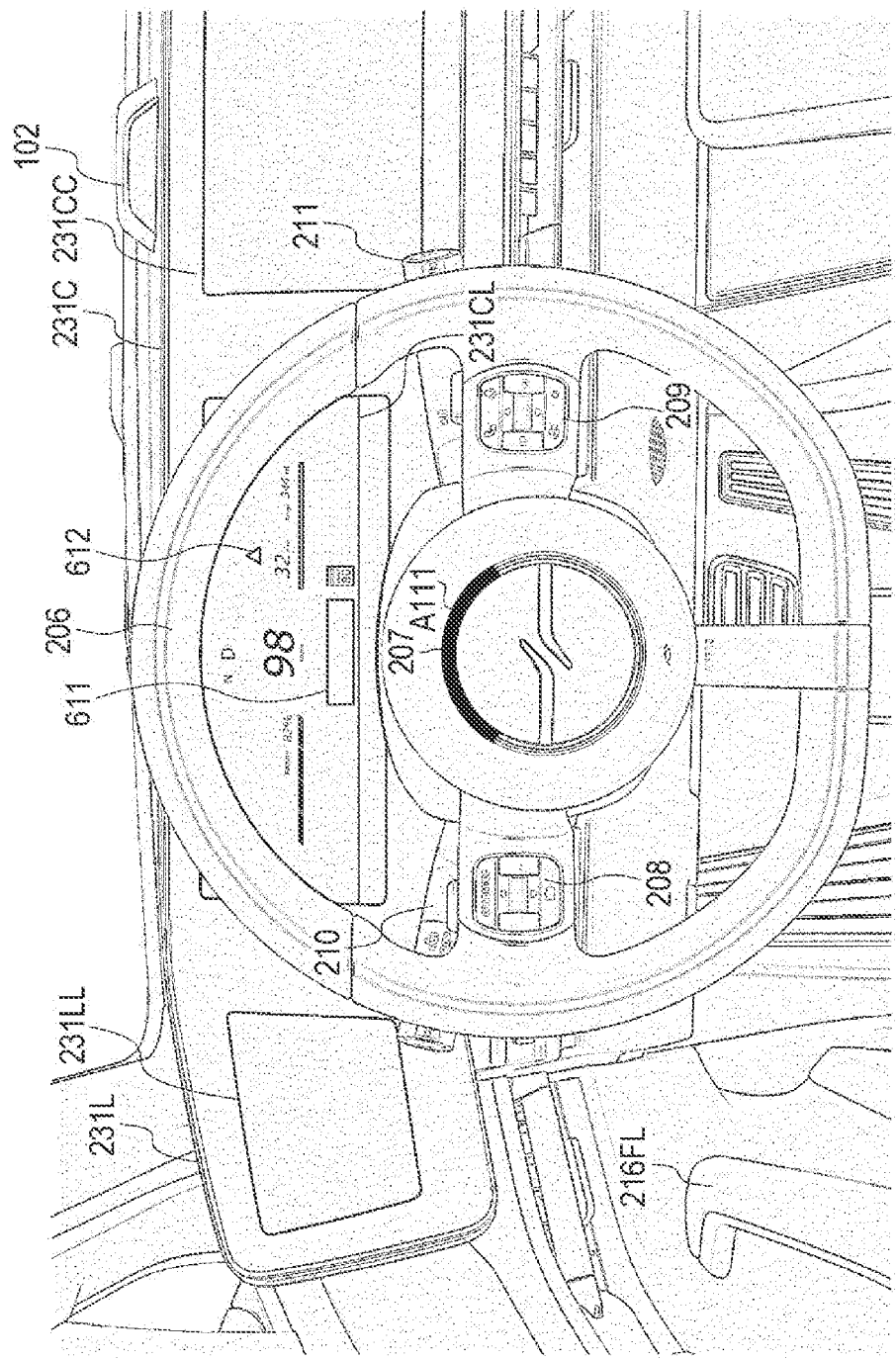
FIG. 43 is a diagram illustrating a state of illumination of the display unit for the driver's seat and the steering wheel at the time of danger detection.

FIG. 43 illustrates states of the display unit 231CL and the illumination 207 in a case where a dangerous state is detected around the vehicle 1.

On the display unit 231CL, for example, a message 611 and an icon 612 indicating the detected state, the coping method, and the like are displayed.

Furthermore, the blue light of the entire illumination 207 disappears, and a predetermined blinking range A111 on the upper side of the illumination 207 blinks. For example, the color and blinking speed of the light in the blinking range A111 change on the basis of the detected risk. For example, in a case where the degree of risk is high, blinking range A111 blinks in red, and in a case where the degree of risk is low, blinking range A111 blinks in yellow. Furthermore, the higher the risk, the faster the blinking speed, and the lower the risk, the slower the blinking speed.

Furthermore, for example, a warning sound is output in accordance with blinking of the blinking range A111.

<Example Related to Voice Control>

Next, an example of voice control of the vehicle 1 will be described with reference to FIGS. 44 to 47.

As described above, the vehicle 1 can realize 360 degree real audio. Furthermore, each of the driver's seat 201, the passenger seat 202, the back seat 203L, and the back seat 203L includes a seat speaker 237, a seat speaker 238, a seat speaker 239L, and a seat speaker 239R. Therefore, the HMI 31 can individually and freely control the sound image, the sound field, the volume, and the like for the passenger of each seat.

The DMS 30 can recognize the shape and position of both ears of the driver on the basis of the image of the camera 101L. Therefore, the sound control unit can appropriately set the sound image, the sound field, the volume, and the like for the driver by controlling the seat speaker 237 and the like of the driver's seat 201 on the basis of the positions and shapes of both ears of the driver.

Similarly, the DMS 30 can recognize the shape and position of both ears of the passenger on the passenger seat 202 on the basis of the image of the camera 101R. Therefore, the sound control unit can appropriately set the sound image, the sound field, the volume, and the like for the passenger by controlling the seat speaker 238 and the like of the passenger seat 202 on the basis of the positions and shapes of both ears of the passenger.

Similarly, the DMS 30 can recognize the shape and position of both ears of the passenger of the back seat 203L on the basis of the image of the ToF camera provided in the tablet terminal 235L. Therefore, the sound control unit can appropriately set the sound image, the sound field, the volume, and the like for the passenger by controlling the seat speaker 239L and the like of the back seat 203L on the basis of the positions and shapes of both ears of the passenger.

Similarly, the DMS 30 can recognize the shape and position of both ears of the passenger on the back seat 203R on the basis of the image of the ToF camera provided in the tablet terminal 235R. Therefore, the sound control unit can appropriately set the sound image, the sound field, the volume, and the like for the passenger by controlling the seat speaker 239R and the like of the back seat 203R on the basis of the positions and shapes of both ears of the passenger.

As described above, the vehicle 1 can individually output sound to the occupant on each seat, and can individually control a sound image, a sound field, a volume, and the like.

As a result, for example, notification of the position, movement, and the like of an object around the vehicle 1 can be provided to an occupant such as a driver by a warning sound.

FIGS. 44 to 47 illustrate an example of a method of controlling a warning sound for calling attention to a vehicle 701 approaching from the left rear.

Figure 44:
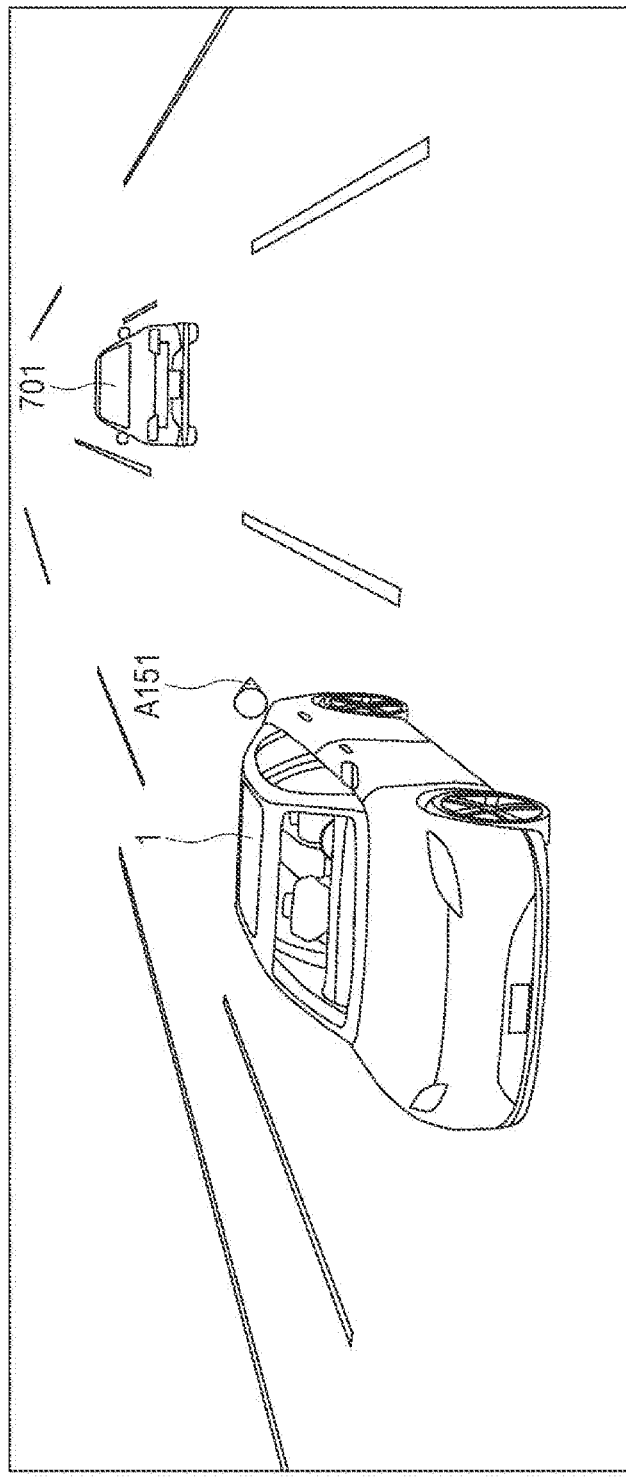
FIG. 44 is a diagram for explaining a method of controlling a warning sound for calling attention to a vehicle approaching from the left rear.

For example, when the distance between the vehicle 701 and the vehicle 1 falls within a predetermined threshold, the output of the warning sound is started. FIG. 44 illustrates a sound field A151 at the start of output of the warning sound.

Note that the apex of the conical sound field A151 indicates the position of the virtual sound source. The direction in which the cone spreads from the apex of the sound field A151 indicates the direction in which the sound field spreads.

The direction of sound field A151 is set to be substantially equal to the direction in which the head of the driver of vehicle 1 is viewed from vehicle 701. Furthermore, the virtual sound source of the warning sound is set at a position away from the head of the driver in the direction of the vehicle 701 by a predetermined distance.

Figure 45:
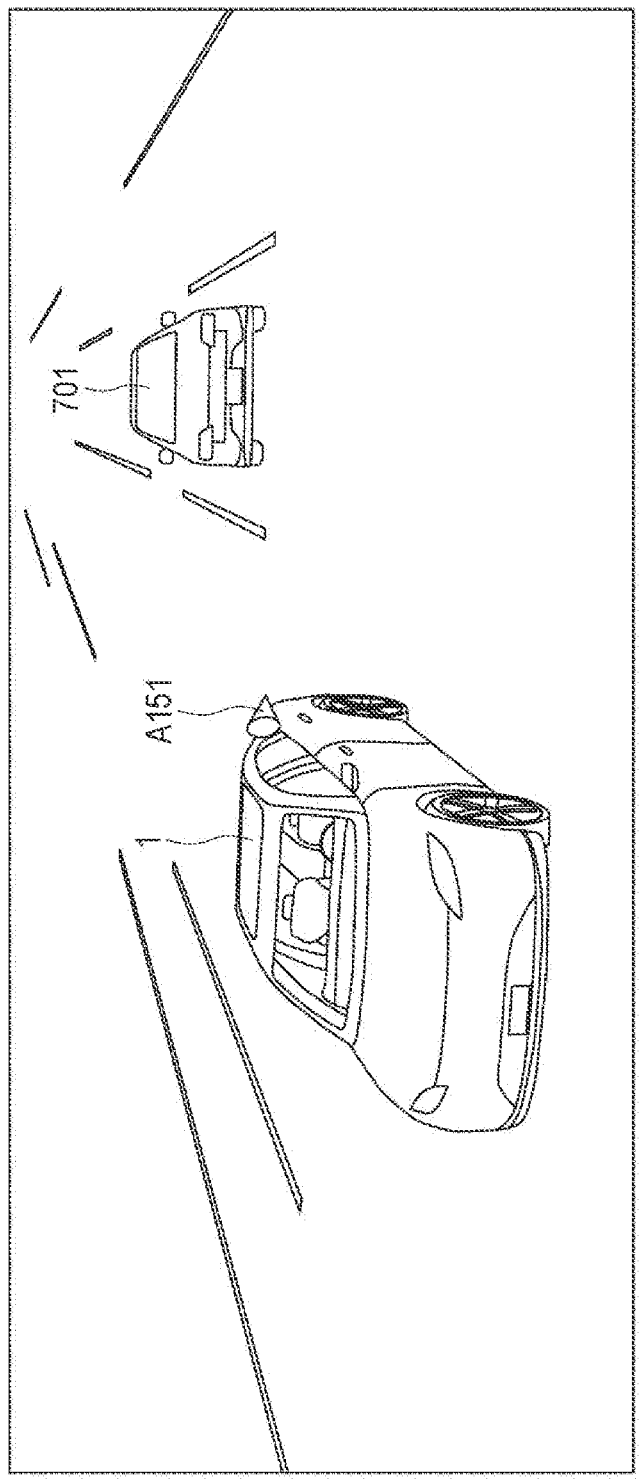
FIG. 45 is a diagram for explaining a method of controlling a warning sound for calling attention to a vehicle approaching from the left rear.
Figure 46:
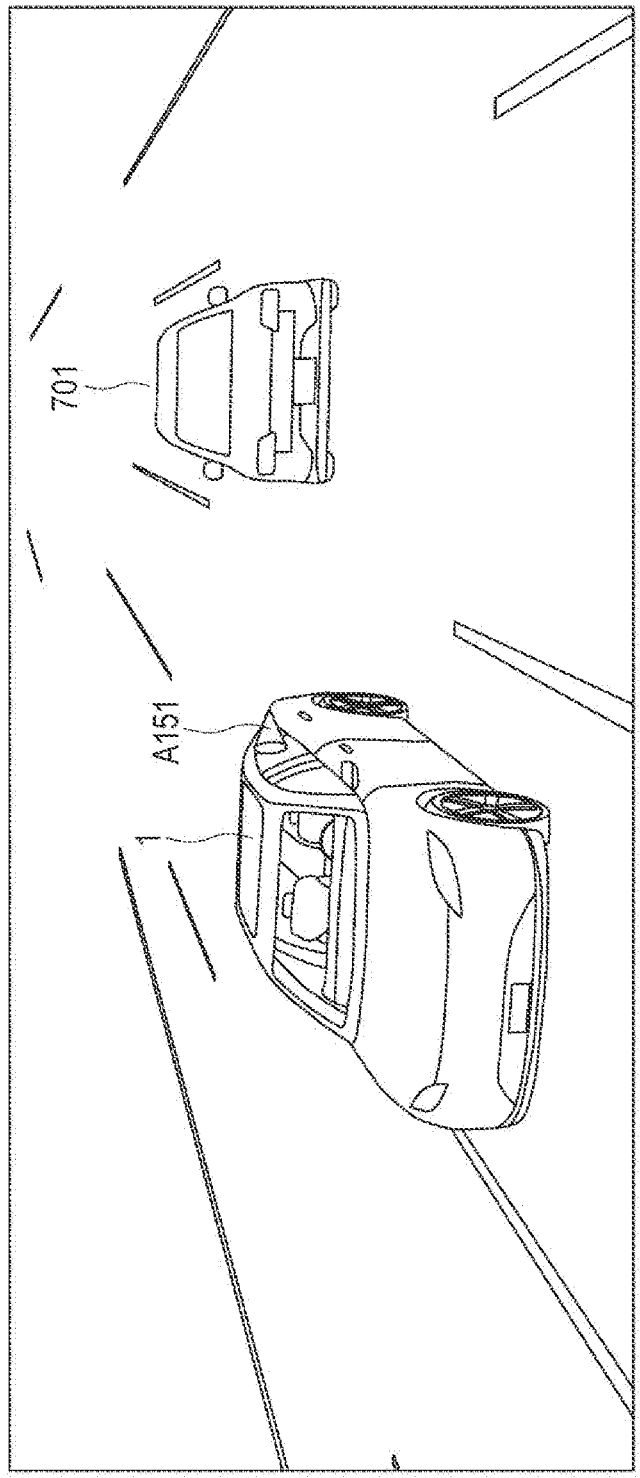
FIG. 46 is a diagram for explaining a method of controlling a warning sound for calling attention to a vehicle approaching from the left rear.
Figure 47:
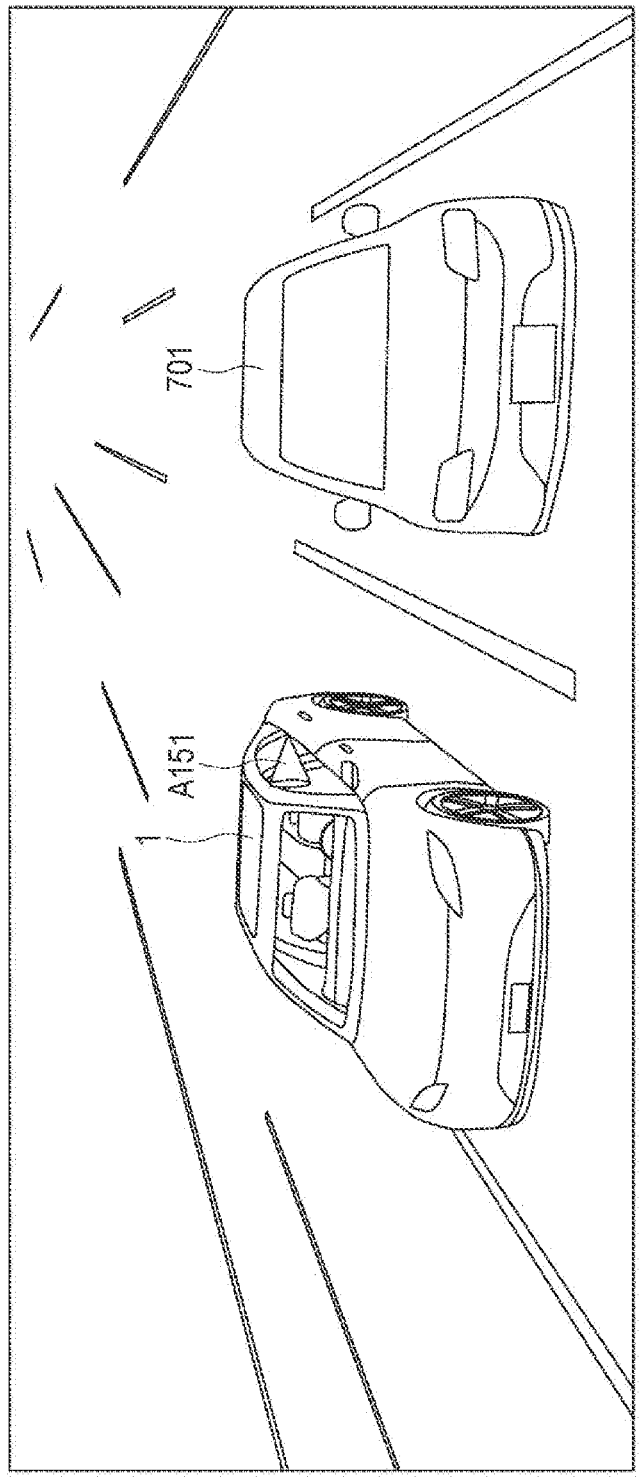
FIG. 47 is a diagram for explaining a method of controlling a warning sound for calling attention to a vehicle approaching from the left rear.

Thereafter, as illustrated in FIGS. 45 to 47, the sound field A151 moves as the vehicle 701 approaches the vehicle 1. Specifically, the sound field A151 always moves in a direction substantially equal to a direction in which the head of the driver of the vehicle 1 is viewed from the vehicle 701. Furthermore, the sound field A151 moves such that the distance between the virtual sound source of the warning sound and the head of the driver is substantially proportional to the distance between the vehicle 701 and the vehicle 1.

Therefore, the driver can recognize the approach of the vehicle 701 by the warning sound. Furthermore, the driver can sensuously recognize the speed, distance, and direction of the vehicle 701 by the movement of the warning sound.

3. Modification Examples

Hereinafter, modification examples of the above-described embodiments of the present technology will be described.

<Modification Examples of System Architecture>

The configuration of the information processing system 301 in FIGS. 20 and 21 can be appropriately changed.

Here, modification examples of the system architecture of the vehicle 1 will be described with reference to FIGS. 48 to 50. Specifically, modification examples of the configuration of the domain controller (domain) of the information processing system 301 will be described. Note that, in FIGS. 48 to 50, illustration of a configuration under the domain controller is omitted.

Figure 48:
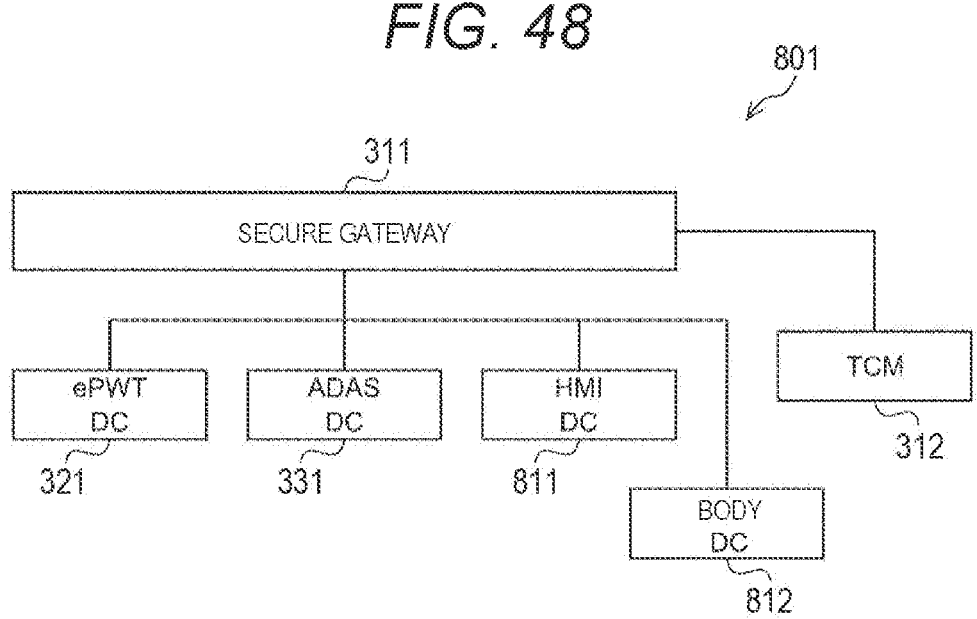
FIG. 48 is a block diagram illustrating a first modification example of the information processing system in FIG. 20.

FIG. 48 illustrates a configuration example of an information processing system 801 that is a first modification example of the information processing system 301. Note that, in the figure, portions corresponding to those in FIG. 20 are denoted by the same reference signs, and description thereof will be omitted as appropriate.

The information processing system 801 is provided with an HMI DC 811 and a body DC 812 instead of the HMI+body DC 341 as compared with the information processing system 301. That is, the HMI+body DC 341 is divided into the HMI DC 811 and the body DC 812. Therefore, the domain D3 in FIG. 20 is divided into the domain of the HMI system and the domain of the body system.

Figure 49:
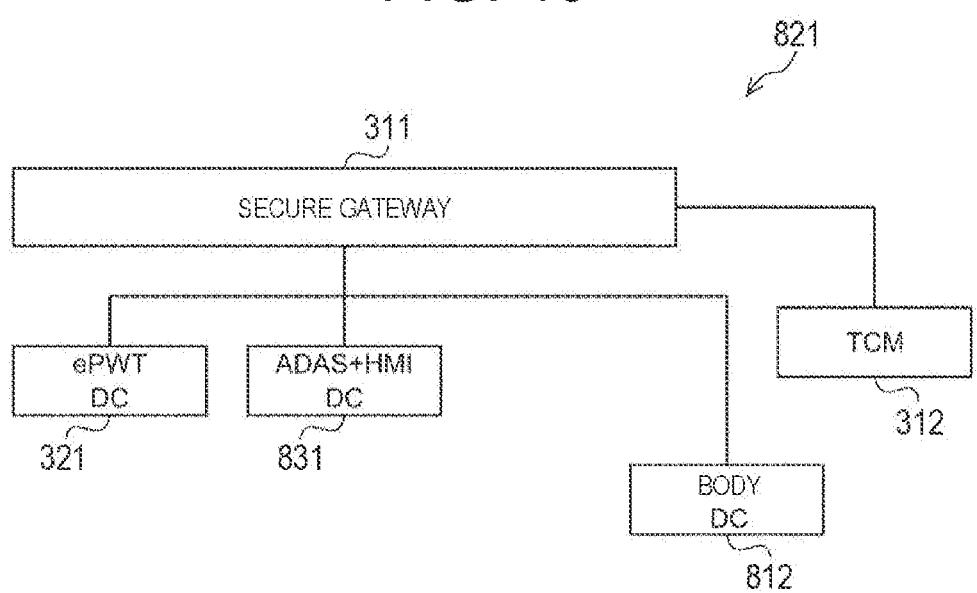
FIG. 49 is a block diagram illustrating a second modification example of the information processing system in FIG. 20.
Figure 50:
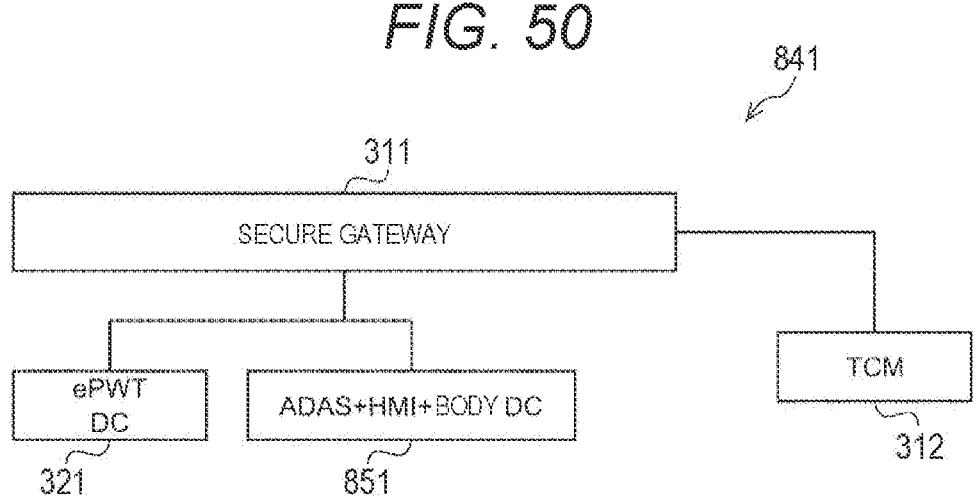
FIG. 50 is a block diagram illustrating a third modification example of the information processing system in FIG. 20.

FIG. 49 illustrates a configuration example of an information processing system 821 that is a second modification example of the information processing system 301. Note that, in the figure, portions corresponding to those of the information processing system 801 in FIG. 48 are denoted by the same reference signs, and description thereof will be omitted as appropriate.

Compared with the information processing system 801, the information processing system 821 is provided with an ADAS+HMI DC 831 instead of the ADAS DC 331 and the HMI DC 811. That is, the ADAS DC 331 and the HMI DC 811 are integrated. Therefore, the ADAS-based domain D2 (FIG. 20) and the HMI-based domain are integrated.

FIG. 50 illustrates a configuration example of an information processing system 841 that is a third modification example of the information processing system 301. Note that, in the figure, portions corresponding to those of the information processing system 801 in FIG. 48 are denoted by the same reference signs, and description thereof will be omitted as appropriate.

Compared with the information processing system 801, the information processing system 841 is provided with an ADAS+HMI+body DC 851 instead of the ADAS DC 331, the HMI DC 811, and the body DC 812. That is, the ADAS DC 331, the HMI DC 811, and the body DC 812 are integrated. Therefore, the domain D2 and the domain D3 in FIG. 20 are integrated.

Figure 51:
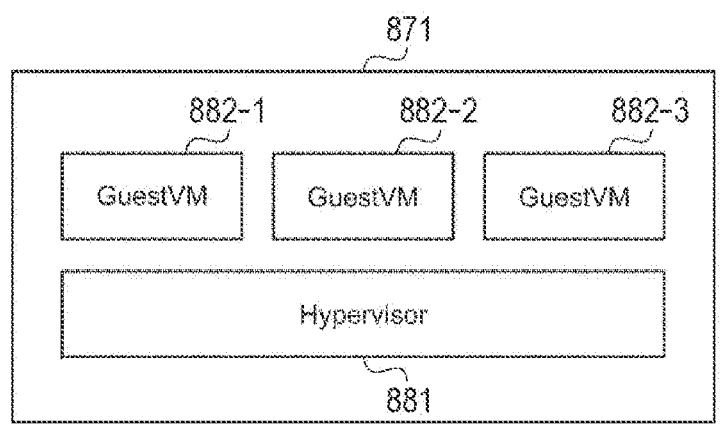
FIG. 51 is a block diagram illustrating an example of a method of realizing ADAS+HMI+body DC.

Note that the ADAS+HMI+body DC 851 can be realized by one piece of hardware 871 using a virtualization technology, for example, as illustrated in FIG. 51. Specifically, the functions corresponding to the ADAS DC 313, the HMI DC 811, and the body DC 812 may be implemented by a guest virtual machine (VM) 882-1 to a guest VM 882-3 operating on the hypervisor 881 in the hardware 871.

Figure 52:
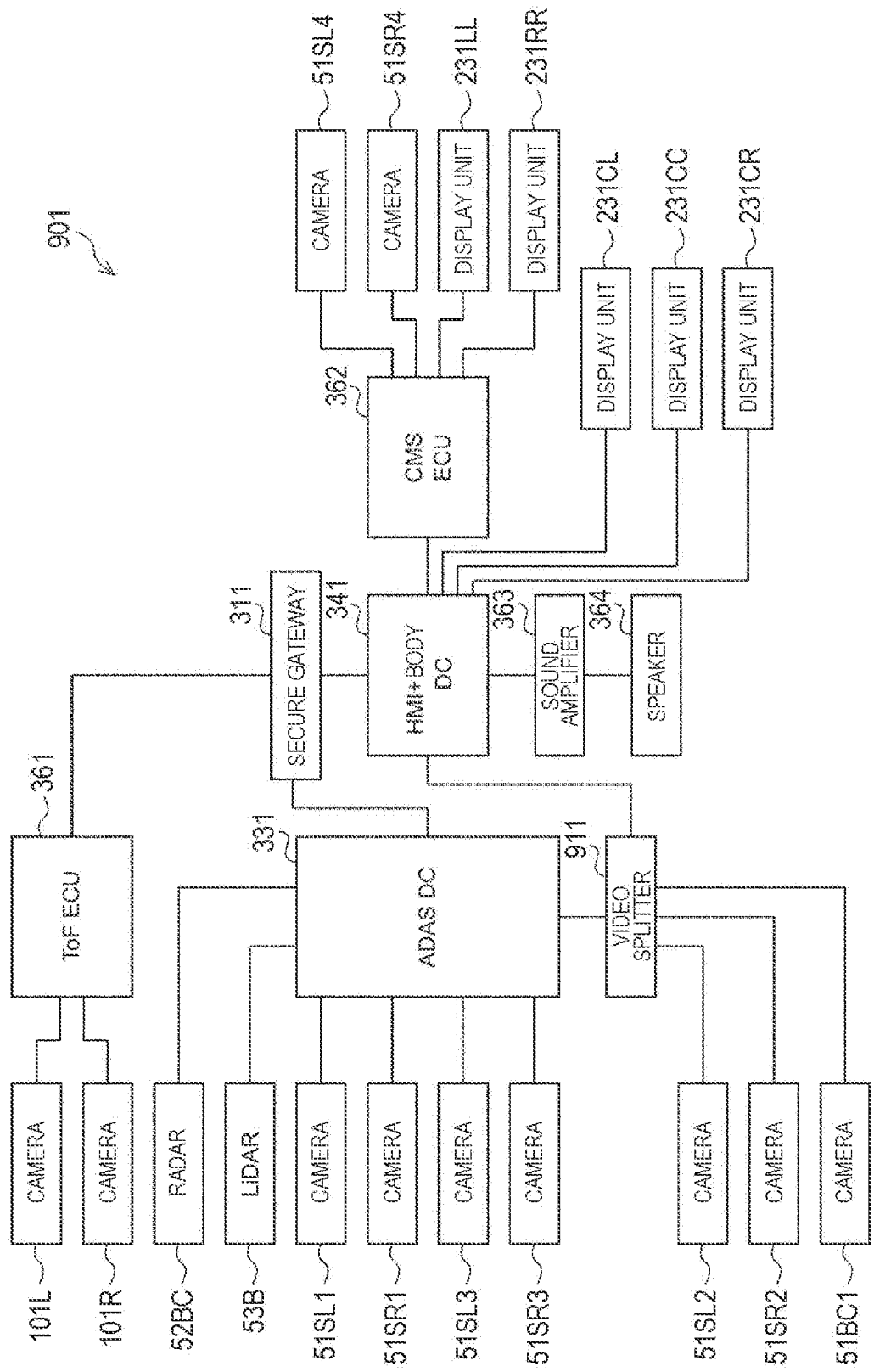
FIG. 52 is a block diagram illustrating a modification example of the information processing system in FIG. 21.

FIG. 52 illustrates a configuration example of an information processing system 901 that is a modification example of the information processing system 301 in FIG. 21. Note that portions corresponding to those of the information processing system 301 in FIG. 21 are denoted by the same reference numerals, and the description thereof will be omitted as appropriate.

The information processing system 901 is different from the information processing system 301 in FIG. 21 in that a video splitter 911 is provided.

The camera 51SL2, the camera 51SR2, and the camera 51BC1 are connected to the video splitter 911.

The video splitter 911 branches the image signals of the camera 51SL2, the camera 51SR2, and the camera 51BC1 into image signals of two systems, and supplies the image signals to the ADAS DC 331 and the HMI+body DC 341. Therefore, the camera 51SL2, the camera 51SR2, and the camera 51BC1 are connected to the ADAS DC 331 and the HMI+body DC 341 via the video splitter 911. That is, the camera 51SL2, the camera 51SR2, and the camera 51BC1 belong to both the domain D2 and the domain D3 illustrated in FIG. 20.

Note that, although not illustrated, the camera 51FC1 is also connected to the ADAS DC 331 and the HMI+body DC 341 via the video splitter 911.

For example, the HMI+body DC 341 generates an image for surround view on the basis of the images of the camera 51FC1, the camera 51SL2, the camera 51SR2, and the camera 51BC1. The HMI+body DC 341 displays the image for surround view on one or more of the display units 231CL to 231CR of the center display 231.

Figure 53:
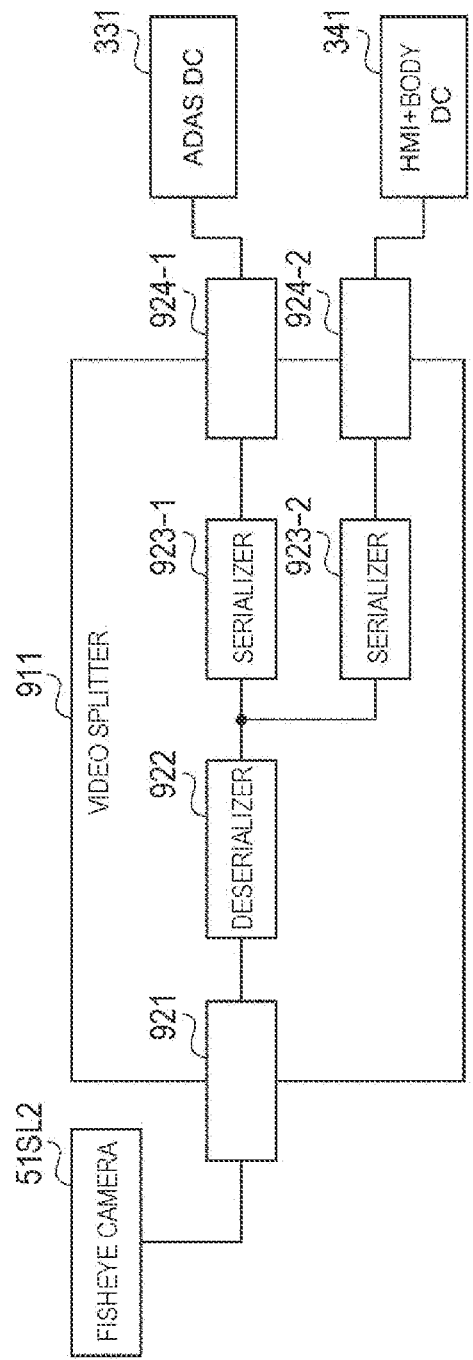
FIG. 53 is a block diagram illustrating a configuration example of a video splitter.

FIG. 53 illustrates a configuration example of the video splitter 911. Note that although FIG. 53 illustrates only a circuit related to the camera 51SL2, a similar circuit is provided for the other cameras 51FC1, 51SR2, and 51BC1.

The video splitter 911 includes an input terminal 921, a deserializer 922, a serializer 923-1, a serializer 923-2, an output terminal 924-1, and an output terminal 924-2. The deserializer 922 is connected to the input terminal 921, the serializer 923-1, and the serializer 923-2. The serializer 923-1 is connected to the output terminal 924-1. The serializer 923-2 is connected to the output terminal 924-2.

The image signal of the camera 51SL2 is input to the deserializer 922 via the input terminal 921. The deserializer 922 branches the image signal and supplies the image signal to the serializer 923-1 and the serializer 923-2. The serializer 923-1 converts the image signal into a serial signal and supplies the serial signal to the ADAS DC 331 via the output terminal 924-1. The serializer 923-2 converts the image signal into a serial signal and supplies the serial signal to the HMI+body DC 341 via the output terminal 924-2.

Figure 54:
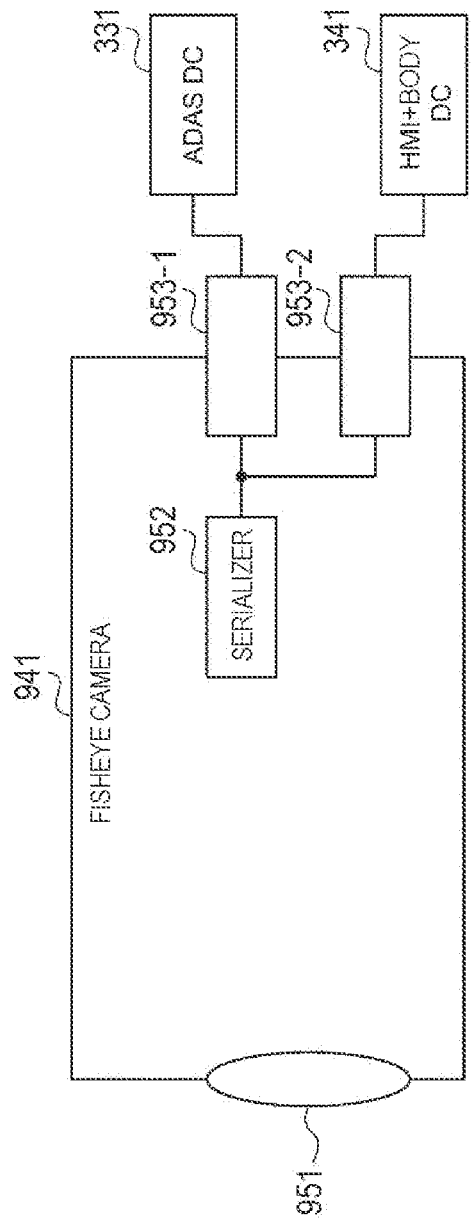
FIG. 54 is a block diagram illustrating a configuration example of a fisheye camera.

Note that, for example, instead of using the video splitter 911, a fisheye camera 941 in FIG. 54 may be used for the camera 51FC1, the camera 51SL2, the camera 51SR2, and the camera 51BC1.

The fisheye camera 941 includes a lens 951, a serializer 952, an output terminal 953-1, and an output terminal 953-2. Note that illustration of a circuit that captures and processes an image is omitted.

The fisheye camera 941 branches an image signal obtained by imaging by the serializer 952. The branched image signal is supplied to the ADAS DC 331 via the output terminal 953-1, and is supplied to the HMI+body DC 341 via the output terminal 953-2.

As described above, in the vehicle 1, the system architecture can be flexibly changed. By appropriately designing the system architecture, for example, it is possible to suppress complication of a system including each camera and to make the system simpler.

<Modification Examples of External Recognition Sensor 25 and In-Vehicle Sensor 26>

The configuration examples of the external recognition sensor 25 and the in-vehicle sensor 26 in FIG. 2 can be appropriately changed.

For example, the number of cameras of the camera module 122L can be changed.

Specifically, for example, the camera 51SL1 and the camera 51SL2 can be integrated into one wide-angle and high-resolution camera. For example, the camera 51SL2 and the camera 51SL3 can be integrated into one wide-angle and high-resolution camera. For example, the camera 51SL3 and the camera 51SL4 can be integrated into one wide-angle and high-resolution camera. For example, the cameras 51SL1 to 51SL3 can be integrated into one wide-angle and high-resolution camera. For example, the cameras 51SL1 to 51SL4 can be integrated into one high-resolution fisheye camera.

This also applies to the camera module 122R.

For example, it is possible to combine the camera 51BC1 and the radar 52BC.

For example, it is possible to combine the radar 52BC and the LiDAR 53B.

For example, one of the camera 51SL2 and the camera 51SR2 including a fisheye camera can be omitted.

Other Modification Examples

For example, one of the images of the digital outer mirror displayed on the display unit 231LL and the display unit 231RR of the center display 231 may be displayed at the central portion 231C.

In the above description, an example in which the vehicle 1 is a left-handed vehicle has been described, but the present technology can also be applied to a right-handed vehicle. In a case where the present technology is applied to a right steering wheel vehicle, the above-described layout of the outside and inside of the vehicle is appropriately changed in accordance with the right steering wheel.

Furthermore, the present technology can also be applied to, for example, a moving device in which a passenger performs automated driving without driving. In this case, the above-described distinction between the driver's seat 201 and the passenger seat 202 is eliminated, and the above-described various displays are arranged in front of the seat in the moving device or the like. Furthermore, for example, a display range or the like of an image displayed on the display is changed on the basis of a line-of-sight direction, a posture, or the like of a person sitting on a predetermined seat.

Furthermore, the type of vehicle to which the present technology can be applied is not particularly limited. Furthermore, the present technology can also be applied to moving devices such as personal mobility, transport robots, airplanes, ships, construction machines, agricultural machines, and the like, in addition to vehicles. Furthermore, the moving device to which the present technology can be applied includes, for example, a moving device that images the surroundings without being boarded by a person such as a drone or a robot.

4. Others

<Configuration Example of Computer>

The above-described series of processing can be executed by hardware or software. In a case where the series of processing is executed by software, a program constituting the software is installed in a computer (For example, the processor 21 or the like).

Note that the program executed by the computer may be a program in which processing is performed in time series in the order described in the present specification, or may be a program in which processing is performed in parallel or at necessary timing such as when a call is made.

Furthermore, in the present specification, a system means a set of a plurality of components (devices, modules (parts), etc.), and it does not matter whether or not all the components are in the same housing. Therefore, a plurality of devices housed in separate housings and connected via a network and one device in which a plurality of modules is housed in one housing are both systems.

Moreover, the embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowchart can be executed by one device or can be shared and executed by a plurality of devices.

Moreover, in a case where a plurality of processes is included in one step, the plurality of processes included in the one step can be executed by one device or can be shared and executed by a plurality of devices.

<Combination Example of Configurations>

The present technology can also have the following configurations.

(1)

A camera module including:

a first camera;

a second camera; and a housing that stores the first camera and the second camera, in which in a state of being installed in a moving device, an optical axis of the first camera faces obliquely rearward of the moving device, and an optical axis of the second camera faces in a lateral direction or obliquely forward of the moving device.

(2)

The camera module according to (1), further including at least one of a third camera stored in the housing or a fourth camera stored in the housing, in which in a state of being installed in the moving device, an optical axis of the third camera faces obliquely rearward of the moving device and faces a direction closer to the lateral direction of the moving device than the optical axis of the first camera, and an optical axis of the fourth camera faces obliquely forward of the moving device and faces a direction closer to a front direction of the moving device than the optical axis of the second camera.

(3)

The camera module according to (2), in which the first camera is used for a camera monitoring system (CMS), the second camera is used for a surround view, the third camera is used for an advanced driver assistance system (ADAS), and the fourth camera is used for the ADAS.

(4)

The camera module according to (3), in which the second camera has a wider angle than the first camera, the third camera, and the fourth camera.

(5)

The camera module according to (4), in which the second camera is a fisheye camera.

(6)

The camera module according to (4) or (5), in which the optical axis of the second camera faces obliquely downward in a state of being installed in the moving device.

(7)

The camera module according to any one of (3) to (6), in which the second camera is further used for the ADAS.

(8)

The camera module according to any one of (3) to (7), in which the third camera has a higher resolution than the fourth camera.

(9)

The camera module according to (1), in which the second camera has a wider angle than the first camera.

(10)

The camera module according to (9), in which the optical axis of the second camera faces obliquely downward in a state of being installed in the moving device.

(11)

The camera module according to (1), in which the first camera is used for at least one of a CMS or an ADAS, and the second camera is used for at least one of a surround view or the ADAS.

(12)

The camera module according to any one of (1) to (11), in which the housing includes metal.

(13)

The camera module according to any one of (1) to (11), in which the camera module is installed near a front end of a door on a front side of the moving device.

(14)

An information processing system including:

a first camera including an optical axis facing obliquely rearward of a moving device;

a second camera that is stored in a housing same as the first camera and includes an optical axis facing a direction closer to a front direction of the moving device than the optical axis of the first camera;

a first display that is used by a camera monitoring system (CMS) and displays an image based on a first image captured by the first camera;

a recognition unit that performs external object recognition of the moving device on the basis of a second image captured by the second camera; and a display control unit that controls display by the first display of the first image and a visual effect based on a result of object recognition by the recognition unit.

(15)

The information processing system according to (14), further including:

a first domain controller that performs control of a first domain including the first camera and the display control unit; and a second domain controller that performs control of a second domain including the second camera and the recognition unit.

(16)

The information processing system according to (15), in which the first domain further includes the second camera.

(17)

The information processing system according to (14) or (15), further including a second display extending in a left-right direction in front of an interior of the moving device, in which the display control unit further controls display of an image based on the second image by the second display.

(18)

The information processing system according to (17), in which the display control unit controls display of a surround view using the second image by the second display.

(19)

The information processing system according to (17) or (18), in which the first display and the second display are integrated.

(20)

The information processing system according to any one of (14) to (19), in which the optical axis of the second camera faces a lateral direction or obliquely forward of the moving device.

(21)

The information processing system according to (20), further including at least one of a third camera stored in the housing or a fourth camera stored in the housing, in which an optical axis of the third camera faces obliquely rearward of the moving device and faces a direction closer to a lateral direction of the moving device than the optical axis of the first camera, and an optical axis of the fourth camera faces obliquely forward of the moving device and faces a direction closer to a front direction of the moving device than the optical axis of the second camera.

(22)

The information processing system according to (21), in which the recognition unit further performs external object recognition of the moving device on the basis of at least one of a third image captured by the third camera or a fourth image captured by the fourth camera.

(23)

The information processing system according to (21) or (22), further including:

a first domain controller that performs control of a first domain including the first camera and the display control unit; and a second domain controller that performs control of a second domain including the second camera, the recognition unit, and at least one of the third camera or the fourth camera.

(24)

The information processing system according to any one of (14) to (19), in which the optical axis of the second camera faces obliquely rearward of the moving device, and faces a direction closer to a lateral direction of the moving device than the optical axis of the first camera.

(25)

An information processing method including:

controlling display, by a display for a camera monitoring system (CMS), of an image based on a first image captured by a first camera whose optical axis faces obliquely rearward of a moving device;

performing external object recognition of the moving device on the basis of a second image captured by a second camera that is stored in a housing same as the first camera and includes an optical axis facing a direction closer to a front direction of the moving device than the optical axis of the first camera; and controlling display, by the display, of a visual effect based on a result of the object recognition.

(26)

An information processing apparatus including a display control unit that controls display of a display used for a camera monitoring system (CMS), in which the display control unit controls display by the display of an image based on a first image captured by a first camera whose optical axis facing obliquely rearward of a moving device, and a visual effect based on a result of external object recognition of the moving device based on a second image captured by a second camera that is stored in a housing same as the first camera and that includes an optical axis facing a direction closer to a front direction of the moving device than the optical axis of the first camera.

Note that the effects described in the present specification are merely examples and are not limited, and other effects may be provided.

REFERENCE SIGNS LIST

1 Vehicle
11 Vehicle control system
21 Processor
25 External recognition sensor
26 In-vehicle sensor
30 DMS
31 HMI
51, 51FC1 to 51BC3 Camera
52, 52FC to 52BR Radar
53, 53F to 53B LiDAR
73 Recognition unit
84 Body system control unit
85 Light control unit
101L, 101R, 102 Camera
122L, 122R Camera module
131L, 131R Housing
231 Center display
231C Central portion
231CL to 231CR Display unit
231L Left end portion
231LL Display unit
231R Right end portion
231RR Display unit
301 Information processing system
311 Secure gateway
321 ePWT DC
331 ADAS DC
341 HMI+body DC
349 CMS
361 ToF ECU
362 CMS ECU
801 Information processing system
811 HMI DC
812 Body DC
821 Information processing system
831 ADAS+HMI DC
841 Information processing system
851 ADAS+HMI+body DC

The invention claimed is:

1. A camera module to image a side of a moving device, the camera module consisting essentially of:

a first camera;
a second camera;
a third camera;
a fourth camera; and
a housing that stores the first camera, the second camera, the third camera, and the fourth camera, wherein, in a state of being installed in the moving device,
an optical axis of the first camera faces obliquely rearward of the moving device,
an optical axis of the second camera faces in a lateral direction or obliquely forward of the moving device,
an optical axis of the third camera faces obliquely rearward of the moving device and faces a direction closer to the lateral direction of the moving device than the optical axis of the first camera, and
an optical axis of the fourth camera faces obliquely forward of the moving device and faces a direction closer to a front direction of the moving device than the optical axis of the second camera, wherein
the first camera is used for a camera monitoring system (CMS) that displays an image to be viewed by a driver, and
the second camera is used for an advanced driver assistance system (ADAS).

2. The camera module according to claim 1, wherein
the second camera is further used for a surround view,
the third camera is used for the ADAS, and the fourth camera is used for the ADAS.

3. The camera module according to claim 2, wherein the second camera has a wider angle than the first camera, the third camera, and the fourth camera.

4. The camera module according to claim 3, wherein the second camera is a fisheye camera.

5. The camera module according to claim 3, wherein the optical axis of the second camera faces obliquely downward in a state of being installed in the moving device.

6. The camera module according to claim 2, wherein the third camera has a higher resolution than the fourth camera.

7. The camera module according to claim 1, wherein the second camera has a wider angle than the first camera.

8. The camera module according to claim 7, wherein the optical axis of the second camera faces obliquely downward in a state of being installed in the moving device.

9. The camera module according to claim 1, wherein the first camera is further used for ADAS.

10. The camera module according to claim 1, wherein the housing includes metal.

11. The camera module according to claim 1, wherein the camera module is installed near a front end of a door on a front side of the moving device.

12. An information processing system including:
a first camera including an optical axis facing obliquely rearward of a moving device, the first camera providing a first image stream for a camera monitoring system (CMS);
a second camera that is stored in a housing same as the first camera and includes an optical axis facing a direction closer to a front direction of the moving device than the optical axis of the first camera, the second camera providing a second image stream for an advanced driver assistance system (ADAS);
a first display that is used by the CMS and displays an image based on the first image stream to be viewed by a driver;
a recognition circuit configured to perform external object recognition of the moving device on the basis of the second image stream; and
a display control circuit configured to display by the first display the first image stream and a visual effect based on a result of object recognition by the recognition circuit, wherein the visual effect is superimposed on the first image stream.

13. The information processing system according to claim 12, further comprising:
a first domain controller that performs control of a first domain including the first camera and the display control circuit; and
a second domain controller that performs control of a second domain including the second camera and the recognition circuit.

14. The information processing system according to claim 13, wherein the first domain further includes the second camera.

15. The information processing system according to claim 12, further comprising
a second display extending in a left-right direction in front of an interior of the moving device,
wherein the display control circuit configured to control display of an image based on the second image by the second display.

16. The information processing system according to claim 15, wherein the display control circuit configured to control display of a surround view using the second image by the second display.

17. The information processing system according to claim 15, wherein the first display and the second display are integrated.

18. The information processing system according to claim 12, wherein the optical axis of the second camera faces a lateral direction or obliquely forward of the moving device.

19. The information processing system according to claim 18, further comprising
at least one of a third camera stored in the housing or a fourth camera stored in the housing,
wherein an optical axis of the third camera faces obliquely rearward of the moving device and faces a direction closer to a lateral direction of the moving device than the optical axis of the first camera, and an optical axis of the fourth camera faces obliquely forward of the moving device and faces a direction closer to a front direction of the moving device than the optical axis of the second camera.

20. The information processing system according to claim 19, wherein the recognition circuit is configured to perform external object recognition of the moving device on a basis of at least one of a third image captured by the third camera or a fourth image captured by the fourth camera.

21. The information processing system according to claim 19, further comprising:
a first domain controller that performs control of a first domain including the first camera and the display control circuit; and
a second domain controller that performs control of a second domain including the second camera, the recognition circuit, and at least one of the third camera or the fourth camera.

22. The information processing system according to claim 12, wherein the optical axis of the second camera faces obliquely rearward of the moving device, and faces a direction closer to a lateral direction of the moving device than the optical axis of the first camera.

23. The information processing system according to claim 12, further comprising:
a vehicle sensor configured to detect a state of the moving device, wherein the display control circuit is further configured to change a display range of the image based on the first image displayed on the first display in response to the detected state of the moving device.

24. An information processing method comprising:
controlling display, by a display for a camera monitoring system (CMS) that displays an image to be viewed by a driver, of an image based on a first image captured by a first camera whose optical axis faces obliquely rearward of a moving device;
performing external object recognition of the moving device on a basis of a second image captured by a second camera that is stored in a housing same as the first camera and includes an optical axis facing a direction closer to a front direction of the moving device than the optical axis of the first camera;

controlling display, by the display, of a visual effect based on a result of the object recognition, wherein the visual effect is superimposed on the first image;

detecting a state of the moving device; and changing a display range of the image based on the first image displayed on the first display in response to the detected state of the moving device.

25. An information processing apparatus comprising a display control circuit configured to control display of a display used for a camera monitoring system (CMS) that displays an image to be viewed by a driver, wherein the display control circuit is configured to control display by the display of an image based on a first image captured by a first camera whose optical axis facing obliquely rearward of a moving device, and a visual effect based on a result of external object recognition of the moving device based on a second image captured by a second camera that is stored in a housing same as the first camera and that includes an optical axis facing a direction closer to a front direction of the moving device than the optical axis of the first camera, the visual effect being superimposed on the first image;

receive a detected state of the moving device; and change a display range of the image based on the first image displayed on the first display in response to the detected state of the moving device.

* * * * *